US012498516B2

United States Patent
Sagae et al.

(10) Patent No.: US 12,498,516 B2
(45) Date of Patent: Dec. 16, 2025

(54) OPTICAL FIBER

(71) Applicant: NTT, Inc., Tokyo (JP)

(72) Inventors: Yuto Sagae, Musashino (JP); Takashi Matsui, Musashino (JP); Kazuhide Nakajima, Musashino (JP)

(73) Assignee: NTT, Inc., Tokyo (JP)

(*) Notice: Subject to any disclaimer, the term of this patent is extended or adjusted under 35 U.S.C. 154(b) by 155 days.

(21) Appl. No.: 18/267,917

(22) PCT Filed: Jan. 5, 2021

(86) PCT No.: PCT/JP2021/000073
§ 371 (c)(1),
(2) Date: Jun. 16, 2023

(87) PCT Pub. No.: WO2022/149182
PCT Pub. Date: Jul. 14, 2022

(65) Prior Publication Data
US 2024/0061168 A1    Feb. 22, 2024

(51) Int. Cl.
*G02B 6/02* (2006.01)
*H04B 10/2507* (2013.01)

(52) U.S. Cl.
CPC ......... *G02B 6/02042* (2013.01); *G02B 6/021* (2013.01); *H04B 10/2507* (2013.01)

(58) Field of Classification Search
CPC . G02B 6/02042; G02B 6/021; H04B 10/2507
See application file for complete search history.

(56) References Cited

U.S. PATENT DOCUMENTS

2007/0297735 A1   12/2007  Khrapko et al.
2011/0135262 A1*  6/2011   Molin .................. G02B 6/0288
                                                              385/124
(Continued)

FOREIGN PATENT DOCUMENTS

JP      2007-504080 A    3/2007
WO   WO-2020/162406 A1   8/2020

OTHER PUBLICATIONS

M. D. Feuer, L. E. Nelson, X. Zhou, S. L. Woodward, R. Isaac, B. Zhu, T. F. Taunay, M. Fishteyn, J. M. Fini and M. F. Yan, "Joint Digital Signal Processing Receivers for Spatial Superchannels", Photon. Technol. Lett., vol. 24, No. 21, 1957.

(Continued)

*Primary Examiner* — Uyen Chau N Le
*Assistant Examiner* — Marc E Manheim

(57) ABSTRACT

An object of the present invention is to achieve a low delay core applicable to a Master channel of a Master-Slave CPE (MS-CPE) transmission method with a general-purpose refractive index distribution structure.

An optical fiber according to the present invention is a single-mode optical fiber, and has an SI-type refractive index distribution structure, in which a clad region relative refractive index difference $\Delta$ (%) with respect to a core region refractive index, a radius a (μm) of the core region, and a group delay time difference $\Delta_\tau$ between the Master channel and the Slave channel satisfy "Mathematical Expression 19" and "Mathematical Expression 20", or has a W-type refractive index distribution structure, in which a mode field diameter MFD is 9.5 to 10.1 μm, and a relative refractive index difference $\Delta_1$ (%) of a low refractive index layer with respect to a core, a relative refractive index difference $\Delta_2$ (%) of the clad region with respect to the core, the core radius $a_1$, and (Continued)

the group delay time difference $\Delta_\tau$ between the Master channel and the Slave channel satisfy "Mathematical Expression 41".

6 Claims, 53 Drawing Sheets

(56) References Cited

U.S. PATENT DOCUMENTS

| | | | |
|---|---|---|---|
| 2013/0287353 A1* | 10/2013 | Molin | G02B 6/0281 |
| | | | 385/126 |
| 2015/0316712 A1 | 11/2015 | Anderson et al. | |
| 2021/0356657 A1 | 11/2021 | Mukasa | |

OTHER PUBLICATIONS

V. Bobrovs, S. Spolitis and G. Ivanovs, "Latency causes and reduction in optical metro networks", Proceedings in SPIE 9009, 90080C, (2014).

Y. Sagae, T. Matsui, T. Sakamoto and K. Nakajima, "Multi-functional multi-core fibre based long-haul transmission system with lower DSP complexity," ECOC 2019, pp. 1-4, (2019).

Ranjan Rakesh et al: "Design strategies for two-core uncoupled multicore fiber for crosstalk analysis" 2018.

* cited by examiner

Fig. 49

| LOW DELAY master CHANNEL | |
|---|---|
| $a_m$ | 3.4 μm |
| $\Delta_c$ | -0.4% |
| slave CHANNEL | |
| $a_{s1}$ | 5.0 μm |
| $a_{s2}$ | 15.0 μm |
| $\Delta_d$ | -0.55% |
| CORE ARRANGEMENT | |
| $\Lambda$ | 31 μm |

OPTICAL FIBER

CROSS-REFERENCE TO RELATED APPLICATIONS

This application is a 371 U.S. National Phase of International Application No. PCT/JP2021/000073, filed on Jan. 5, 2021. The entire disclosure of the above application is incorporated herein by reference.

TECHNICAL FIELD

The present disclosure relates to an optical fiber for optical communication.

BACKGROUND ART

In a current long-distance transmission network, a dramatic increase in capacity is achieved by an optical coherent communication technology. In the optical coherent communication technology, information is allocated to a phase state of light. A phase state of signal light changes due to wavelength dispersion of an optical fiber constituting a transmission path and phase fluctuation of a signal light source, and thus signal quality deteriorates. Accordingly, in the optical coherent communication, digital signal processing (DSP) for removing phase noise in a receiver is indispensable. Although sufficient signal quality is currently ensured by the DSP, there is a problem that the calculation cost in the device increases.

In order to solve this problem, Non Patent Literature 1 proposes a system in which carrier phase estimation is performed using one channel in a transmission channel as a Master channel, and phase correction is performed by diverting an estimation result to other transmission channels. This transmission method is called Master-Slave CPE (MS-CPE). The MS-CPE can reduce signal processing cost for phase estimation by a Slave channel.

On the other hand, in recent optical communication, there is an increasing demand for reduction of communication delay time. According to Non Patent Literature 2, it is reported that the DSP processing time in the optical coherent communication technology is about 1 has. Reduction of delay time of the DSP processing is also one of solutions to the request for reduction of the communication delay time. Therefore, Non Patent Literature 3 describes a possibility of reducing the DSP processing delay time in the Slave channel by applying a transmission channel with a reduced group delay time to the Master channel of the MS-CPE.

CITATION LIST

Non Patent Literature

Non Patent Literature 1: M. D. Feuer, L. E. Nelson, X. Zhou, S. L. Woodward, R. Isaac, B. Zhu, T. F. Taunay, M. Fishteyn, J. M. Fini and M. F. Yan, "Joint Digital Signal Processing Receivers for Spatial Superchannels," Photon. Technol. Lett., vol. 24, No. 21, 1957

Non Patent Literature 2: V. Bobrovs, S. Spolitis and G. Ivanovs, "Latency causes and reduction in optical metro networks," Proceedings in SPIE 9009, 90080C (2014) Non Patent Literature 3: Y. Sagae, T. Matsui, T. Sakamoto and K. Nakajima, "Multi-functional multi-core fibre based long-haul transmission system with lower DSP complexity," ECOC 2019, pp. 1-4(2019)

SUMMARY OF INVENTION

Technical Problem

The MS-CPE of Non Patent Literature 3 uses, as an optical fiber, a multicore fiber of a core and a step-type clad in which a refractive index distribution is reduced to about 1 μm for the transmission channel with the reduced group delay time. However, in the above-described core in which the refractive index distribution is reduced, the refractive index distribution is easily deformed due to a spinning tension or the like at the time of manufacturing the optical fiber (it is difficult to obtain the desired effect of MS-CPE), and there is a problem in manufacturability.

Therefore, in order to solve the above problems, an object of the present invention is to provide an optical fiber with improved manufacturability for MS-CPE.

Solution to Problem

In order to achieve the above object, the optical fiber according to the present invention uses a low delay core using a typical refractive index distribution employed in a general-purpose optical fiber as a Master channel.

Specifically, a first optical fiber according to the present invention is an optical fiber included in an optical communication system of an MS-CPE transmission method, characterized in that the optical fiber includes a core having a radius a (μm) for a master channel and a clad having a relative refractive index difference $\Delta$ (%) with respect to the core, and that the core and the clad have a step index (SI) type refractive index distribution structure and satisfying Mathematical Expression C1,

[Mathematical Expression C1]

$$-1.05+0.37a-0.05a^2 < \Delta < -1.02+0.26a-0.02a^2$$

and $$\Delta > 4.23+7.37\Delta\tau+3.81\Delta\tau^2-(3.15+4.77\Delta\tau+2.47\Delta\tau^2)a+(0.52+0.77\Delta\tau+0.40\Delta\tau^2)a^2 \quad (C1)$$

where $\Delta\tau$ (ns/km) is a group delay time difference between the master channel and a slave channel, and is a value that satisfies Mathematical Expression C2, where s (μs) is a signal arrival time difference when an optical signal is transmitted through the master channel and the slave channel of the optical communication system, and L (km) is a transmission distance of the optical signal.

[Mathematical Expression C2]

$$\Delta\tau \leq -\frac{s}{L} \times 10^3 \quad (C2)$$

Further, a second optical fiber according to the present invention is an optical fiber included in an optical communication system of an MS-CPE transmission method, characterized in that the optical fiber includes a core having a radius $a_1$ (μm) for a master channel, a low refractive index layer surrounding a periphery of the core and having a relative refractive index difference $\Delta_1$ (%) with respect to the core, and a clad having a relative refractive index difference $\Delta_2$ (%) with respect to the core, and that the core, the low refractive index layer, and the clad have a W-type refractive index distribution structure and satisfy Mathematical Expression C3,

[Mathematical Expression C3]

$$0.23+0.66\text{MFD}-3.33(\mu_2/\Delta_1)<a_1<0.13(\Delta_2/\Delta_1)+(1.11-0.14\text{MFD})\Delta\tau+0.10-0.41\text{MFD} \quad (C3)$$

where MFD is a mode field diameter (μm) of the core, and Δτ (ns/km) is a group delay time difference between the master channel and the slave channel and is a value that satisfies Mathematical Expression C2, where s (μs) is a signal arrival time difference when an optical signal is transmitted through the master channel and the slave channel of the optical communication system, and L (km) is a transmission distance of the optical signal.

The optical fiber according to the present invention has an effect of improving manufacturability by forming the low delay core with a general-purpose refractive index distribution structure. Therefore, the present invention can provide an optical fiber with improved manufacturability for MS-CPE.

Further, the optical fiber according to the present invention is characterized in that the refractive index of the core is lower than that of pure silica glass. For example, the first optical fiber according to the present invention is characterized in that the radius a (μm) satisfies Mathematical Expression C4, the group delay time difference $\Delta\tau_{min}$ (nm/km) that is minimum satisfies Mathematical Expression C5, and a relative refractive index difference $\Delta_F$ (%) of the core with respect to the pure silica glass satisfies Mathematical Expression C6.

By reducing the refractive index of the core, a larger Δτ can be achieved, and the application region of the MS-CPE using the low delay signal can be expanded.

[Mathematical Expression C4]

$$-4.4+0.8\text{MFD}<a<-1.2+0.6\text{MFD} \quad (C4)$$

[Mathematical Expression C5]

$$\Delta\tau_{min}=-18.93+7.00\times10^3\text{MFD}^{-3.30} \quad (C5)$$

[Mathematical Expression C6]

$$0.98-0.06\text{MFD}-(0.42+0.03\text{MFD})a-(0.04+0.002\text{MFD})a^2<\Delta_F<0.03+1.16\times10^3\text{MFD}^{-3.47}+0.02\Delta\tau-(0.01+1.88\times10^5\text{MFD}^{-5.09})a+(0.64\times10^{-3}+1.89\times10^4\text{MFD}^{-7.16})a^2 \quad (C6)$$

Here, the MFD is a mode field diameter (μm) of the core.

Further, an optical fiber according to the present invention is a multicore fiber including a plurality of cores, in which one of the plurality of cores is the core for the master channel.

Note that the respective inventions described above can be combined as much as possible.

Advantageous Effects of Invention

The present invention can provide an optical fiber with improved manufacturability for MS-CPE.

BRIEF DESCRIPTION OF DRAWINGS

FIG. 49 is a diagram illustrating an example of a structure of the multicore optical fiber according to the present invention.

DESCRIPTION OF EMBODIMENTS

Figure 1:
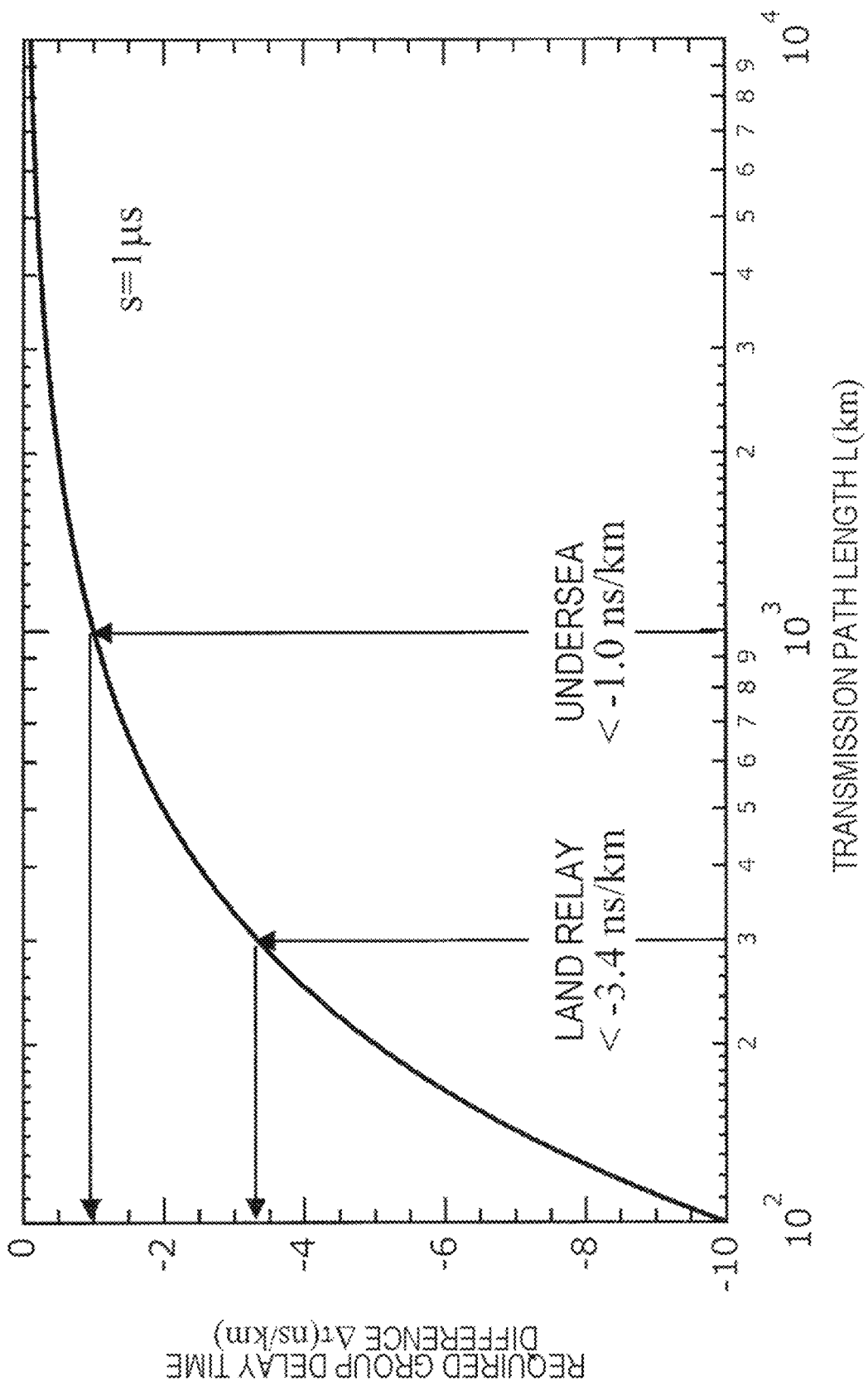
FIG. 1 is a diagram illustrating a delay reduction amount required for a transmission path length for a low delay master channel having a group delay time for achieving MS-CPE.

Embodiments of the present invention will be described with reference to the accompanying drawings. The embodiments described below are examples of the present invention, and the present invention is not limited to the following embodiments. Note that components having the same reference numerals in the present description and the drawings indicate the same components.

[Basic Conditions]

Figure 50:
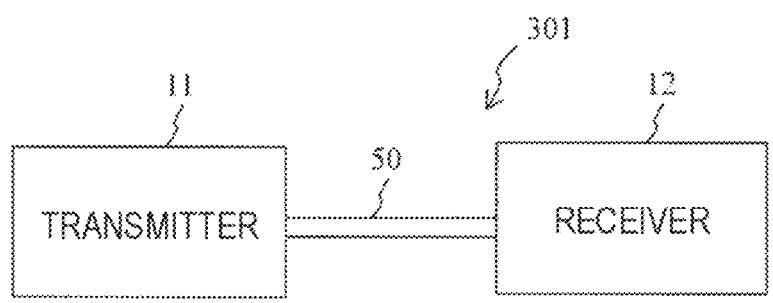
FIG. 50 is a diagram illustrating an optical communication system using the optical fiber according to the present invention as an optical transmission line.

FIG. 50 is a diagram illustrating an optical communication system 301 employing the MS-CPE transmission method. The optical communication system 301 includes a transmitter 11, a receiver 12, and an optical transmission line 50. The optical transmission line 50 is an optical cable including a single core optical fiber, a multicore optical fiber, an optical fiber ribbon in which a plurality of optical fibers (single mode) is arranged in parallel, or a plurality of optical fibers (single mode). In a case of the multicore optical fiber, one of the cores is a Master channel, and the other cores are Slave channels. In a case of the optical fiber ribbon and the optical cable, one of the optical fibers is the Master channel, and the other optical fibers are the Slave channels. In a case of the single core optical fiber, an arbitrary wavelength is the Master channel, and other wavelengths are the Slave channels.

It is known that the DSP processing time reaches about 1 μs. In order to effectively reduce the DSP processing time of the Slave channels by using the MS-CPE that uses the low delay signal disclosed in Non Patent Literature 3, it is desirable to set a signal arrival time difference between the low delay Master channel and the Slave channels in the receiver to 1 μs or more. Accordingly, when a signal arrival time difference between the Master and the Slave in the receiver is s (μs), a low delay Master channel group delay time $\tau_m$ (μs/km), a group delay time $\tau_s$ (μs/km) of the Slave channel, and a transmission system length (transmission path length) L (km), a requirement of $\tau_m$ is determined by Mathematical Expression (10).

[Mathematical Expression 10]

$$\tau_m < \tau_s - \frac{s}{L} \qquad (10)$$

If a group delay time difference between the slave channel and the master channel is $\Delta\tau$ (ns/km), Mathematical Expression (10) is expressed as follows.

[Mathematical Expression 11]

$$\Delta\tau = \tau_m - \tau_s < -\frac{S}{L} \qquad (11)$$

FIG. 1 is a diagram illustrating a calculation result of L dependency of $\Delta\tau$ when s=1 μs. It is possible to achieve MS-CPE using the low delay signal in a region having a smaller group delay time difference than the straight line in the drawing, that is, a lower region of the straight line. Here, $\Delta\tau$ is required to be −1.0 ns/km or less in a submarine optical communication system of 1000 km or more, and $\Delta\tau$ is required to be −3.4 ns/km or less in a land relay system of about 300 km or more.

First Embodiment

Figure 51:
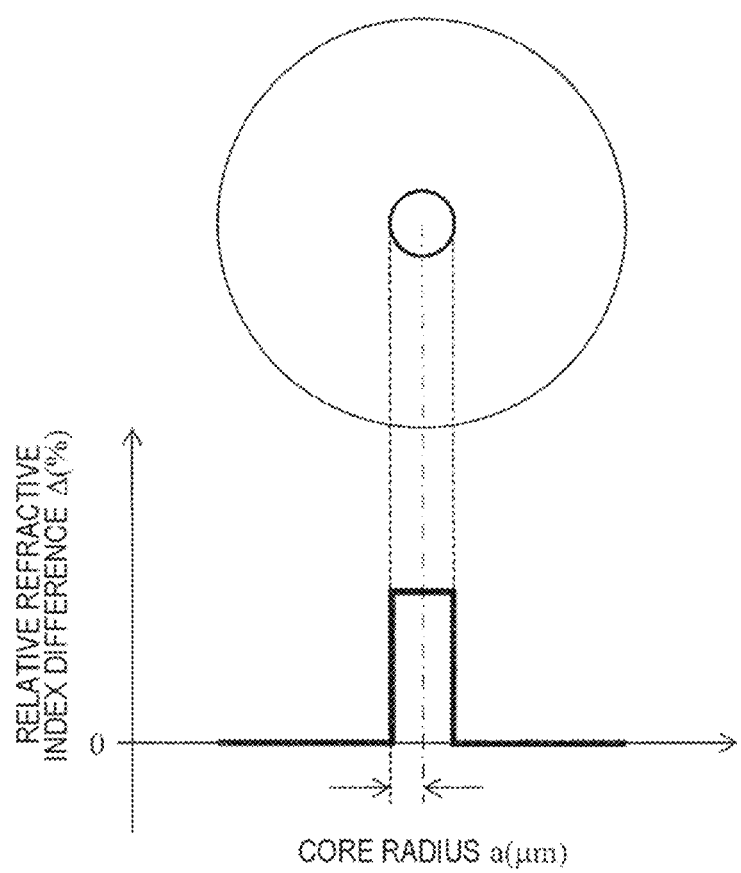
FIG. 51 is a diagram illustrating a refractive index distribution of an SI-type optical fiber.

In the present embodiment, a method of designing a core that achieves a low delay master channel in an optical fiber having an SI-type refractive index distribution structure suitable for the submarine optical communication system will be described. Here, the optical fiber is the optical transmission line 50 in FIG. 50, and the "core" refers to only one core in a case of the single core optical fiber, refers to any one core in a case of the multicore fiber, and refers to a core of any optical fiber included in a case of the optical fiber ribbon or the optical fiber cable. The SI type is a step index type refractive index distribution structure in FIG. 51. Although FIG. 51 illustrates the single core optical fiber, in a case of the multicore fiber, a similar refractive index distribution structure is included for each core.

Figure 2:
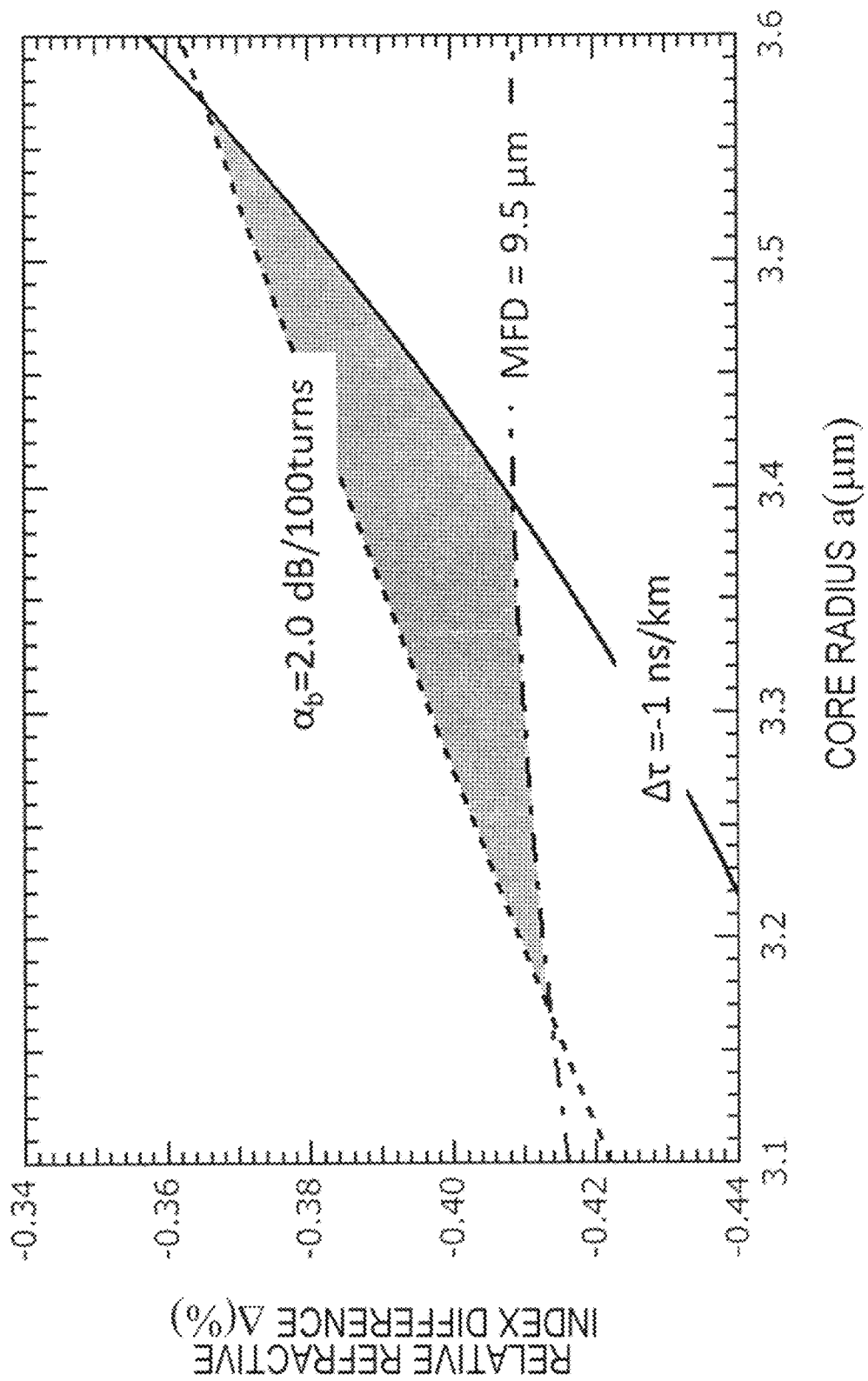
FIG. 2 is a diagram illustrating a basic configuration example of an SI-type low delay master channel suitable for a submarine optical communication system.

FIG. 2 is a diagram illustrating properties (the radius a and the relative refractive index difference Δ) required for the core of the master channel. The core is the pure silica glass and has a step index type (SI type) refractive index distribution.

Parameters are a bending loss ($\alpha_b$), a mode field diameter (MFD), and $\Delta\tau$ when a channel (group delay time $\tau_s$=4.88 μs/km) having properties equivalent to those of a general-purpose cut-off shift fiber (ITU-TG.654) is assumed for the slave channel. These are calculation results of the bending loss $\alpha_b$ and the MFD at a wavelength of 1.625 μm. A dashed line and a one dot chain line are boundary lines of a structure that achieves a typical bending loss recommendation value of 2.0 dB/100 tuns or less and the MFD of 9.5 μm or more in the international standard ITU-T G.654 for a long-distance transmission fiber. The structure of the grey region enclosed by these curves has optical properties suitable for a long-distance transmission line and enables $\Delta\tau$<−1.0 ns/km for general purpose cut-off shift fibers. In the present embodiment, a case where the slave channel is an SI-type optical fiber will be described, but the slave channel may be other than the SI-type optical fiber.

Note that a core structure in which $\alpha_b$ is 2.0 dB/100 turns is expressed by

[Mathematical Expression 12]

$$\Delta = -1.02 + 0.26a - 0.02a^2 \qquad (12)$$

a structure with MFD of 9.5 μm is expressed by

[Mathematical Expression 13]

$$\Delta = -1.05 + 0.37a - 0.05a^2 \qquad (13),$$

and a structure in which the group delay time difference $\Delta\tau$ is −1.0 ns/km is expressed by

[Mathematical Expression 14]

$$\Delta = 0.60 - 0.81a + 0.15a^2 \qquad (14).$$

Figure 3:
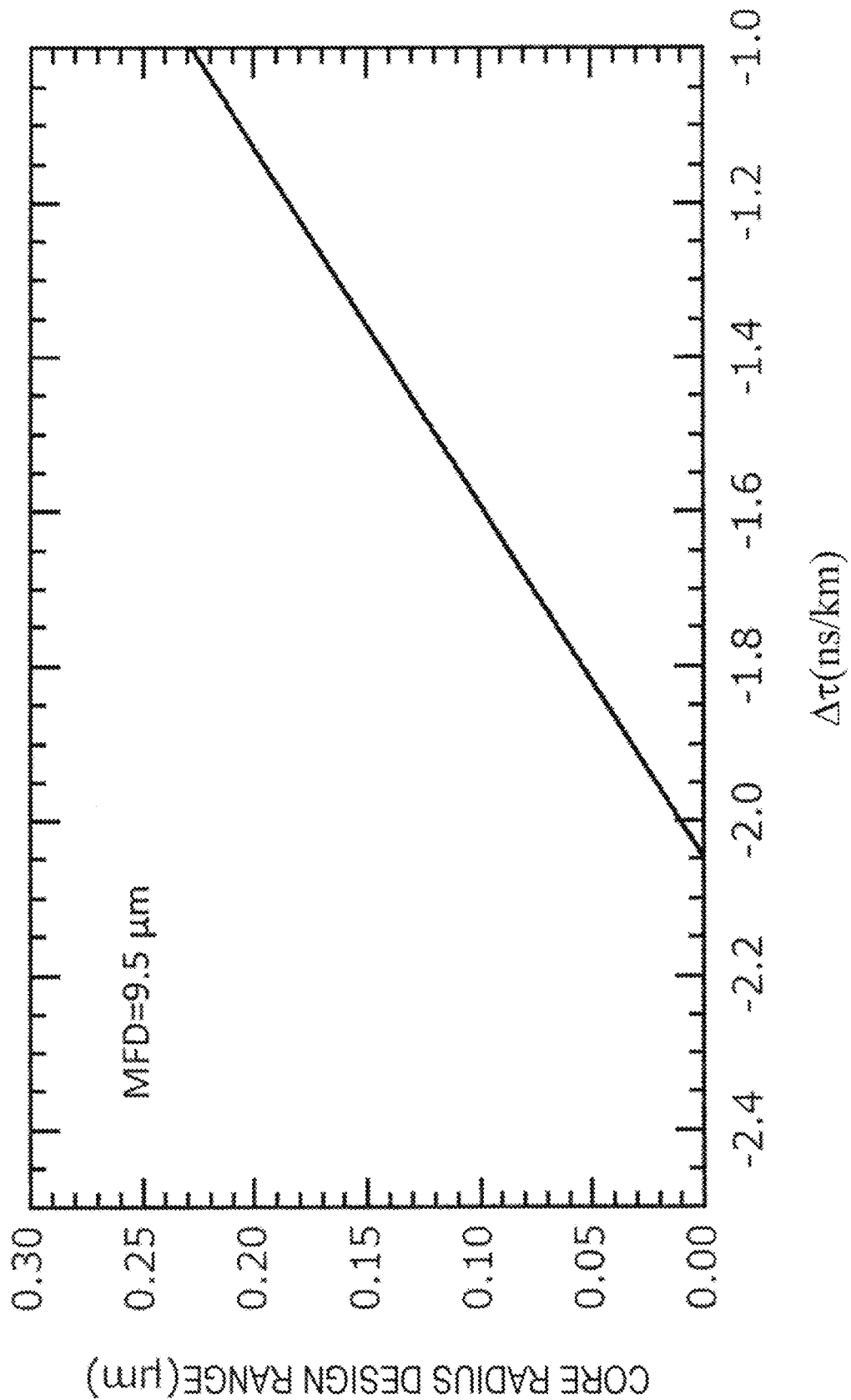
FIG. 3 is a diagram illustrating a designable range of a core radius for the SI-type low delay master channel suitable for the submarine optical communication system.

FIG. 3 is a diagram illustrating $\Delta\tau$ dependency of a design range of a core radius of the master channel. In this calculation, when a core radius of the structure that achieves MFD=9.5 μm and $\Delta\tau$=−1 ns/km is $a_{max}$, and the core radius of the structure that achieves MFD=9.5 μm and $\alpha_b$=2.0 dB/100 turns is $a_{min}$, $a_{max}-a_{min}$ is set as the design range of the core radius. As can be seen from FIG. 3, the range of a designable core radius decreases as $\Delta\tau$ decreases, and a designable structure disappears with $\Delta\tau$=−2 ns/km.

With respect to a core structure that achieves a delay time difference of $\Delta\tau$, a relational expression between Δ and a is expressed by

Figure 4:
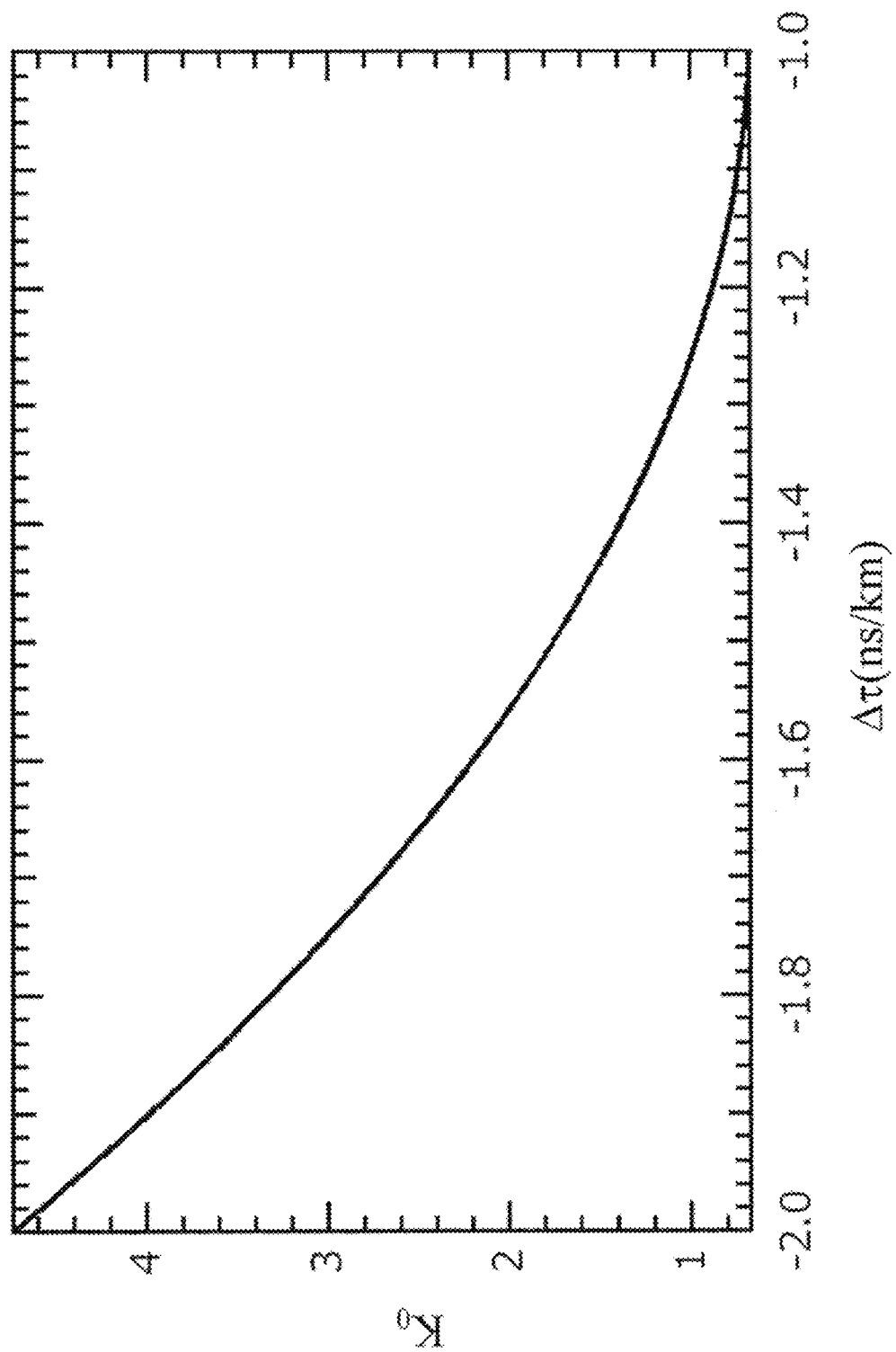
FIG. 4 is a diagram illustrating Δτ dependency of K0 for the SI-type low delay master channel suitable for the submarine optical communication system.

[Mathematical Expression 15]

$$\Delta = K_0 + K_1 a + K_2 a^2 \qquad (15)$$

using coefficients $K_0$, $K_1$, and $K_2$ that depend on $\Delta\tau$. From FIG. 4, $K_0$ is expressed by

Figure 5:
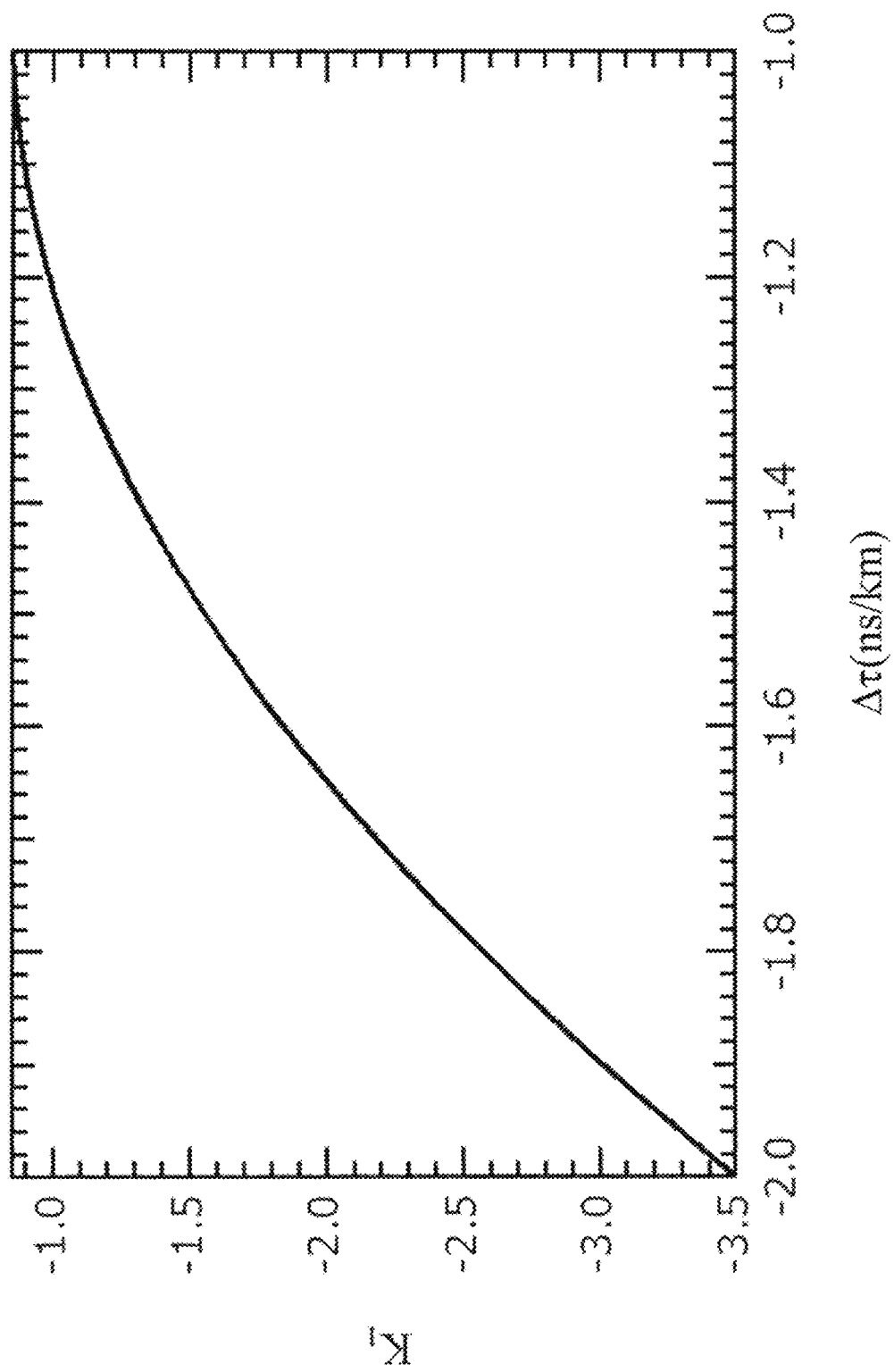
FIG. 5 is a diagram illustrating the Δτ dependency of K1 for the SI-type low delay master channel suitable for the submarine optical communication system.

[Mathematical Expression 16]

$$K_0 = 423 + 7.37\Delta\tau + 3.81\Delta\tau^2 \qquad (16)$$

using $\Delta T$ in the range of −2 ns/km<$\Delta\tau$<−1.0 ns/km. Similarly, from FIG. 5, $K_1$ is expressed by

Figure 6:
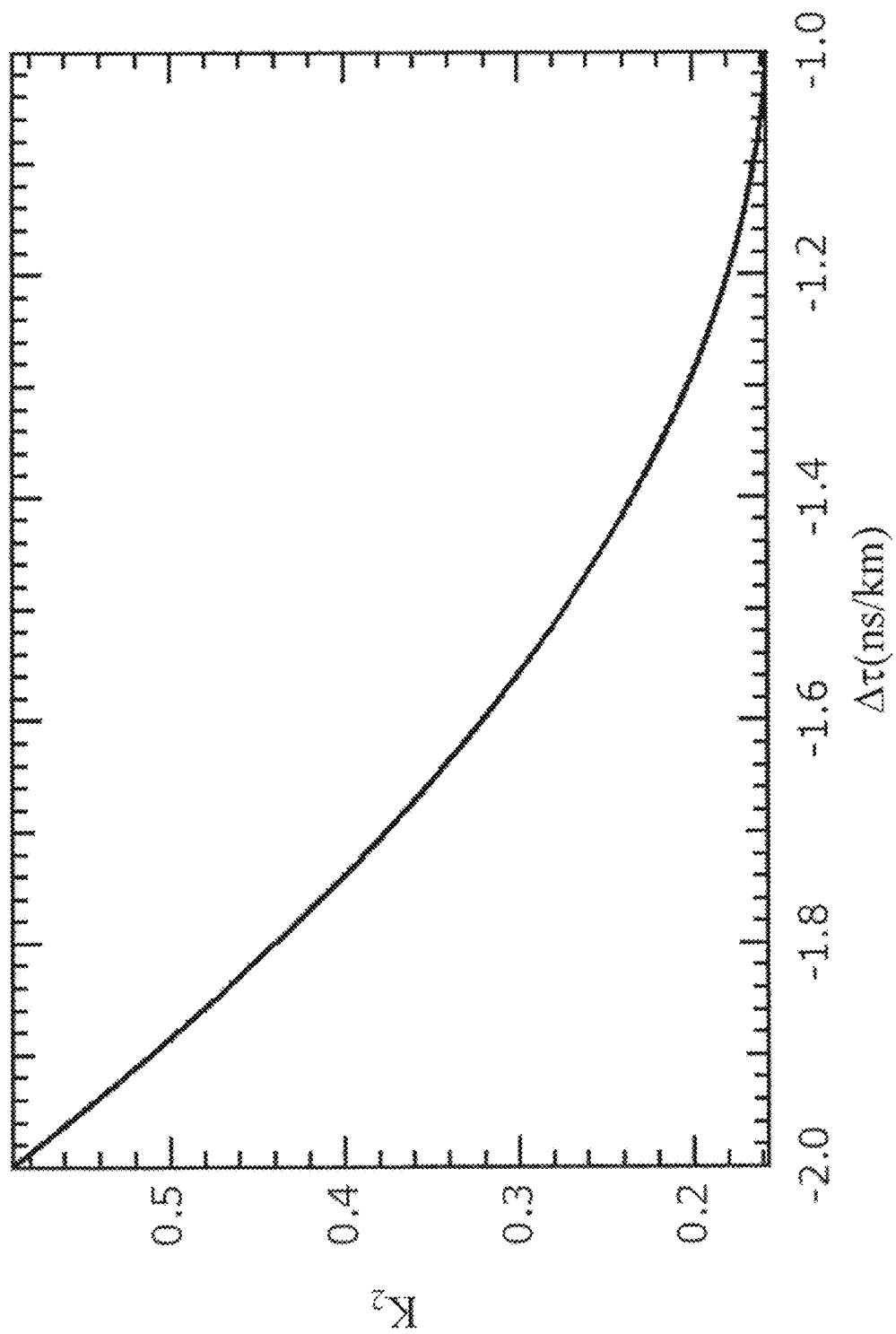
FIG. 6 is a diagram illustrating the Δτ dependency of K2 for the SI-type low delay master channel suitable for the submarine optical communication system.

[Mathematical Expression 17]

$$K_1 - 3.15 - 4.77\Delta\tau - 2.47\Delta\tau^2 \qquad (17)$$

using $\Delta\tau$ in the range of −2 ns/km<$\Delta\tau$<−1.0 ns/km. Similarly, from FIG. 6, K2 is expressed by

[Mathematical Expression 18]

$$K_2 = 0.52 + 0.77\Delta\tau + 0.40\Delta\tau^2 \qquad (18)$$

using $\Delta\tau$ in the range of −2 ns/km<$\Delta\tau$<−1.0 ns/km.

From the above, an SI-type pure quartz core fiber that satisfies

[Mathematical Expression 19]

$$-1.05 + 0.37a - 0.05a^2 < \Delta < -1.02 + 0.26a - 0.02a^2 \qquad (19)$$

and satisfies

[Mathematical Expression 20]

$$\Delta > 4.23 + 7.37\Delta\tau + 3.81\Delta\tau^2 - (3.15 + 4.77\Delta\tau + 2.47\Delta\tau 2)a + (0.52 + 0.77\Delta\tau + 0.40\tau^2)a^2 \qquad (20)$$

has optical properties suitable for the long-distance transmission line, and can achieve $\Delta\tau$ of −2.0 ns/km or more and −1.0 ns/km or less with respect to the slave channel corresponding to a general-purpose cut-off shift fiber. Therefore, the SI-type pure quartz core fiber satisfying Mathematical Expressions 19 and 20 can achieve MS-CPE using the low delay signal in the long-distance transmission line including the submarine optical communication system exceeding 1000 km.

Note that, in a case of the optical cable and the tape fiber, the "SI-type pure quartz core fiber" means an optical fiber used for the master channel, and the "cut-off shift fiber" means an optical fiber used for the slave channel. Further, in the case of the multicore optical fiber, as will be described later, the "SI-type pure quartz core fiber" means a core used for the master channel, and the "cut-off shift fiber" means a core used for the slave channel.

Second Embodiment

In the present embodiment, a method of designing a core that achieves the low delay master channel in an optical fiber having a W-type refractive index distribution structure suitable for the submarine optical communication system will be described.

Figure 52:
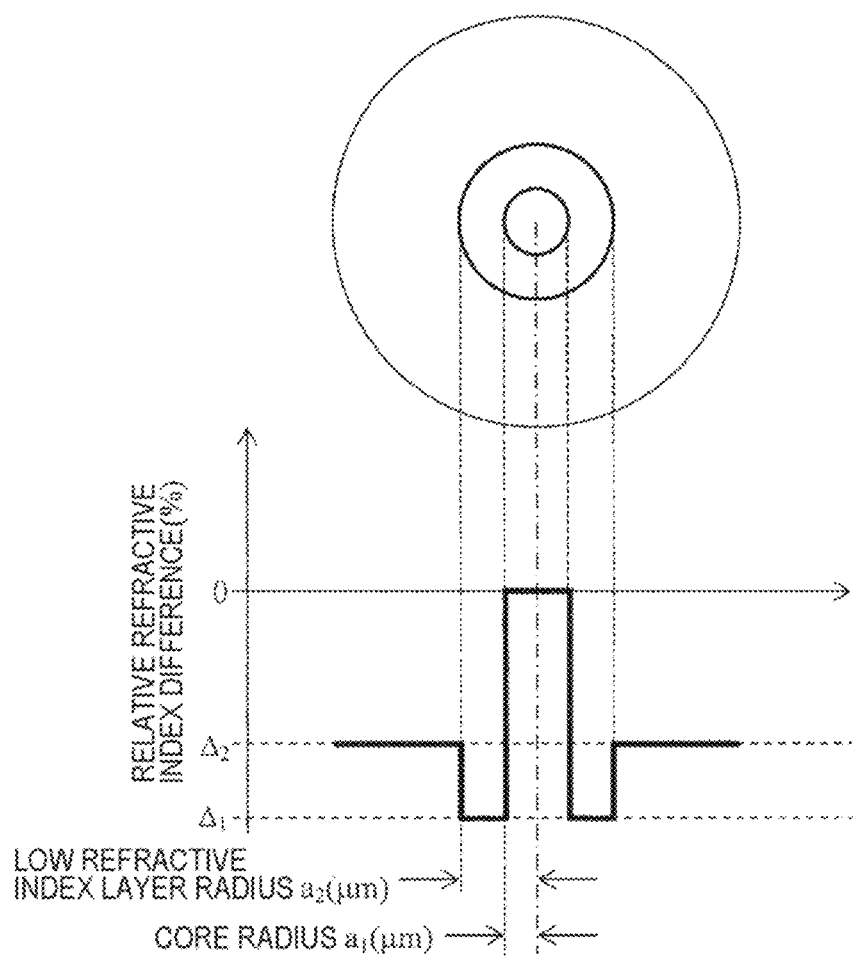
FIG. 52 is a diagram illustrating a refractive index distribution of a W-type optical fiber.

Here, the optical fiber is the optical transmission line 50 in FIG. 50, and the "core" refers to only one core in a case of the single core optical fiber, refers to any one core in a case of the multicore fiber, and refers to a core of any optical fiber included in a case of the optical fiber ribbon or the optical fiber cable. A W-type optical fiber is an optical fiber having a refractive index distribution structure illustrated in FIG. 52. Although FIG. 52 illustrates a single core optical fiber, in a case of the multicore fiber, a similar refractive index distribution structure is included for each core.

In a transmission path of several 1000 km class, an optical fiber having a W-type refractive index distribution having a low refractive index region around a core is often used. Here, considering application of the MS-CPE to the long-distance transmission line using the low delay Master channel, if a low delay channel is achieved by the W-type optical fiber, an existing manufacturing technology can be applied, which is preferable.

Figure 7:
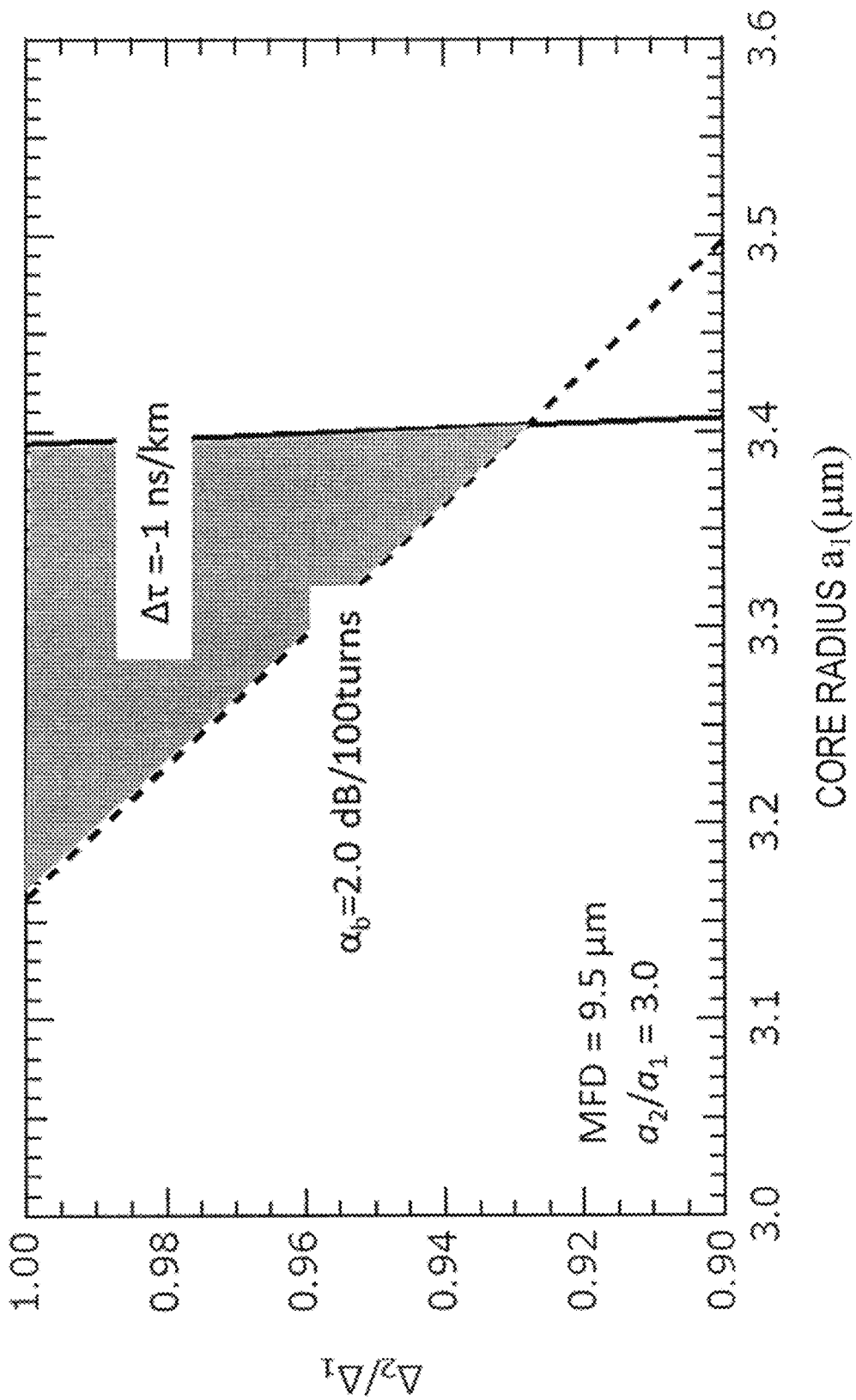
FIG. 7 is a diagram illustrating an example of a design region (MFD=9.5 μm) for a W-type low delay master channel suitable for the submarine optical communication system.

A ratio of the relative refractive index difference $\Delta_1$ of a low refractive index layer to a core refractive index and the relative refractive index difference $\Delta_2$ of a clad with respect to the core refractive index is defined as $\Delta_1/\Delta_2$. FIG. 7 is a diagram illustrating a calculation result of dependency of $\Delta_1/\Delta_2$ on a core radius $a_1$ when the bending loss is $\alpha_b=2.0$ dB/100 tuns and when the group delay time difference is $\Delta\tau=1.0$ ns/km. Here, like a general-purpose W-type optical fiber, a radius $a_2$ of the low refractive index layer is set to 3 times $a_1$, that is, $a_2=3a_1$, and $\Delta_1$ is adjusted so that MFD=9.5 μm is obtained in any structure.

A structure in which $\alpha_b$ is 2.0 dB/100 tuns or less is a structure in which $a_1$ is larger than the dashed line in the drawing, and a structure in which $\Delta\tau$ is 1.0 ns/km or more is a structure in which $a_1$ is smaller than the solid line in the drawing. Thus, the structure in which $\alpha_b$ is 2.0 dB/100 tuns or less and $\Delta\tau$ is 1.0 ns/km or more is the gray region in the drawing. Further, a structure in which $\alpha_b$ of the dashed line is 2.0 dB/100 tuns satisfies the relationship of

[Mathematical Expression 21]

$$\Delta_2/\Delta_1-1.95-0.30a_1 \tag{21}$$

using $\Delta_2/\Delta_1$ and $a_1$, and a structure in which $\Delta\tau$ of the solid line is 1.0 ns/km satisfies the following relationship.

[Mathematical Expression 22]

$$\Delta_2/\Delta_1=27.91-7.70a_1 \tag{22}$$

Figure 8:
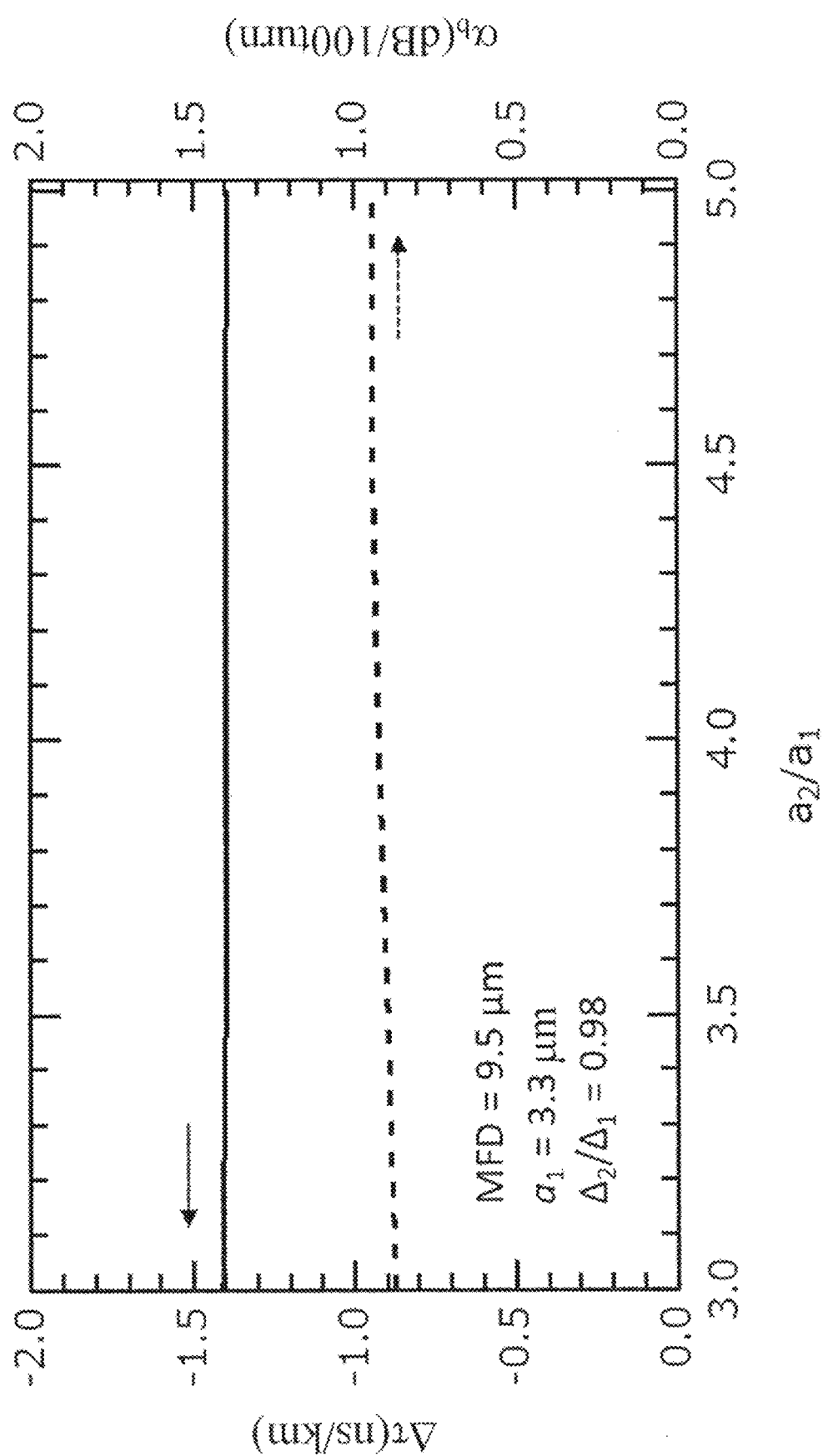
FIG. 8 is a diagram illustrating a2/a1 dependency of optical properties for the W-type low delay master channel suitable for the submarine optical communication system.

FIG. 8 is a diagram illustrating a calculation result of $a_2/a_1$ dependency of $\Delta\tau$ and $\alpha_b$ at $a_1=3.3$, $\Delta_2/\Delta_1=0.98$, and MFD=9.5 μm. The solid line indicates the group delay time difference $\Delta\tau$, and the dashed line indicates the bending loss $\alpha_b$. In the design region illustrated in FIG. 8, it can be said that there is no dependency on $a_2/a_1$.

Figure 9:
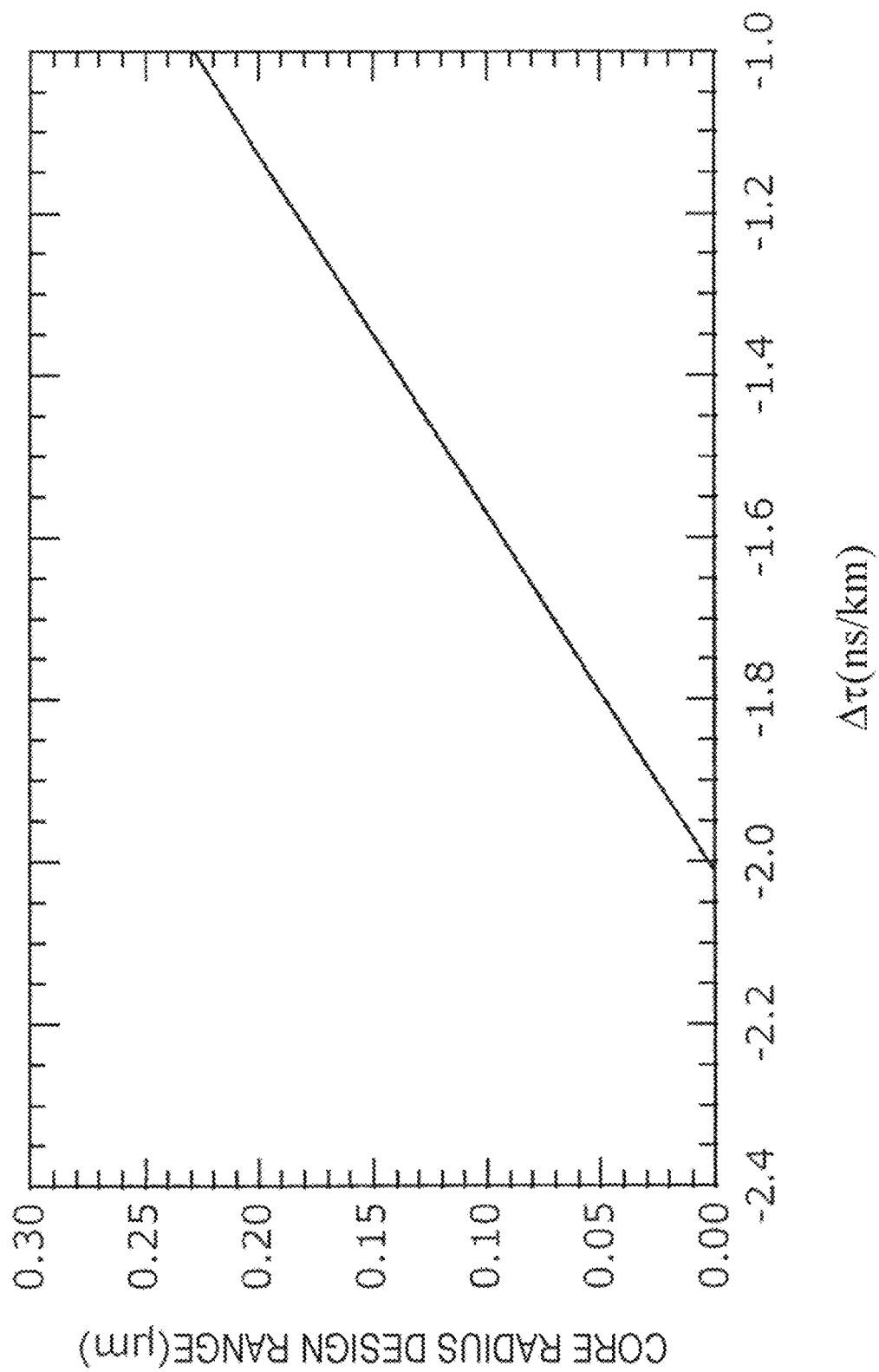
FIG. 9 is a diagram illustrating the designable range of the core radius for the W-type low delay master channel suitable for the submarine optical communication system.

FIG. 9 is a diagram illustrating the $\Delta\tau$ dependency of a designable range of the core radius. The MFD is set to 9.5 μm, and the designable range of the core radius is a core radius designable range with a largest $\Delta_2/\Delta_1$. As $\Delta\tau$ decreases, the core radius designable range decreases, and the design range disappears at −2.0 ns/km (0 μm).

Here, for the structure in which the group delay time difference is $\Delta\tau$, the relationship between $\Delta_2/\Delta_1$ and the radius $a_1$ is expressed as follows, for example.

[Mathematical Expression 23]

$$\Delta_2/\Delta_1=K_3+7.7a_1 \tag{23}$$

Figure 10:
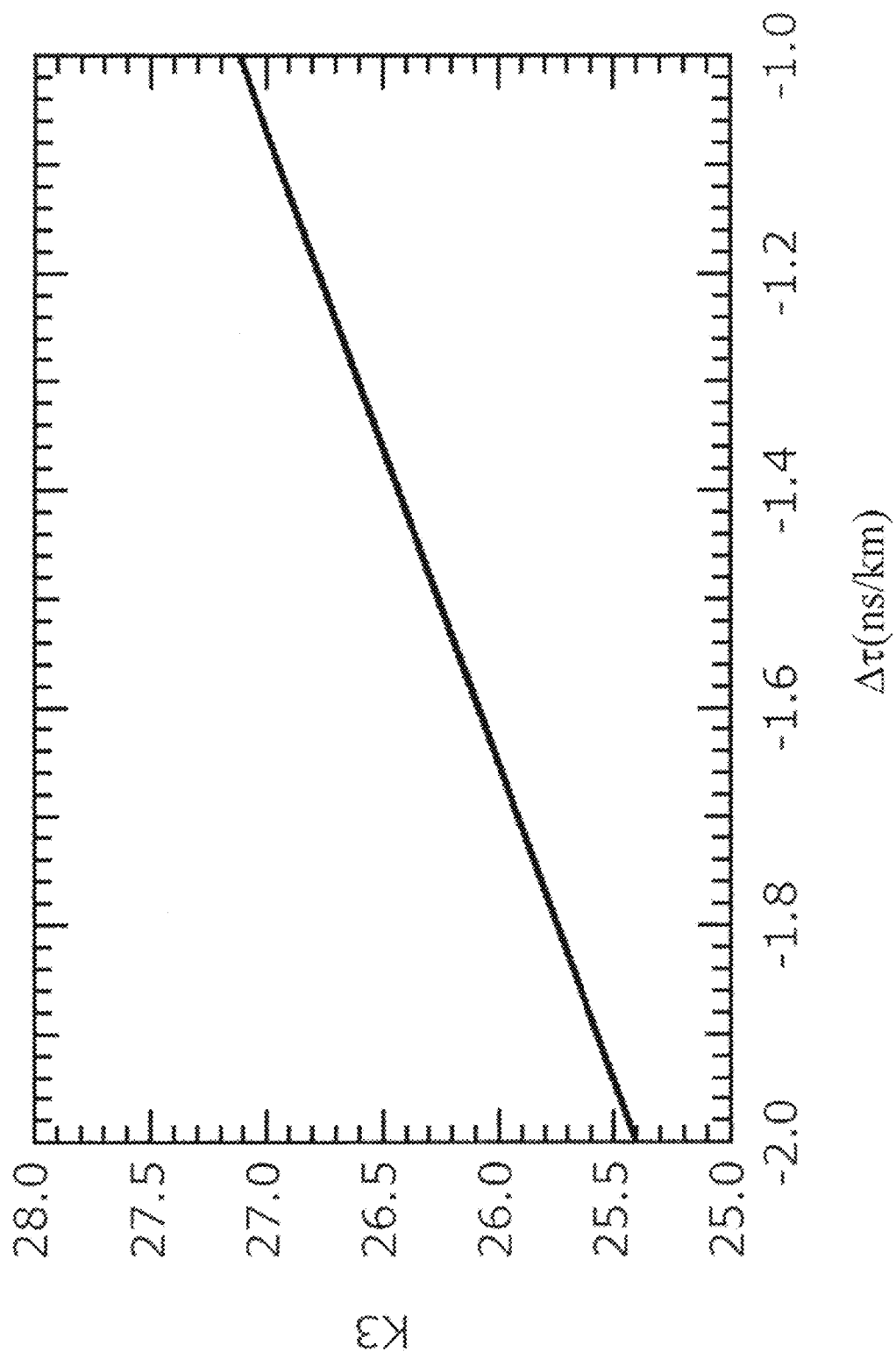
FIG. 10 is a diagram illustrating the Δτ dependency of K3 for the W-type low delay master channel suitable for the submarine optical communication system.

FIG. 10 is a diagram illustrating the $\Delta\tau$ dependency of $K_3$ in −2.0 ns/km<$\Delta\tau$<−1.0 ns/km when the MFD is 9.5 μm. Here, $K_3$ satisfies the following relationship.

[Mathematical Expression 24]

$$K_3=28.8+1.7\Delta\tau \tag{24}$$

By solving Mathematical Expression 21 for $a_1$, the smallest designable $a_1$ for $\Delta_2/\Delta_1$ is presented, and by substituting Mathematical Expression 24 into Mathematical Expression 23 and solving Mathematical Expression 23 for $a_1$, the largest designable $a_1$ for $\Delta_2/\Delta_1$ is presented. From the above, the W-type optical fiber having the pure quartz core satisfying the relationship of

[Mathematical Expression 25]

$$6.50-3.33(\Delta_2/\Delta_1)<a_1<0.13(\Delta_2/\Delta_1)-0.22\Delta\tau-3.74 \tag{25}$$

has optical properties suitable for the long-distance transmission line, and can achieve a group delay time reduction of $\Delta\tau$ or less with respect to the slave channel corresponding to the general-purpose cut-off shift fiber. Thus, a W-type pure quartz core fiber satisfying Mathematical Expression 25 can achieve MS-CPE using the low delay signal in the long-distance transmission line including the submarine optical communication system exceeding 1000 km. In the present embodiment, a case where the slave channel is the SI-type optical fiber will be described, but the slave channel may be other than the SI-type optical fiber.

Note that, in a case of the optical cable and the tape fiber, the "W-type pure quartz core fiber" means the optical fiber used for the master channel, and the "cut-off shift fiber" means the optical fiber used for the slave channel. Further, in the case of the multicore optical fiber, the "W-type pure quartz core fiber" means the core used for the master channel, and the "cut-off shift fiber" means the core used for the slave channel.

Figure 11:
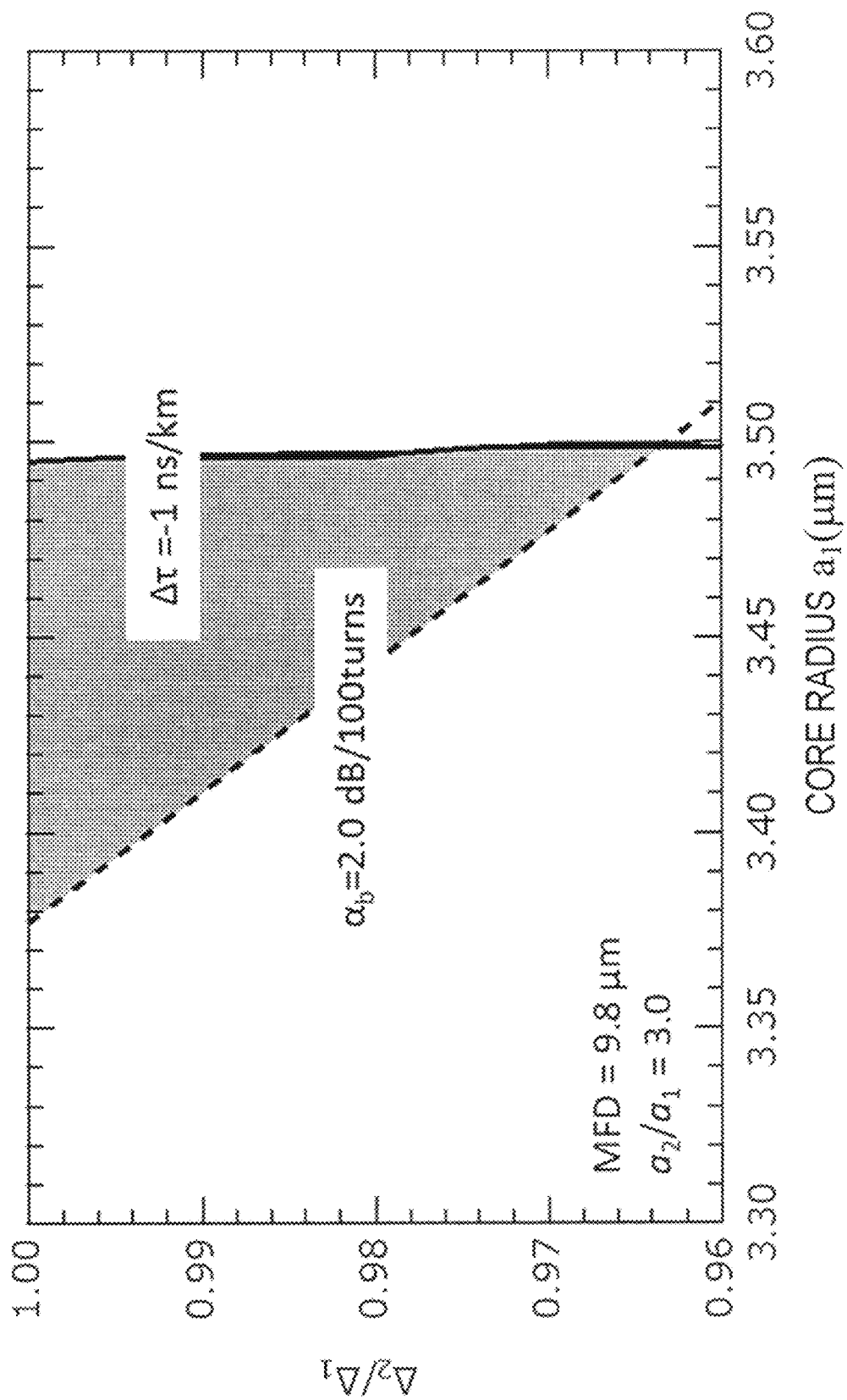
FIG. 11 is a diagram illustrating an example of a design region (MFD=9.8 μm) for the W-type low delay master channel suitable for the submarine optical communication system.

FIG. 11 is a diagram illustrating a calculation result of the dependency of $\Delta_1/\Delta_2$ on the core radius $a_1$ when the bending loss is $\alpha_b=2.0$ dB/100 tuns and when the group delay time difference is $\Delta\tau=1.0$ ns/km. Here, $a_2=3a_1$ is set as in FIG. 7. In the drawing, MFD=9.8 μm.

The structure in which $\alpha_b$ is 2.0 dB/100 tuns or less is a structure in which $a_1$ is larger than the dashed line in the drawing, and a structure in which $\Delta\tau$ is 1.0 ns/km or more is a structure in which $a_1$ is smaller than the solid line in the drawing. Thus, the structure in which $\alpha_b$ is 2.0 dB/100 tuns or less and $\Delta\tau$ is 1.0 ns/km or more is the gray region in the drawing. Further, the structure in which $\alpha_b$ of the dashed line is 2.0 dB/100 tuns satisfies the relationship of

[Mathematical Expression 26]

$$\Delta_2/\Delta_1 = 2.01 - 0.30 a_1 \qquad (26)$$

using $\Delta_2/\Delta_1$ and $a_1$, and the structure in which $\Delta\tau$ of the solid line is 1.0 ns/km satisfies

[Mathematical Expression 27]

$$\Delta_2/\Delta_1 = 27.91 - 7.70 a_1 \qquad (27).$$

Figure 12:
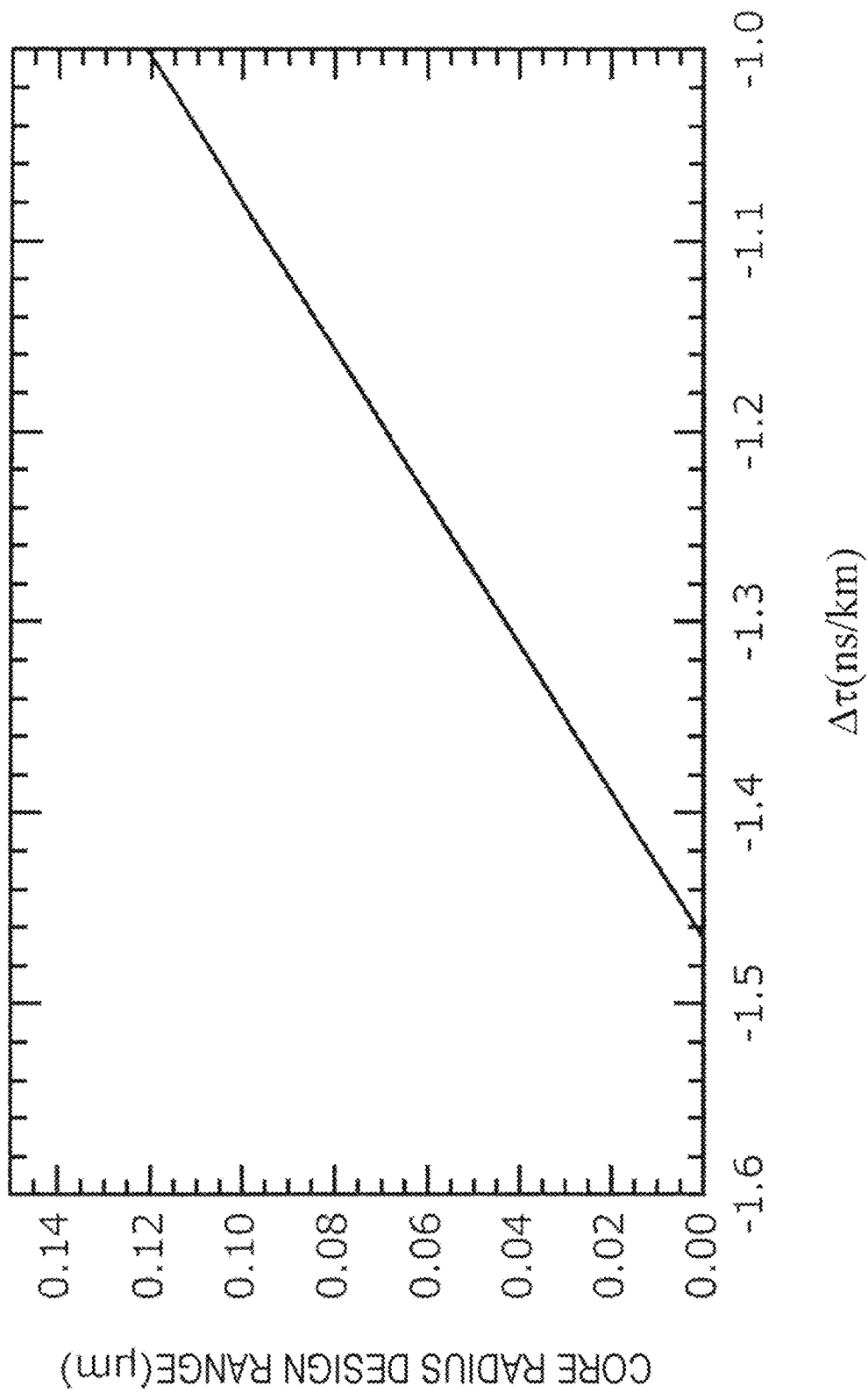
FIG. 12 is a diagram illustrating the designable range of the core radius for the W-type low delay master channel suitable for the submarine optical communication system.

FIG. 12 is a diagram illustrating the $\Delta\tau$ dependency of the designable range of the core radius. The MFD is set to 9.8 μm, and the designable range of the core radius is the core radius designable range with the largest $\Delta_2/\Delta_1$. As $\Delta\tau$ decreases, the designable range of the core radius decreases, and the design range disappears (becomes 0 μm) at −1.46 ns/km.

Here, for the structure in which the group delay time difference is $\Delta\tau$, the relationship between $\Delta_2/\Delta_1$ and the radius $a_1$ is expressed as follows.

[Mathematical Expression 28]

$$\Delta_2/\Delta_1 = K_4 + 7.7a \qquad (28)$$

Figure 13:
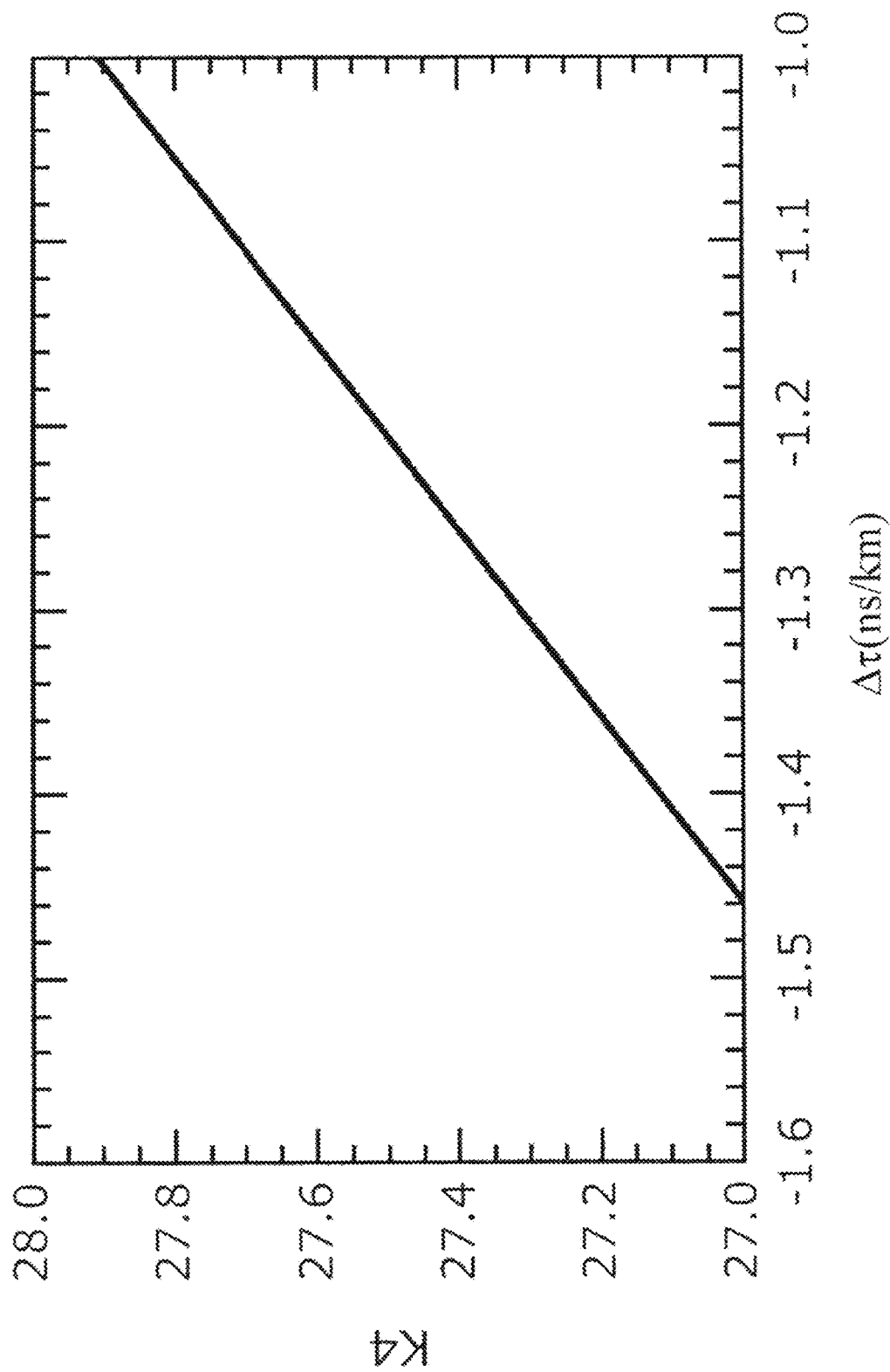
FIG. 13 is a diagram illustrating the Δτ dependency of K4 for the W-type low delay master channel suitable for the submarine optical communication system.

FIG. 13 is a diagram illustrating the $\Delta\tau$ dependency of $K_4$ in −1.46 ns/km<$\Delta\tau$<−1.0 ns/km when the MFD is 9.8 μm. Here, K4 satisfies the following relationship.

[Mathematical Expression 29]

$$K_4 = 29.9 + 2.0\Delta\tau \qquad (29)$$

By solving Mathematical Expression 26 for $a_1$, the smallest designable $a_1$ for $\Delta_2/\Delta_1$ is presented, and by substituting Mathematical Expression 29 into Mathematical Expression 28 and solving Mathematical Expression 29 for $a_1$, the largest designable $a_1$ for $\Delta_2/\Delta_1$ is presented. From the above, the W-type optical fiber having the pure quartz core satisfying the relationship of

[Mathematical Expression 30]

$$6.70 - 3.33(\Delta_2/\Delta_1) < a_1 0.13(\Delta_2/\Delta_1) - 0.26\Delta\tau - 3.88 \qquad (30)$$

has optical properties suitable for the long-distance transmission line, and can achieve the group delay time reduction of $\Delta\tau$ or less with respect to the slave channel corresponding to the general-purpose cut-off shift fiber. Thus, the W-type pure quartz core fiber satisfying Mathematical Expression 30 can achieve MS-CPE using the low delay signal in the long-distance transmission line including the submarine optical communication system exceeding 1000 km. In the present embodiment, a case where the slave channel is the SI-type optical fiber will be described, but the slave channel may be other than the SI-type optical fiber.

Note that, in the case of the optical cable and the tape fiber, the "W-type pure quartz core fiber" means the optical fiber used for the master channel, and the "cut-off shift fiber" means the optical fiber used for the slave channel. Further, in the case of the multicore optical fiber, the "W-type pure quartz core fiber" means the core used for the master channel, and the "cut-off shift fiber" means the core used for the slave channel.

Figure 14:
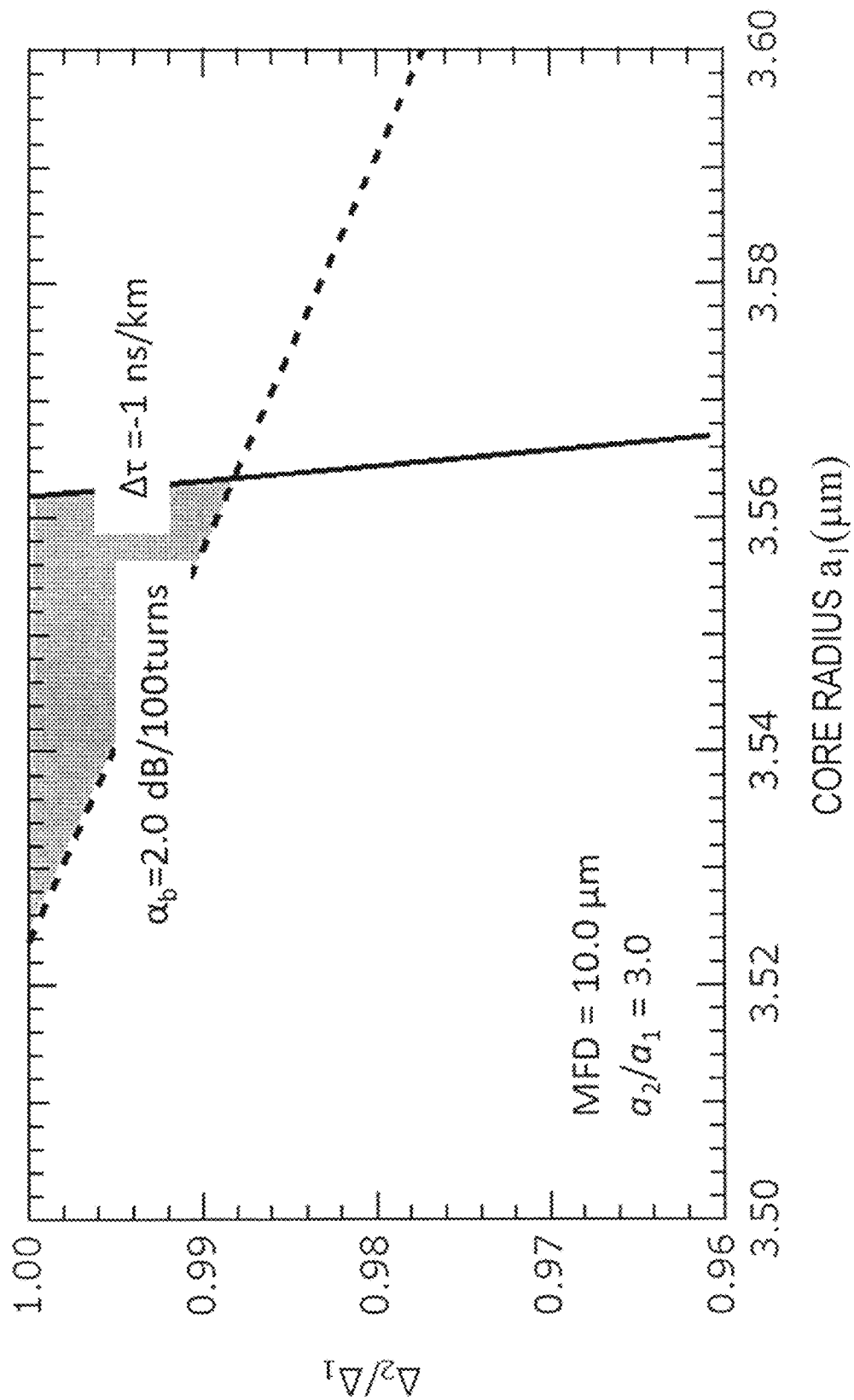
FIG. 14 is a diagram illustrating an example of a design region (MFD=10.0 μm) for the W-type low delay master channel suitable for the submarine optical communication system.
Figure 15:
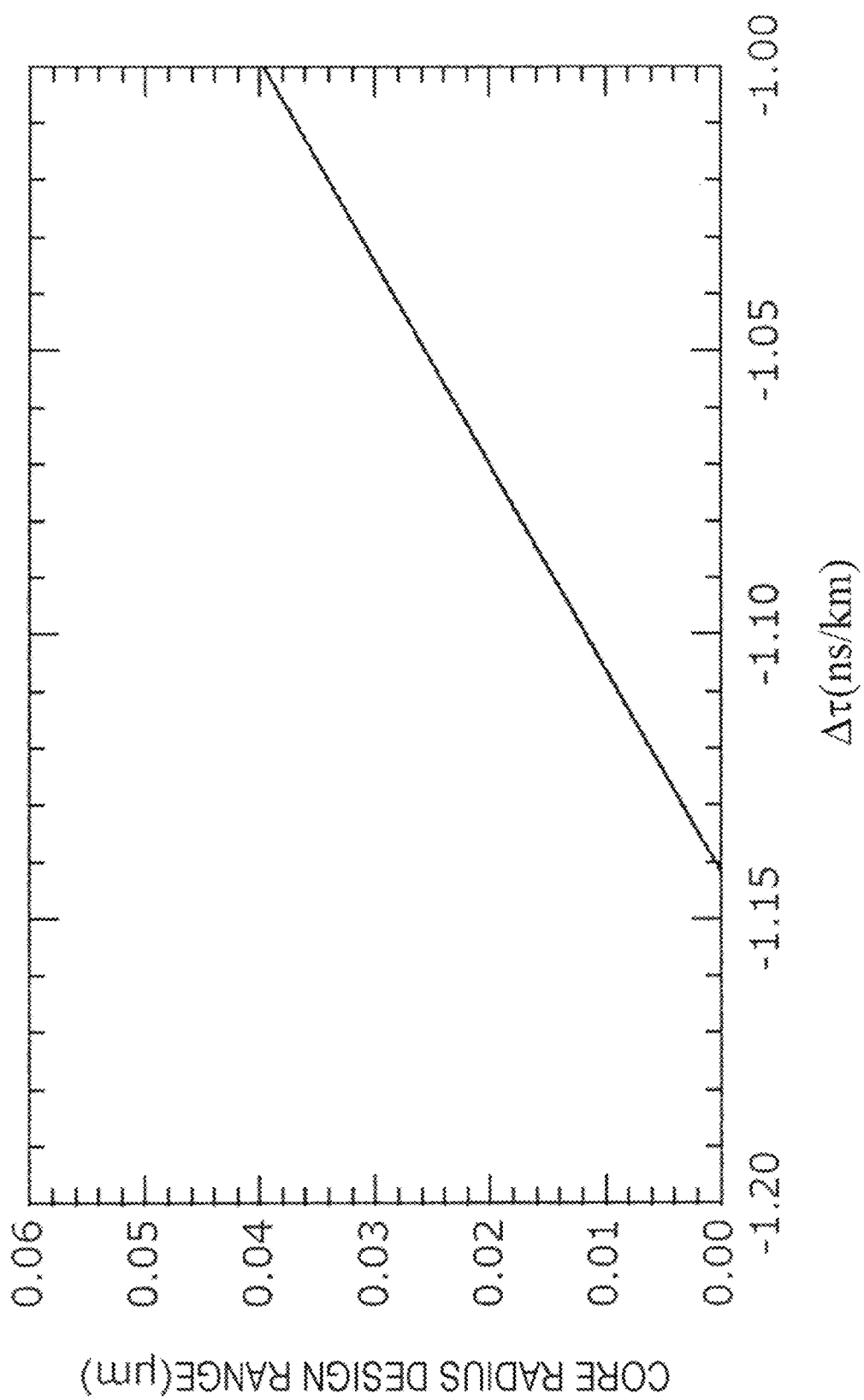
FIG. 15 is a diagram illustrating the designable range of the core radius for the W-type low delay master channel suitable for the submarine optical communication system.

FIG. 14 is a diagram illustrating a calculation result of the dependency of $\Delta_1/\Delta_2$ on the core radius $a_1$ when the bending loss is $\alpha_b$=2.0 dB/100 tuns and when the group delay time difference is $\Delta\tau$=1.0 ns/km. Here, $a_2$=3$a_1$ is set as in FIG. 7. In the drawing, MFD=10.0 μm.

The structure in which $\alpha_b$ is 2.0 dB/100 tuns or less is a structure in which $a_1$ is larger than the dashed line in the drawing, and a structure in which $\Delta\tau$ is 1.0 ns/km or more is a structure in which $a_1$ is smaller than the solid line in the drawing. Thus, the structure in which $\alpha_b$ is 2.0 dB/100 tuns or less and $\Delta\tau$ is 1.0 ns/km or more is the gray region in the drawing. Further, the structure in which $\alpha_b$ of the dashed line is 2.0 dB/100 tuns satisfies the relationship of

[Mathematical Expression 31]

$$\Delta_2/\Delta_1 = 2.05 - 0.30 a_1 \qquad (31)$$

using $\Delta_2/\Delta_1$ and $a_1$, and the structure in which $\Delta\tau$ of the solid line is 1.0 ns/km satisfies

[Mathematical Expression 32]

$$\Delta_2/\Delta_1 = 28.42 - 7.70 a_1 \qquad (32).$$

FIG. 12 is a diagram illustrating the $\Delta\tau$ dependency of the designable range of the core radius. The MFD is set to 10.0 μm, and the designable range of the core radius is the core radius designable range with the largest $\Delta_2/\Delta_1$. As $\Delta\tau$ decreases, the designable range of the core radius decreases, and the design range disappears at −1.14 ns/km (0 μm).

Here, for the structure in which the group delay time difference is $\Delta\tau$, the relationship between $\Delta_2/\Delta_1$ and the radius $a_1$ is expressed as follows.

[Mathematical Expression 33]

$$\Delta_2/\Delta_1 = K_5 + 7.7a \qquad (33)$$

Figure 16:
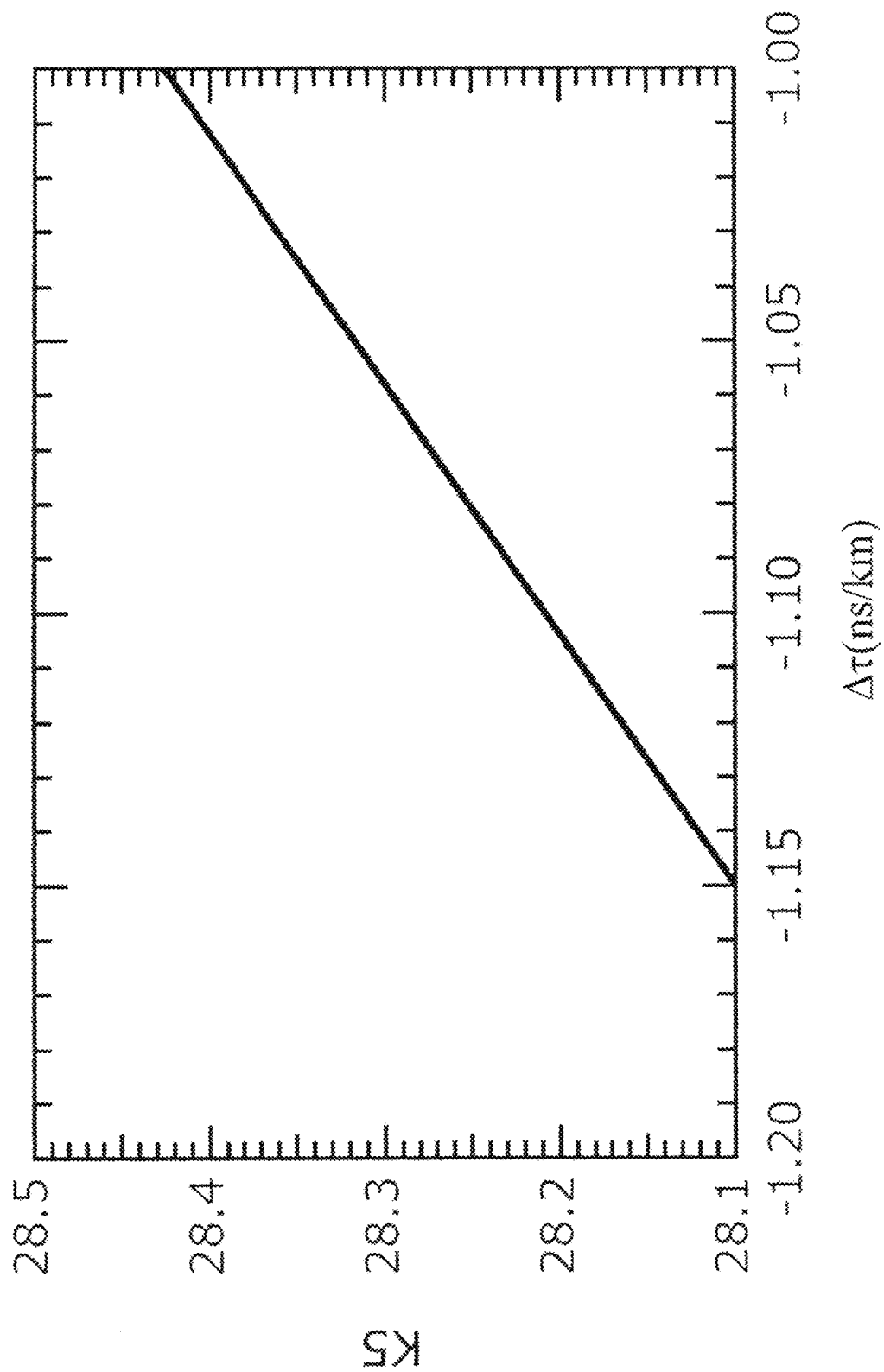
FIG. 16 is a diagram illustrating the Δτ dependency of K5 for the W-type low delay master channel suitable for the submarine optical communication system.

FIG. 16 is a diagram illustrating the $\Delta\tau$ dependency of $K_5$ in −1.14 ns/km<$\Delta\tau$<−1.0 ns/km when the MFD is 10.0 μm. Here, $K_5$ satisfies the following relationship.

[Mathematical Expression 34]

$$K_5 30.6 \pm 2.2\Delta\tau \qquad (34)$$

By solving Mathematical Expression 31 for $a_1$, the smallest designable $a_1$ for $\Delta_2/\Delta_1$ is presented, and by substituting Mathematical Expression 34 into Mathematical Expression 33 and solving Mathematical Expression 33 for $a_1$, the largest designable $a_1$ for $\Delta_2/\Delta_1$ is presented. From the above, the W-type optical fiber having the pure quartz core satisfying the relationship of

[Mathematical Expression 35]

$$6.83 - 3.33(\Delta_2/\Delta_1) < a_1 < 0.13(\Delta_2/\Delta_1) - 0.29\Delta\tau - 3.94 \qquad (35)$$

has optical properties suitable for the long-distance transmission line, and can achieve the group delay time reduction of $\Delta\tau$ or less with respect to the slave channel corresponding to the general-purpose cut-off shift fiber. Thus, the W-type pure quartz core fiber satisfying Mathematical Expression 35 can achieve MS-CPE using the low delay signal in the long-distance transmission line including the submarine optical communication system exceeding 1000 km. In the present embodiment, a case where the slave channel is the SI-type optical fiber will be described, but the slave channel may be other than the SI-type optical fiber.

Note that, in the case of the optical cable and the tape fiber, the "W-type pure quartz core fiber" means the optical fiber used for the master channel, and the "cut-off shift fiber" means the optical fiber used for the slave channel. Further, in the case of the multicore optical fiber, the "W-type pure quartz core fiber" means the core used for the master channel, and the "cut-off shift fiber" means the core used for the slave channel.

Figure 17:
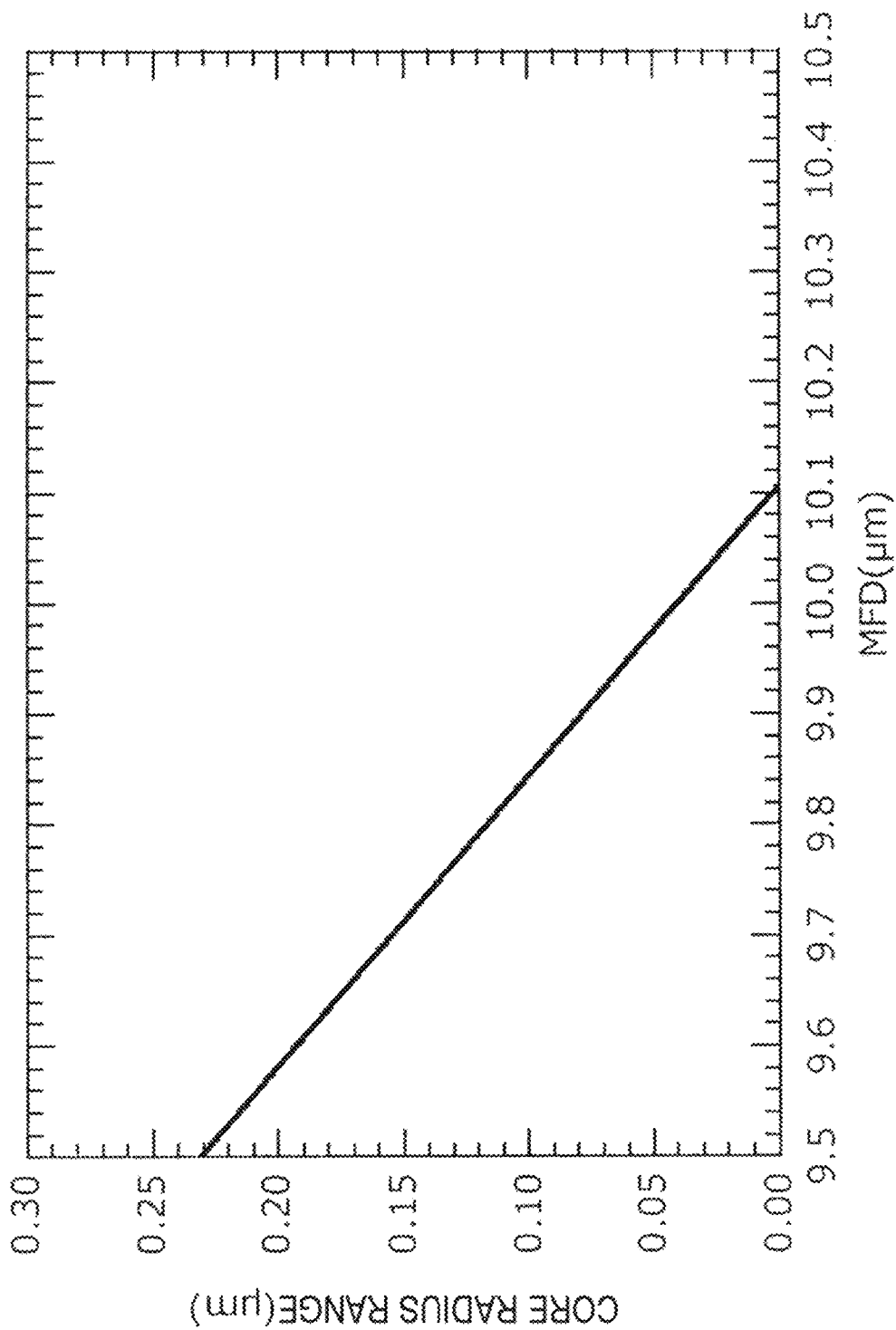
FIG. 17 is a diagram illustrating the designable range of the core radius for the W-type low delay master channel suitable for the submarine optical communication system.
Figure 18:
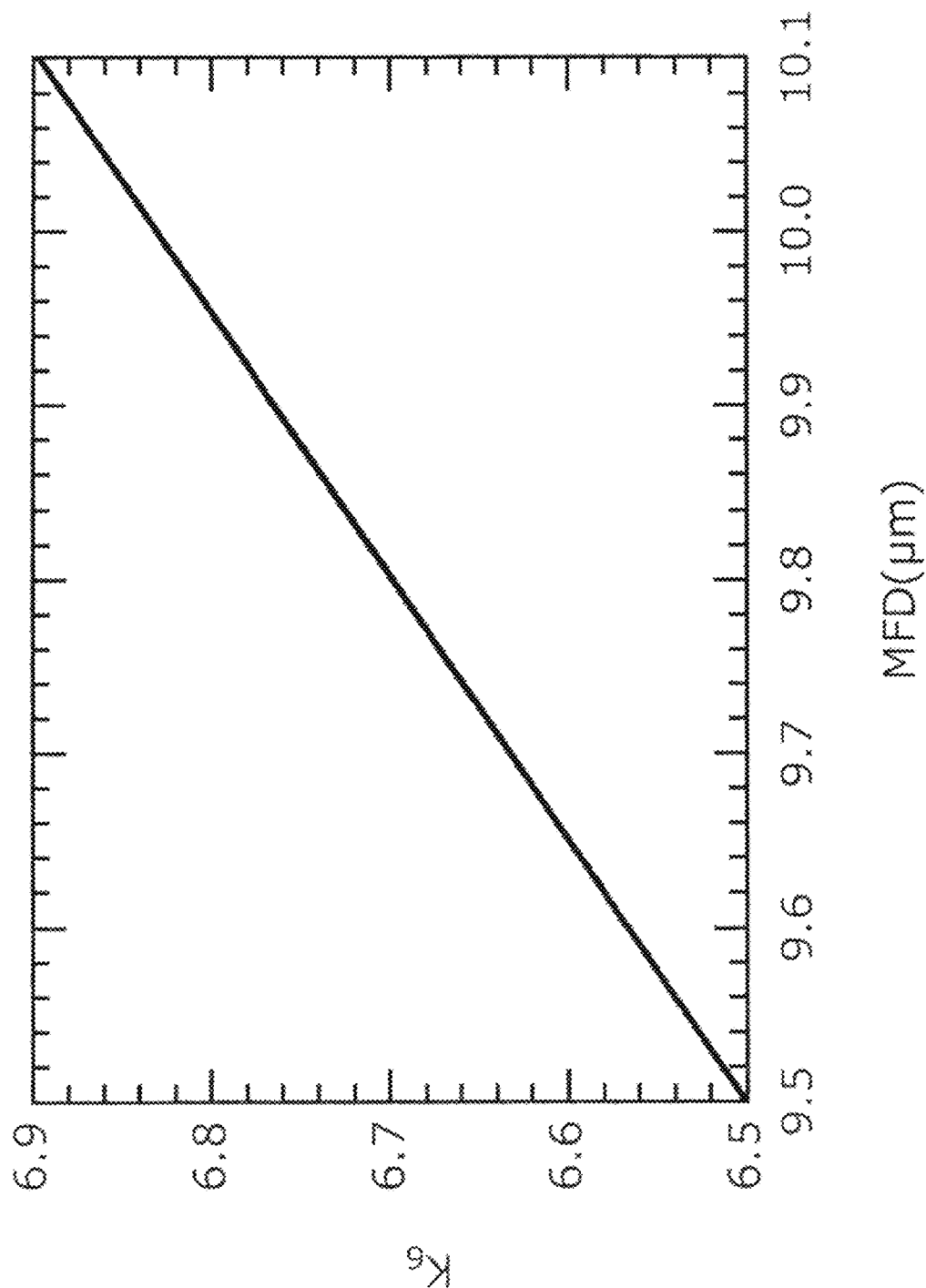
FIG. 18 is a diagram illustrating MFD dependency of K6 for the W-type low delay master channel suitable for the submarine optical communication system.

FIG. 17 is a diagram illustrating MFD dependency of the designable range of the core radius $a_1$. $\Delta_2/\Delta_1=1.00$ is set, and in the core radius designable range, the bending loss $\alpha_b$ is 2.0 dB/100 tuns or less and $\Delta\tau$ is 1.0 ns/km or more. As the MFD increases, the designable range of the core radius decreases. When the MFD is 10.1 µm, the core radius design range satisfying $\alpha_b$ of 2.0 dB/100 tuns or less and $\Delta\tau$ of 1.0 ns/km or less disappears (becomes 0 µm). Therefore, the MFD can be designed to be 9.5 µm or more and 10.1 µm or less.

Here, the design lower limit of the core radius $a_1$ in Mathematical Expressions 17, 22, and 27 is expressed by

[Mathematical Expression 36]

$$a_1 = K_6 - 0.33(\Delta_2/\Delta_1) \quad (36)$$

using a coefficient K6 depending on the MFD. FIG. 17 is a diagram describing the MFD dependency of K6. The dependency can be expressed by

[Mathematical Expression 37]

$$K_6 = 0.23 + 0.66 \text{MFD} \quad (37).$$

Similarly, the design upper limit of the core radius $a_1$ in Mathematical Expressions 25, 30, and 35 is expressed by

Figure 19:
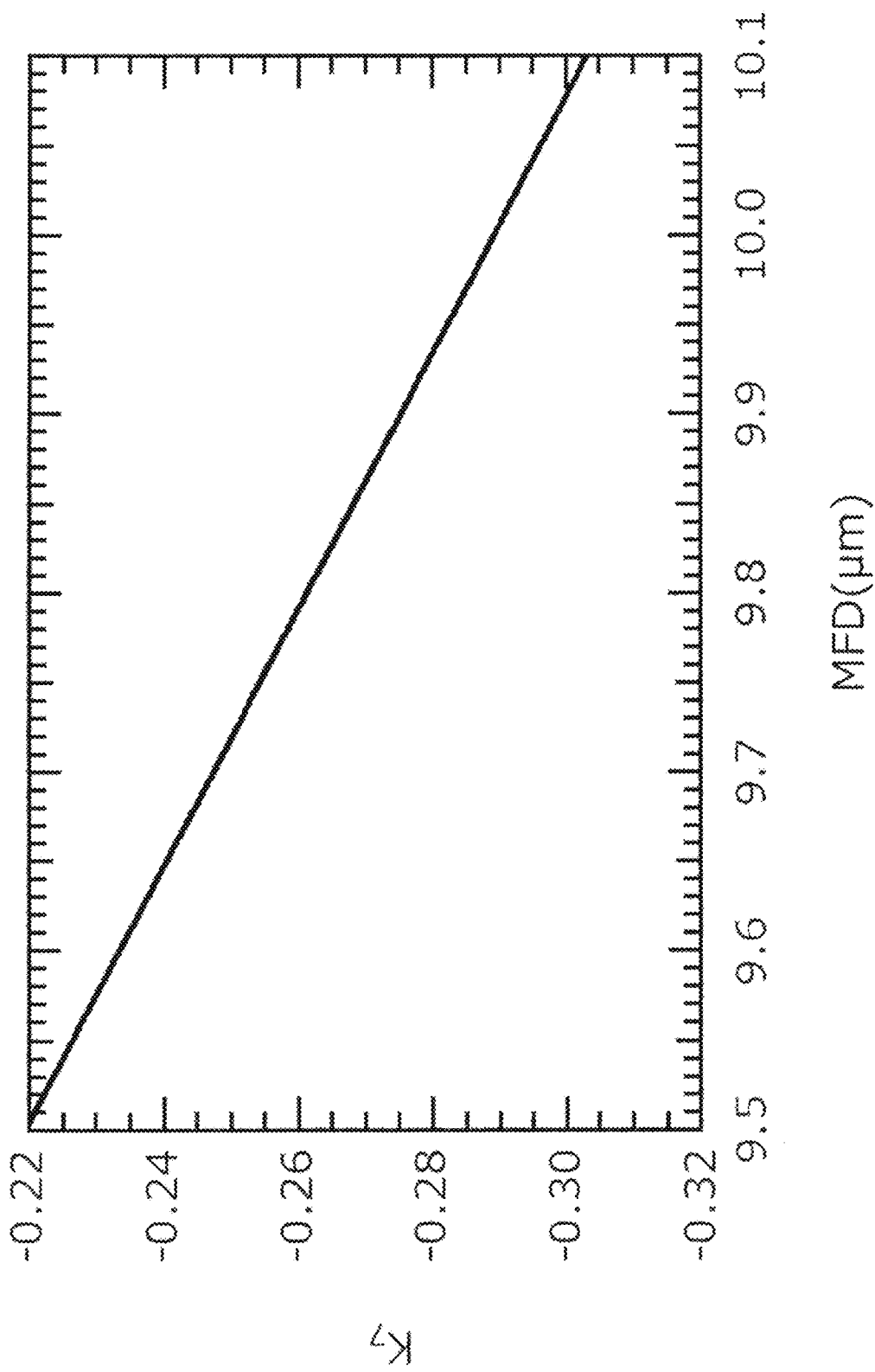
FIG. 19 is a diagram illustrating the MFD dependency of K7 for the W-type low delay master channel suitable for the submarine optical communication system.

[Mathematical Expression 38]

$$a_1 = 0.13(\Delta_2/\Delta_1) + K_7\Delta\tau + K_8 \quad (38)$$

using coefficients K7 and K8 depending on the MFD. FIG. 19 is a diagram illustrating the MFD dependency of $K_7$. The dependency can be expressed by

[Mathematical Expression 39]

$$K_7 = 1.11 - 0.14 \text{MFD} \quad (39).$$

Figure 20:
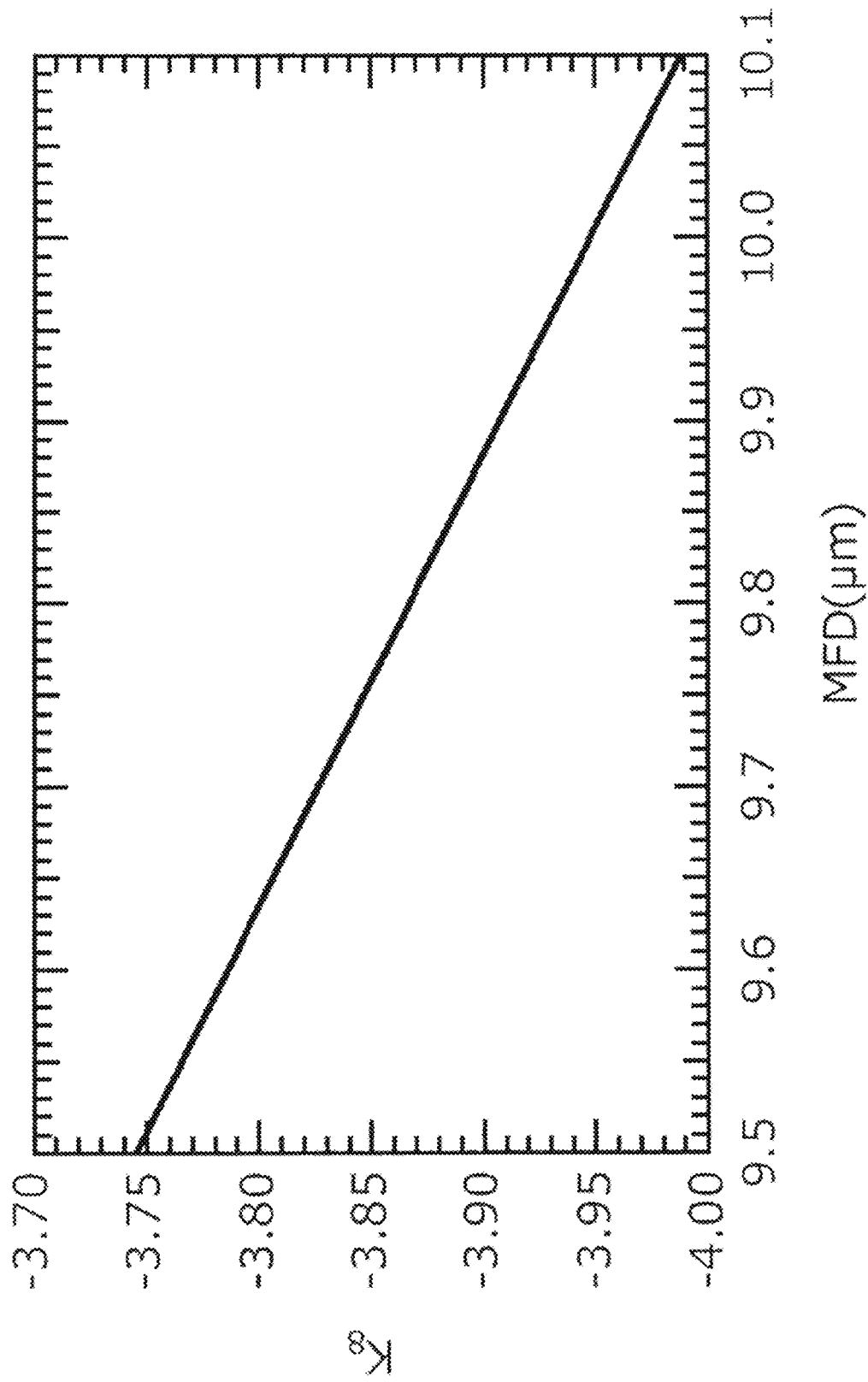
FIG. 20 is a diagram illustrating the MFD dependency of K8 for the W-type low delay master channel suitable for the submarine optical communication system.

Further, FIG. 20 is a diagram illustrating the MFD dependency of $K_8$. The dependency can be expressed by

[Mathematical Expression 40]

$$K_8 = 0.10 - 0.41 \text{MFD} \quad (40).$$

From the above, the W-type optical fiber having the pure quartz core satisfying the relationship of

[Mathematical Expression 41]

$$0.23+0.66\text{MFD}-3.33(\Delta_2/\Delta_1)<a_1<0.13(\Delta_2/\Delta_1)+(1.11-0.14\text{MFD})\Delta\tau+0.10-0.41\text{MFD} \quad (41)$$

when the MFD is 9.5 µm to 10.1 µm has optical properties suitable for the long-distance transmission line, and can achieve the group delay time reduction of $\Delta\tau$ or less with respect to the slave channel corresponding to the general-purpose cut-off shift fiber. Thus, the W-type pure quartz core fiber satisfying Mathematical Expression 35 can achieve MS-CPE using the low delay signal in the long-distance transmission line including the submarine optical communication system exceeding 1000 km. In the present embodiment, a case where the slave channel is the SI-type optical fiber will be described, but the slave channel may be other than the SI-type optical fiber.

Note that, in the case of the optical cable and the tape fiber, the "W-type pure quartz core fiber" means the optical fiber used for the master channel, and the "cut-off shift fiber" means the optical fiber used for the slave channel. Further, in the case of the multicore optical fiber, the "W-type pure quartz core fiber" means the core used for the master channel, and the "cut-off shift fiber" means the core used for the slave channel.

Third Embodiment

The optical communication system of the present embodiment is characterized in that the refractive index of the core of the optical fiber of the optical transmission line 50 is lower than that of the pure silica glass.

In the first and second embodiments, the structural conditions of the optical fiber having the pure silica glass as a core have been described. In the SI-type and W-type structures illustrated in the first and second embodiments, fluorine-doped glass may be used as a core. In this case, a larger $\Delta\tau$ can be achieved by decreasing the core refractive index, and the application region of the MS-CPE using the low delay signal can be expanded.

In the present embodiment, a method of designing a core that achieves the low delay master channel in the optical fiber having the SI-type refractive index distribution structure using fluorine-doped glass as a core will be described.

Figure 21:
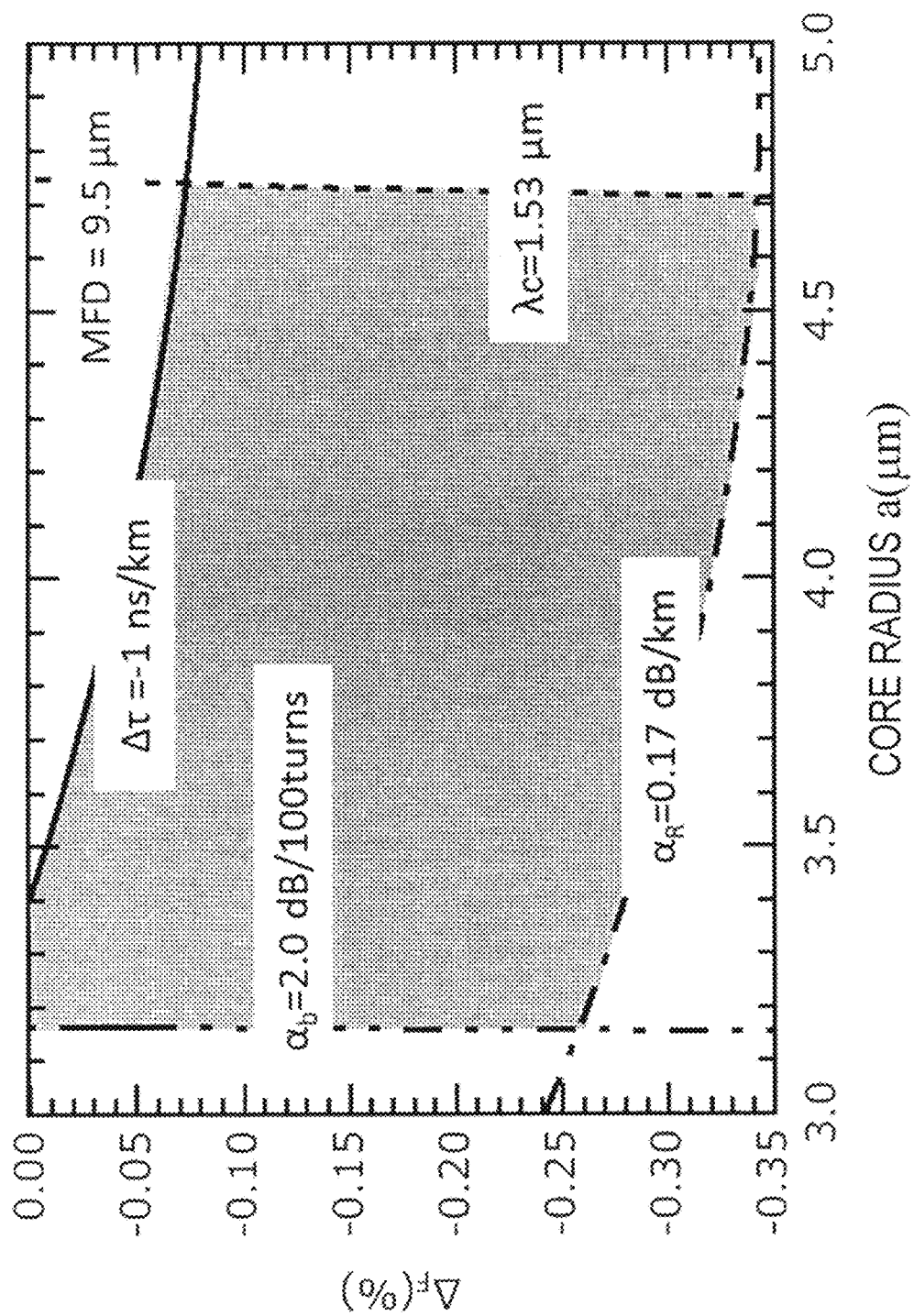
FIG. 21 is a diagram illustrating an example of a design region (MFD=9.5 μm) for an SI-type fluorine-doped low delay master channel suitable for the submarine optical communication system.

FIG. 21 is a diagram illustrating properties (the radius a and a relative refractive index difference $\Delta_F$) required for the core of the master channel. The relative refractive index difference $\Delta_F$ is a relative refractive index difference of a fluorine-doped core with respect to the pure silica glass. The parameters are the group delay time difference $\Delta\tau$ at a wavelength of 1.55 µm, the bending loss $\alpha_b$ at a wavelength of 1.625 µm, a cutoff wavelength $\lambda c$, and a Rayleigh scattering loss $\alpha_R$ at a wavelength of 1.55 µm. Here, the relative refractive index difference of the clad with respect to the pure silica glass is adjusted so that the MFD is 9.5 µm in each structure.

By a one dot chain line, 0.17 dB/km equivalent to the Rayleigh scattering loss in the general-purpose SMF is indicated. When the core radius a satisfies

[Mathematical Expression 43]

$$3.2 \text{ µm} < a < 4.7 \text{ µm} \quad (43),$$

$\Delta c<1.53$ µm and $\alpha_b<2.0$ dB/100 turns can be achieved. Further, $\Delta\tau<-1.0$ ns/km can be achieved in a region where $\Delta_F$ is smaller than the solid line, and the Rayleigh scattering loss of 0.17 dB/km or less can be achieved in a region where $\Delta F$ is larger than the one dot chain line.

In the range of the core radius of Mathematical Expression 43, the solid line can be expressed by the following Mathematical Expression

[Mathematical Expression 44]

$$\Delta_F = 0.49 - 0.21a + 0.02a^2 \quad (44)$$

using the core radius a. Further, the one dot chain line can be expressed by the following Mathematical Expression

[Mathematical Expression 45]

$$\Delta_F = 0.32 - 0.27a + 0.03a^2 \quad (45)$$

in the range of the core radius of Mathematical Expression 43. That is, $\Delta\tau>1.0$ ns/km and $\alpha_R<0.17$ dB/km can be achieved in the following Mathematical Expression.

[Mathematical Expression 46]

$$0.32 - 0.27a + 0.03a^2 < \Delta_F < 0.49 - 0.21a + 0.02a^2 \quad (46)$$

The structure of the gray region surrounded by curves illustrated in FIG. 21 can achieve the low delay master channel having optical properties suitable for the long-distance transmission line and enabling $\Delta\tau<-1.0$ ns/km.

Figure 22:
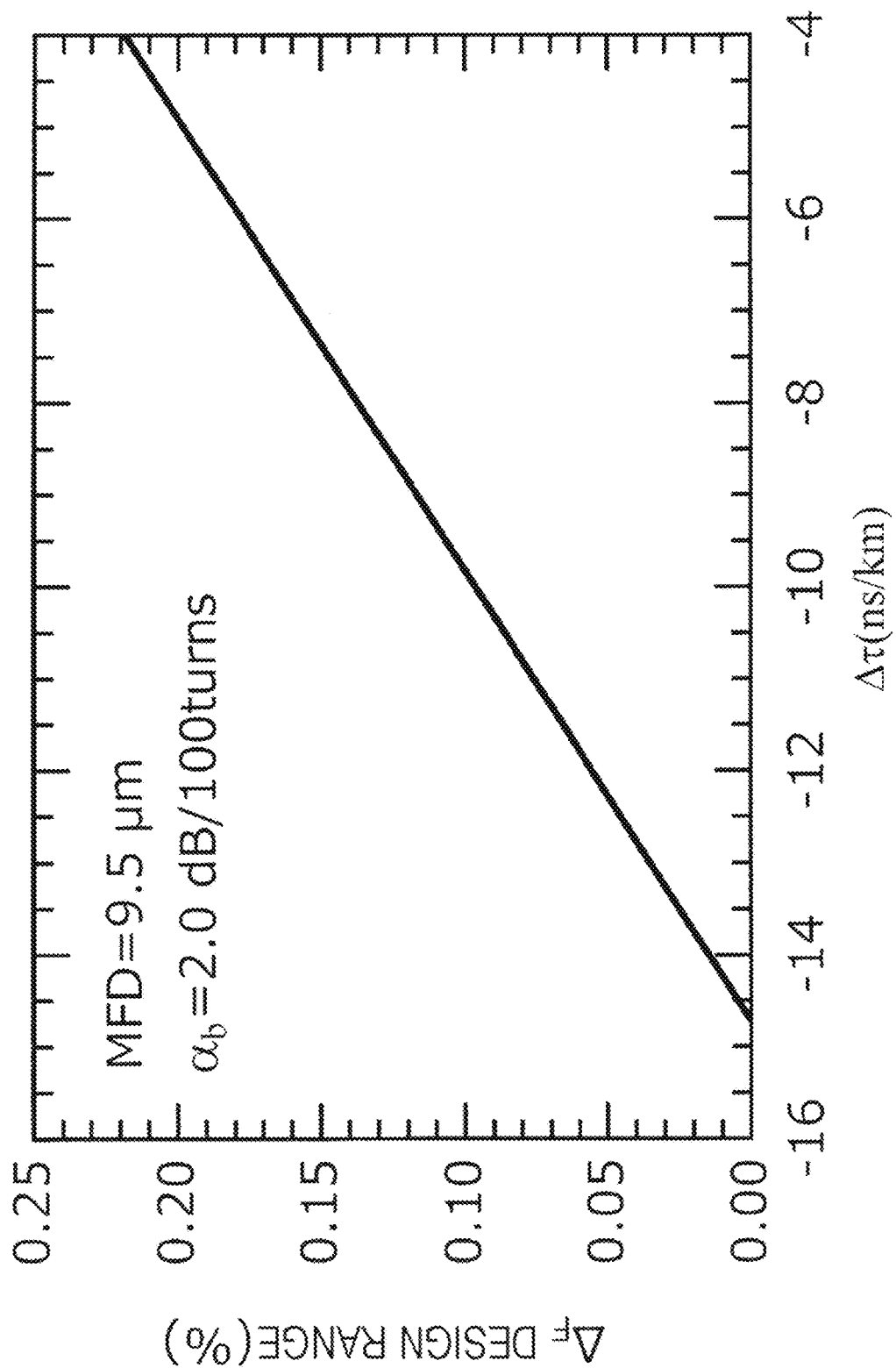
FIG. 22 is a diagram illustrating a designable range of ΔF for the SI-type fluorine-doped low delay master channel suitable for the submarine optical communication system.

FIG. 22 is a diagram illustrating the $\Delta\tau$ dependency of the design range of $\Delta F$ of the master channel. In FIG. 21, $\Delta F$ of the structure that achieves $\alpha_R=0.17$ dB/km and $\alpha_b=2.0$ dB/100 turns is $\Delta_{F,\ min}$, $\Delta_F$ of the structure that achieves $\alpha_b=2.0$ dB/100 turns and the delay time difference $\Delta\tau$ is $\Delta_{F,\ max}$, and $\Delta_{F,\ max}-\Delta_{F,\ min}$ is a designable range of $\Delta F$ depending on $\Delta\tau$. As $\Delta\tau$ decreases, the design possible range of $\Delta F$ decreases, and the designable range disappears (becomes 0%) at $-14.7$ ns/km.

Here, for the structure in which the group delay time difference is $\Delta\tau$, the relationship between $\Delta F$ and the core radius a is expressed as follows.

[Mathematical Expression 47]

$$\Delta_F=K_9-0.21a+0.02a^2 \tag{47}$$

Figure 23:
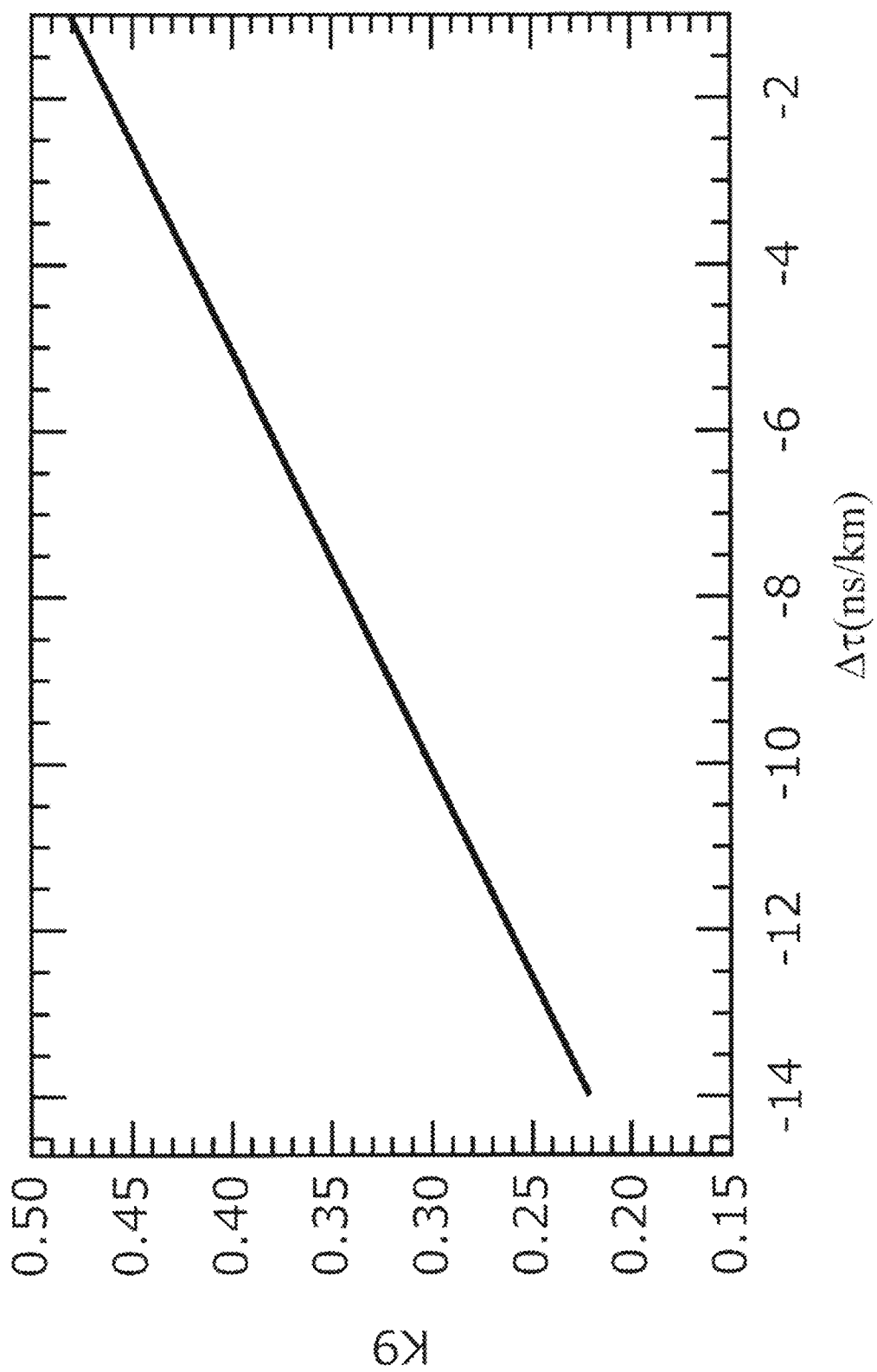
FIG. 23 is a diagram illustrating the Δτ dependency of K9 for the SI-type fluorine-doped low delay master channel suitable for the submarine optical communication system.

FIG. 23 is a diagram illustrating the $\Delta\tau$ dependency of $K_9$ in $-14.7$ ns/km$<\Delta\tau<-1.0$ ns/km when the MFD is 9.5 μm. Here, $K_9$ satisfies the following relationship.

[Mathematical Expression 48]

$$K_9=0.50+0.02\Delta\tau \tag{48}$$

From the above, a fluorine-doped core fiber satisfying the relationship of

[Mathematical Expression 49]

$$0.32-0.27a+0.03a^2<\Delta_F<0.50+0.02\Delta\tau-0.21a+0.02a^2 \tag{49}$$

has optical properties suitable for the long-distance transmission line, and can achieve the group delay time reduction of $\Delta\tau$ or less with respect to the slave channel corresponding to the general-purpose cut-off shift fiber. Thus, an SI-type fluorine-doped core fiber satisfying Mathematical Expression 49 can achieve MS-CPE using the low delay signal in the long-distance transmission line including the submarine optical communication system exceeding 1000 km. In the present embodiment, a case where the slave channel is the SI-type optical fiber will be described, but the slave channel may be other than the SI-type optical fiber.

Note that, in a case of the optical cable and the tape fiber, the "SI-type fluorine-doped core fiber" means the optical fiber used for the master channel, and the "cut-off shift fiber" means the optical fiber used for the slave channel. Further, in the case of the multicore optical fiber, the "SI-type fluorine-doped core fiber" means the core used for the master channel, and the "cut-off shift fiber" means the core used for the slave channel.

Figure 24:
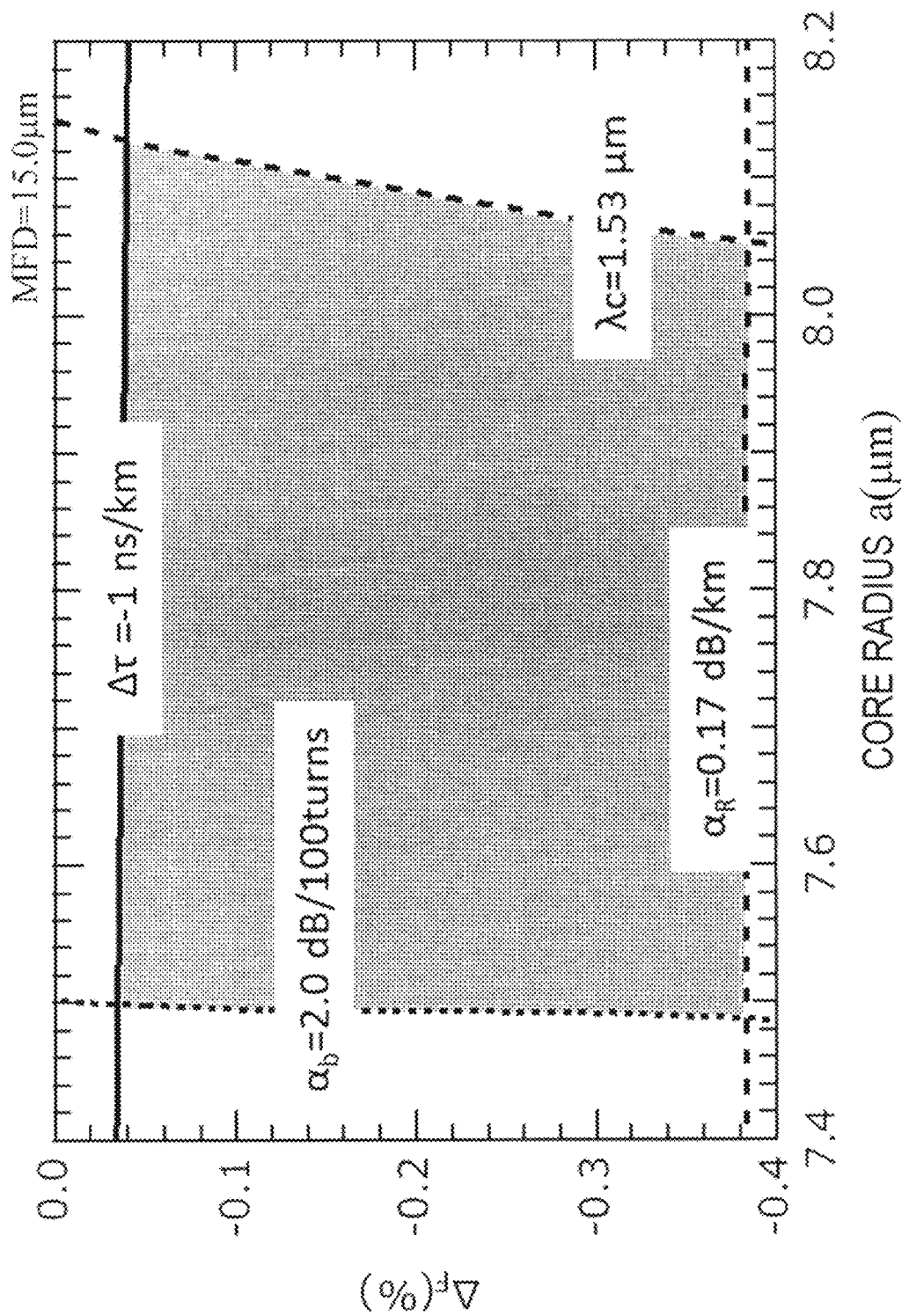
FIG. 24 is a diagram illustrating an example of a design region (MFD=15.0 μm) for the SI-type fluorine-doped low delay master channel suitable for the submarine optical communication system.

FIG. 24 is also a diagram illustrating properties (the radius a and the relative refractive index difference $\Delta_F$) required for the core of the master channel. In this example, the relative refractive index difference of the clad with respect to the pure silica glass is adjusted so that the MFD is 15.0 μm in each structure.

When the core radius a satisfies

[Mathematical Expression 50]

$$7.5\ \mu m<a<8.1\ \mu m \tag{50},$$

$\Delta c<1.53$ μm and $\alpha_b<2.0$ dB/100 turns can be achieved. Further, $\Delta\tau<-1.0$ ns/km can be achieved in a region where $\Delta_F$ is smaller than the solid line, and the Rayleigh scattering loss of 0.17 dB/km or less can be achieved in a region where $\Delta_F$ is larger than the one dot chain line.

In the range of the core radius of Mathematical Expression 50, the solid line can be expressed by the following Mathematical Expression

[Mathematical Expression 51]

$$\Delta_F=\mathbf{0.10}-0.03a+0.13\times10^{-2}a^2 \tag{51}$$

using the core radius a. Further, the one dot chain line can be expressed by the following Mathematical Expression

[Mathematical Expression 52]

$$\Delta_F=-0.73+0.09a+0.01a^2 \tag{52}$$

in the range of the core radius of Mathematical Expression 50. That is, $\Delta\tau<-1$ ns/km and $\alpha_R<0.17$ dB/km can be achieved in the following Mathematical Expression.

[Mathematical Expression 53]

$$-\mathbf{0.73}+\mathbf{0.09}a+0.01a^2<\Delta_F<0.10-0.03a+0.13\times10^{-2}a^2 \tag{53}$$

The structure of the gray region surrounded by the curves illustrated in FIG. 24 can achieve the low delay master channel having optical properties suitable for the long-distance transmission line and enabling $\Delta\tau<-1.0$ ns/km.

Figure 25:
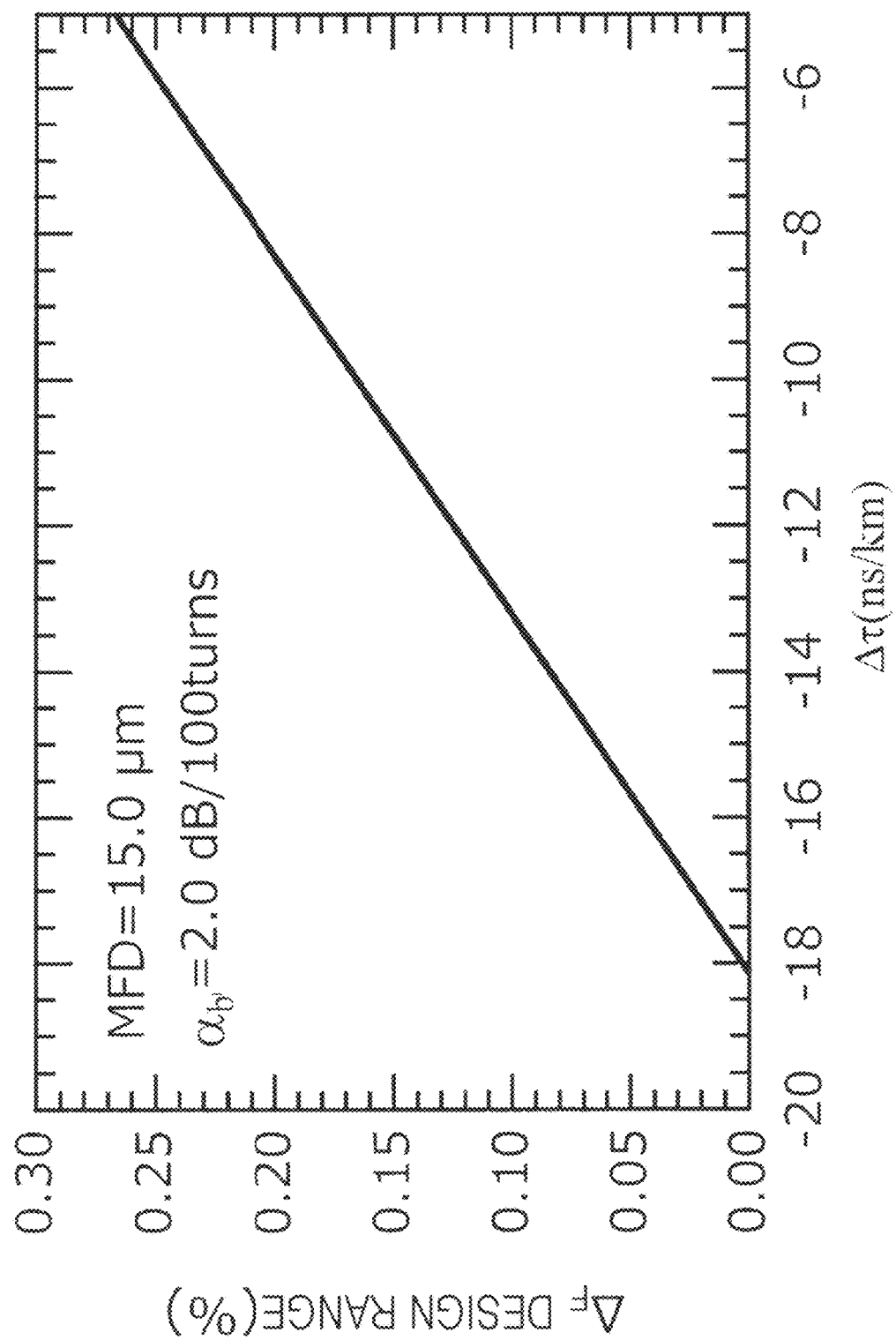
FIG. 25 is a diagram illustrating the designable range of ΔF for the SI-type fluorine-doped low delay master channel suitable for the submarine optical communication system.

FIG. 25 is a diagram illustrating the $\Delta\tau$ dependency of the design range of $\Delta_F$ of the master channel. FIG. 25 is a diagram illustrating the $\Delta\tau$ dependency of the $\Delta_F$ designable range at $\alpha_b=2.0$ dB/100 turns in which the designable range of $\Delta_F$ is the largest. As $\Delta\tau$ decreases, the design possible range of $\Delta_F$ decreases, and the designable range disappears (becomes 0%) at $-18.0$ ns/km.

Here, for the structure in which the group delay time difference is $\Delta\tau$, the relationship between $\Delta_F$ and the core radius a is expressed as follows.

[Mathematical Expression 54]

$$\Delta_F=K_{10}-0.03a+0.13\times10^{-2}a^2 \tag{54}$$

Figure 26:
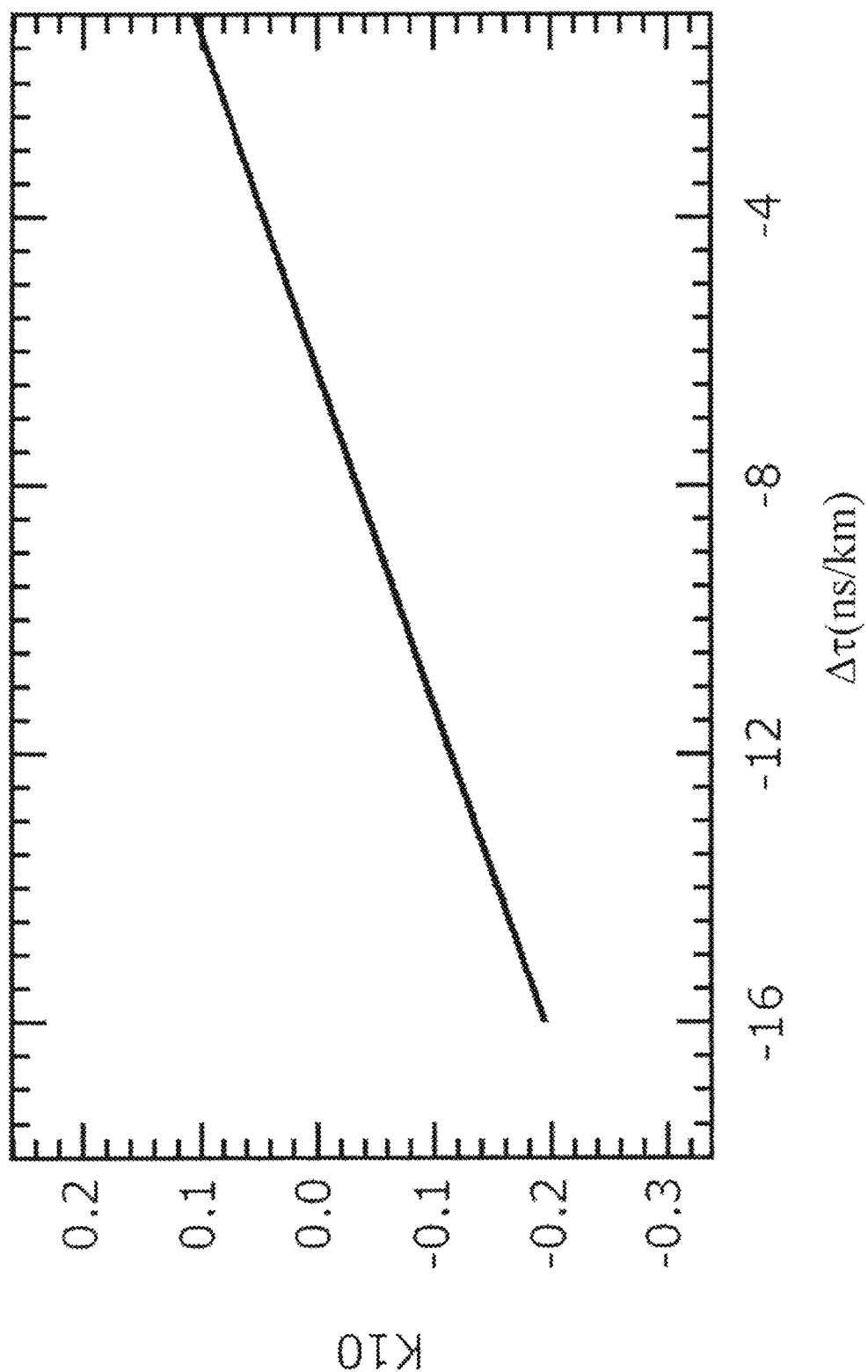
FIG. 26 is a diagram illustrating the Δτ dependency of K10 for the SI-type fluorine-doped low delay master channel suitable for the submarine optical communication system.

FIG. 26 is a diagram illustrating the $\Delta\tau$ dependency of $K_{10}$ in $-18.0$ ns/km$<\Delta\tau<-1.0$ ns/km when the MFD is 15.0 μm. Here, $K_{10}$ satisfies the following relationship.

[Mathematical Expression 55]

$$K_{10}=0.13+0.02\Delta\tau \tag{55}$$

From the above, the fluorine-doped core fiber satisfying the relationship of

[Mathematical Expression 56]

$$-0.73+0.09a+0.01a^2<\Delta_F<0.13+0.02\Delta\tau-0.03a+0.13\times10^{-2}a^2 \tag{56}$$

has optical properties suitable for the long-distance transmission line, and can achieve the group delay time reduction of $\Delta\tau$ or less with respect to the slave channel corresponding to the general-purpose cut-off shift fiber. Thus, the SI-type fluorine-doped core fiber satisfying Mathematical Expression 56 can achieve MS-CPE using the low delay signal in the long-distance transmission line including the submarine optical communication system exceeding 1000 km. In the present embodiment, a case where the slave channel is the SI-type optical fiber will be described, but the slave channel may be other than the SI-type optical fiber.

Note that, in the case of the optical cable and the tape fiber, the "SI-type fluorine-doped core fiber" means the optical fiber used for the master channel, and the "cut-off shift fiber" means the optical fiber used for the slave channel. Further, in the case of the multicore optical fiber, the "SI-type fluorine-doped core fiber" means the core used for the master channel, and the "cut-off shift fiber" means the core used for the slave channel.

Figure 27:
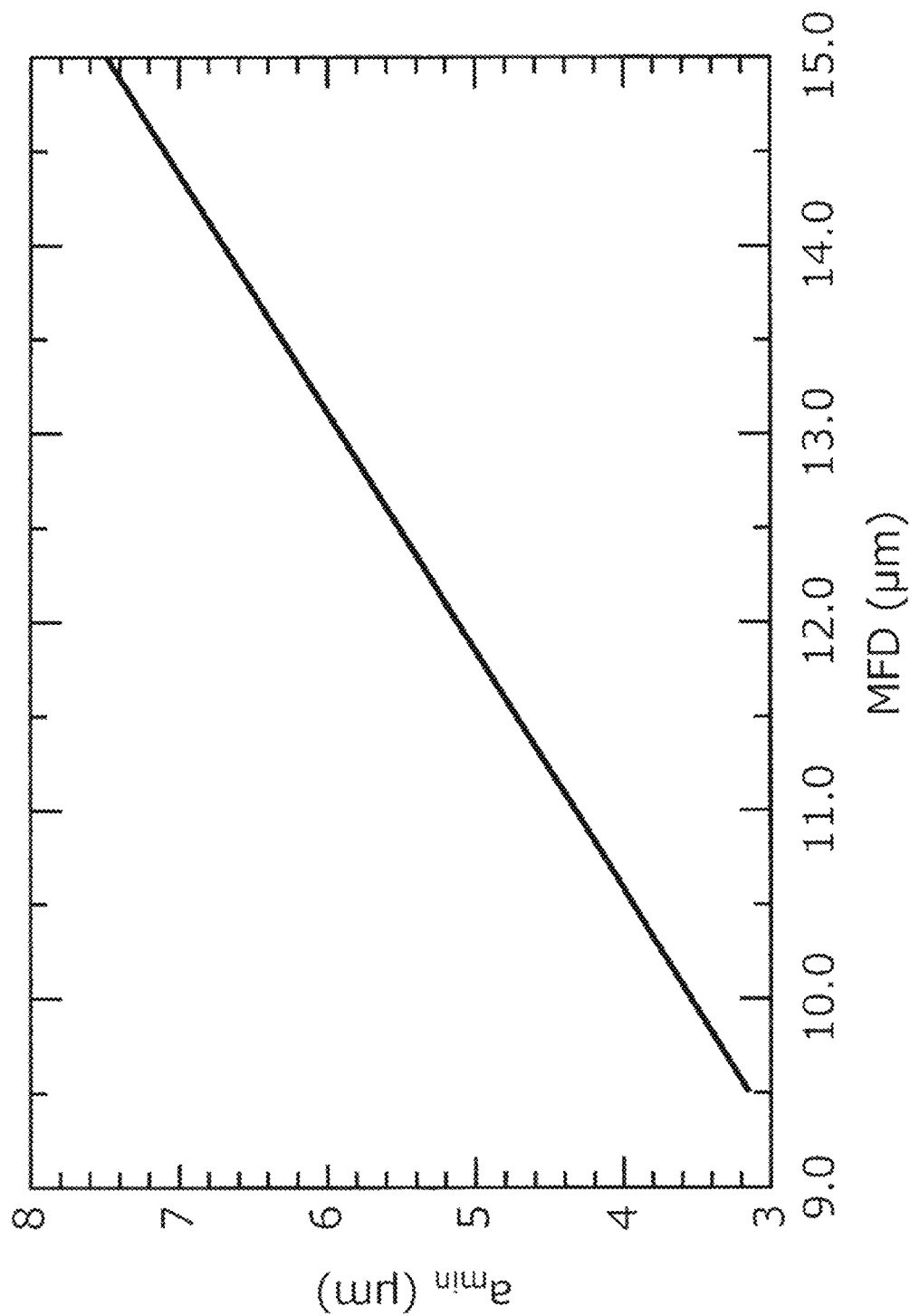
FIG. 27 is a diagram illustrating the MFD dependency of a designable minimum core radius for the SI-type fluorine-doped low delay master channel suitable for the submarine optical communication system.

FIG. 27 is a diagram illustrating the MFD dependency of a designable minimum core radius $a_{min}$ in which $\alpha_b$ is 2.0 dB/100 turns. The $a_{min}$ rises linearly with respect to the MFD. The solid line in FIG. 27 can be expressed by the following Mathematical Expression.

[Mathematical Expression 57]

$$a_{min} = -4.4 + 0.8 \text{MFD} \quad (57)$$

Figure 28:
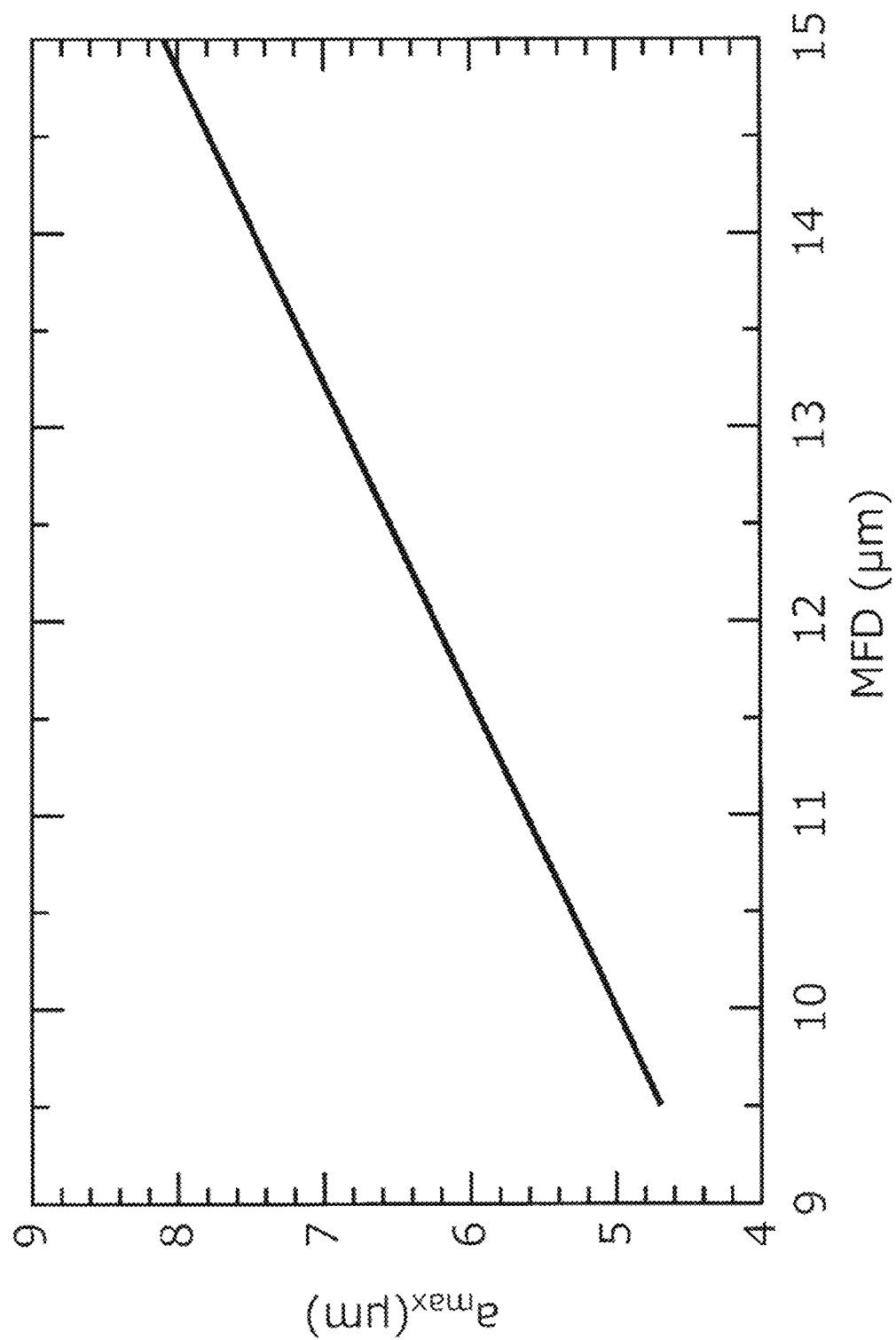
FIG. 28 is a diagram illustrating the MFD dependency of a designable maximum core radius for the SI-type fluorine-doped low delay master channel suitable for the submarine optical communication system.

FIG. 28 is a diagram illustrating the MFD dependency of the designable minimum core radius $a_{max}$ in which $\lambda c$ is 1.53 µm or less. The $a_{max}$ increases linearly with respect to the MFD. The solid line in FIG. 28 can be expressed by the following Mathematical Expression.

[Mathematical Expression 58]

$$a_{max} = 1.2 + 0.6 \text{MFD} \quad (58)$$

Figure 29:
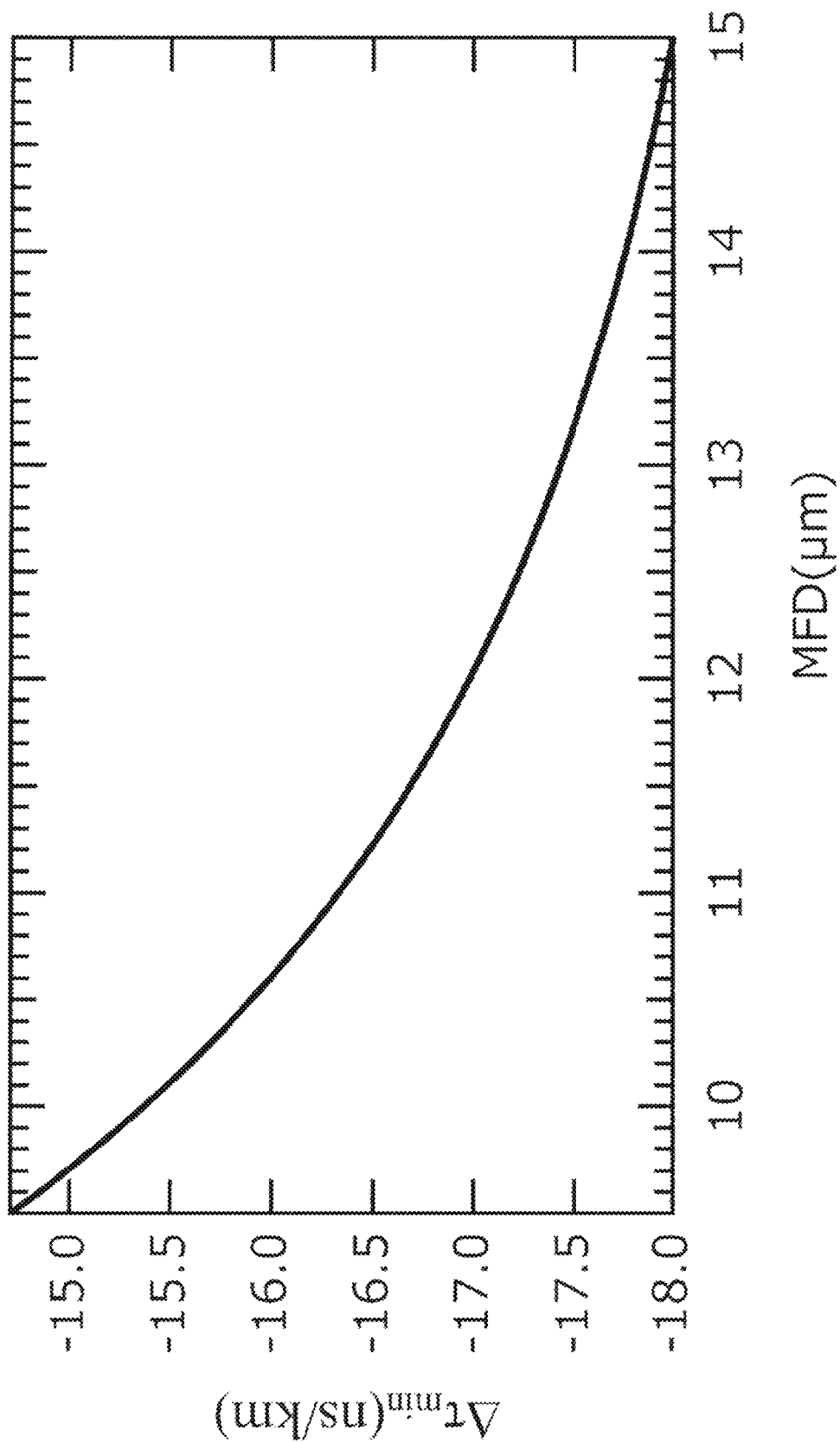
FIG. 29 is a diagram illustrating the MFD dependency of a designable minimum Δτ for the SI-type fluorine-doped low delay master channel suitable for the submarine optical communication system.

FIG. 29 is a diagram illustrating the MFD dependency of the minimum designable $\Delta\tau_{min}$ when $\alpha_b$ is 2.0 dB/100 turns. $\Delta\tau_{min}$ can be expressed by the following Mathematical Expression.

[Mathematical Expression 59]

$$\Delta\tau_{min} = -18.93 + 7.00 \times 10^3 \text{MFD}^{-3.30} \quad (59)$$

Here, when the core radius is $a_{min} < a < a_{max}$ and the group delay time difference to be designed is $\Delta\tau_{min} < \Delta\tau < -1$ ns/km, $\Delta_{Fmin}$ and $\Delta_{Fmax}$ with which $\alpha_R$ is 0.17 dB/km can be expressed by the following Mathematical Expressions using coefficients $K_{11}$, $K_{12}$, $K_{13}$, $K_{14}$, $K_{15}$, and $K_{16}$ depending on the MFD, the core radius a, and the group delay time difference $\Delta T$.

[Mathematical Expression 60]

$$\Delta_{Fmin} = K_{11} + K_{12}a + K_{13}a^2 \quad (60)$$

[Mathematical Expression 61]

$$\Delta_{Fmax} = K_{14} + 0.02\Delta\tau + K_{15}a + K_{16}a^2 \quad (61)$$

Figure 30:
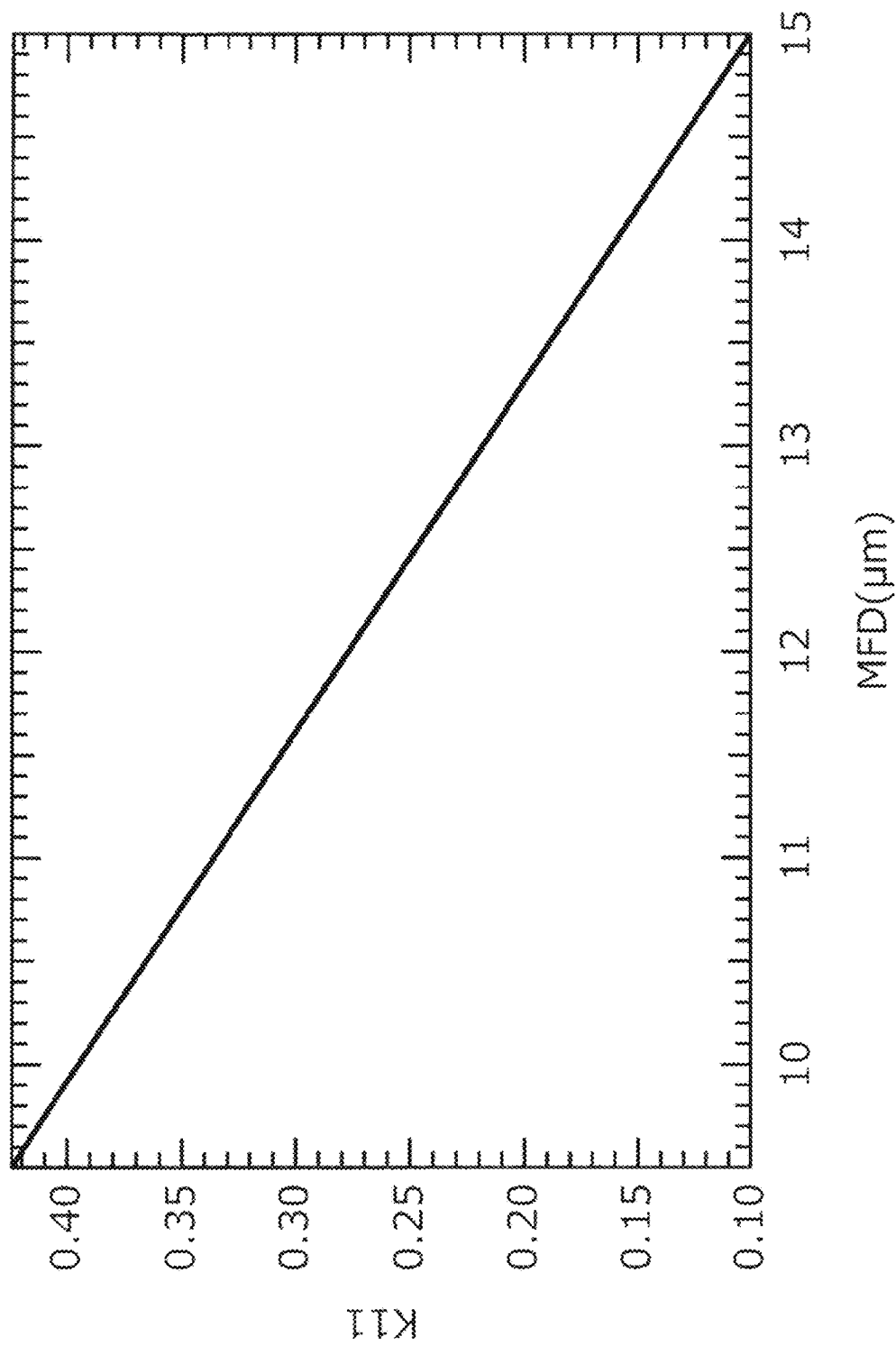
FIG. 30 is a diagram illustrating the MFD dependency of K11 for the SI-type fluorine-doped low delay master channel suitable for the submarine optical communication system.

FIG. 30 is a diagram illustrating the MFD dependency of $K_{11}$. The straight line in FIG. 30 can be expressed by the following Mathematical Expression using the MFD.

[Mathematical Expression 62]

$$K_{11} = 0.98 - 0.06 \text{MFD} \quad (62)$$

Figure 31:
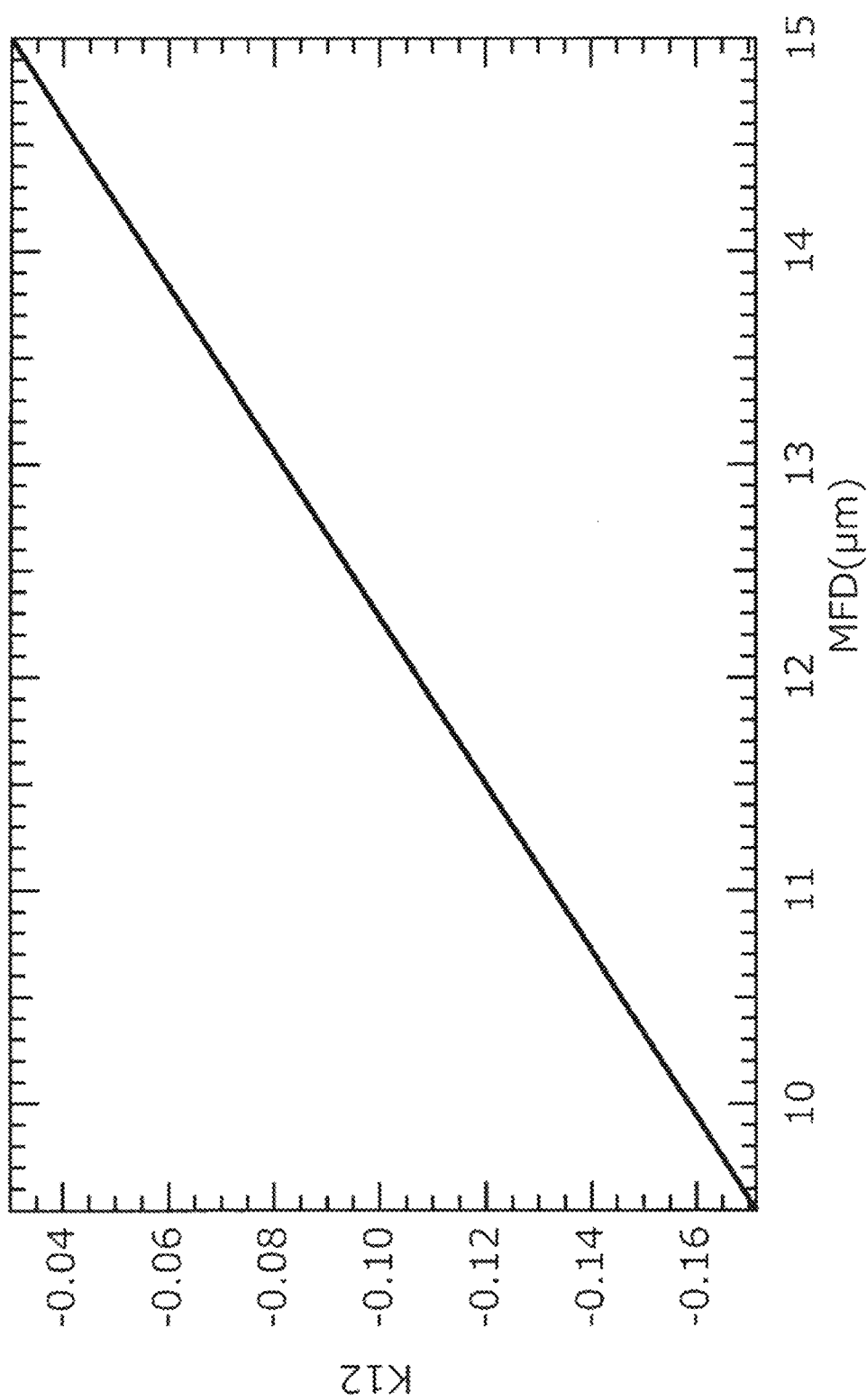
FIG. 31 is a diagram illustrating the MFD dependency of K12 for the SI-type fluorine-doped low delay master channel suitable for the submarine optical communication system.

FIG. 31 is a diagram illustrating the MFD dependency of $K_{12}$. The straight line in FIG. 31 can be expressed by the following Mathematical Expression using the MFD.

[Mathematical Expression 63]

$$K_{12} = -0.42 - 0.03 \text{MFD} \quad (63)$$

Figure 32:
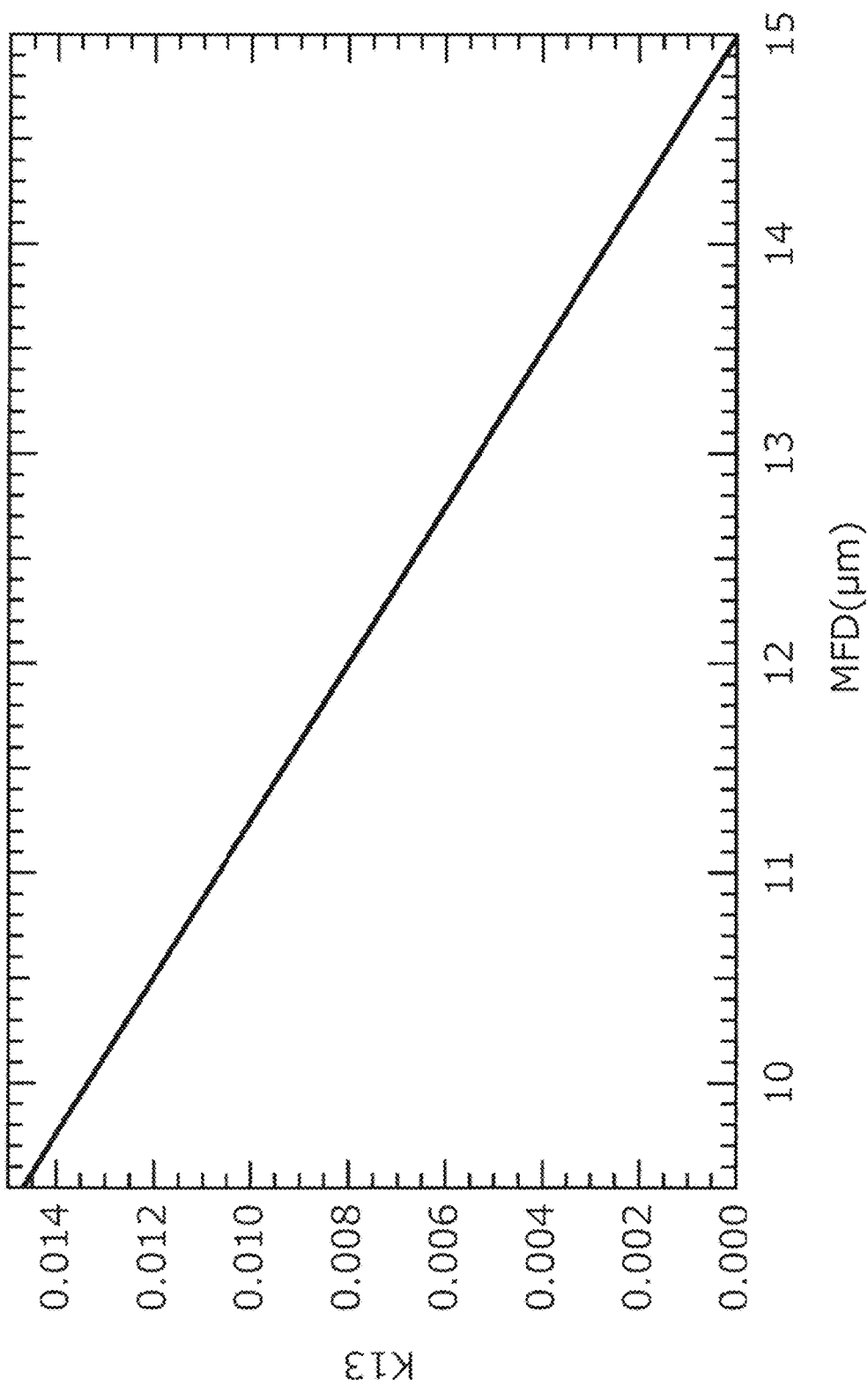
FIG. 32 is a diagram illustrating the MFD dependency of K13 for the SI-type fluorine-doped low delay master channel suitable for the submarine optical communication system.

FIG. 32 is a diagram illustrating the MFD dependency of $K_{13}$. The straight line in FIG. 32 can be expressed by the following Mathematical Expression using the MFD.

[Mathematical Expression 64]

$$K_{13} = -0.04 - 0.002 \text{MFD} \quad (64)$$

Figure 33:
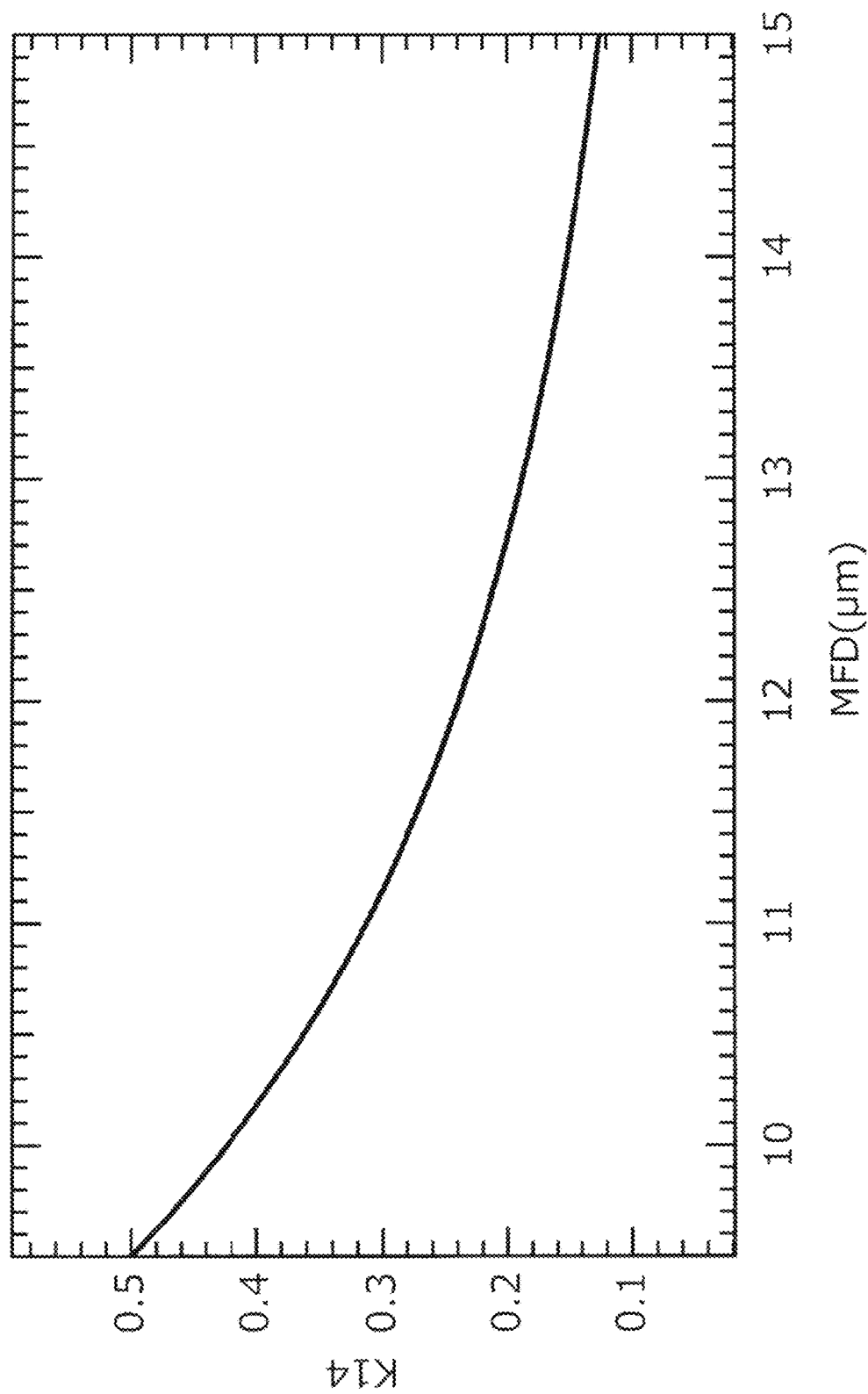
FIG. 33 is a diagram illustrating the MFD dependency of K14 for the SI-type fluorine-doped low delay master channel suitable for the submarine optical communication system.

FIG. 33 is a diagram illustrating the MFD dependency of $K_{14}$. The curve in FIG. 33 can be expressed by the following Mathematical Expression using the MFD.

[Mathematical Expression 65]

$$K_{14} = 0.03 + 1.16 \times 10^3 \text{MFD}^{-3.47} \quad (65)$$

Figure 34:
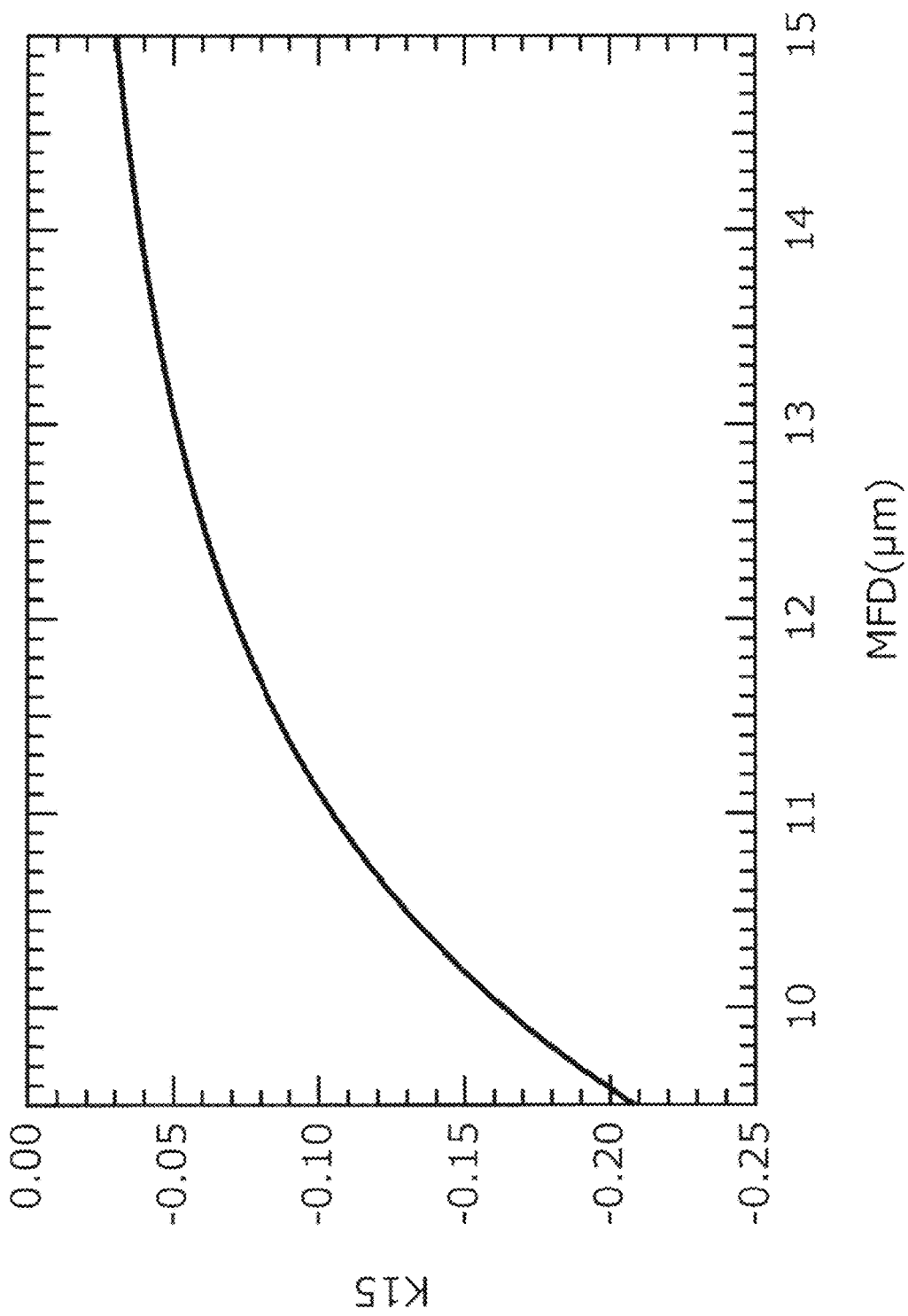
FIG. 34 is a diagram illustrating the MFD dependency of K15 for the SI-type fluorine-doped low delay master channel suitable for the submarine optical communication system.

FIG. 34 is a diagram illustrating the MFD dependency of $K_{15}$. The curve in FIG. 34 can be expressed by the following Mathematical Expression using the MFD.

[Mathematical Expression 66]

$$K_{15} = -0.01 - 1.88 \times 10^5 \text{MFD}^{-5.09} \quad (66)$$

Figure 35:
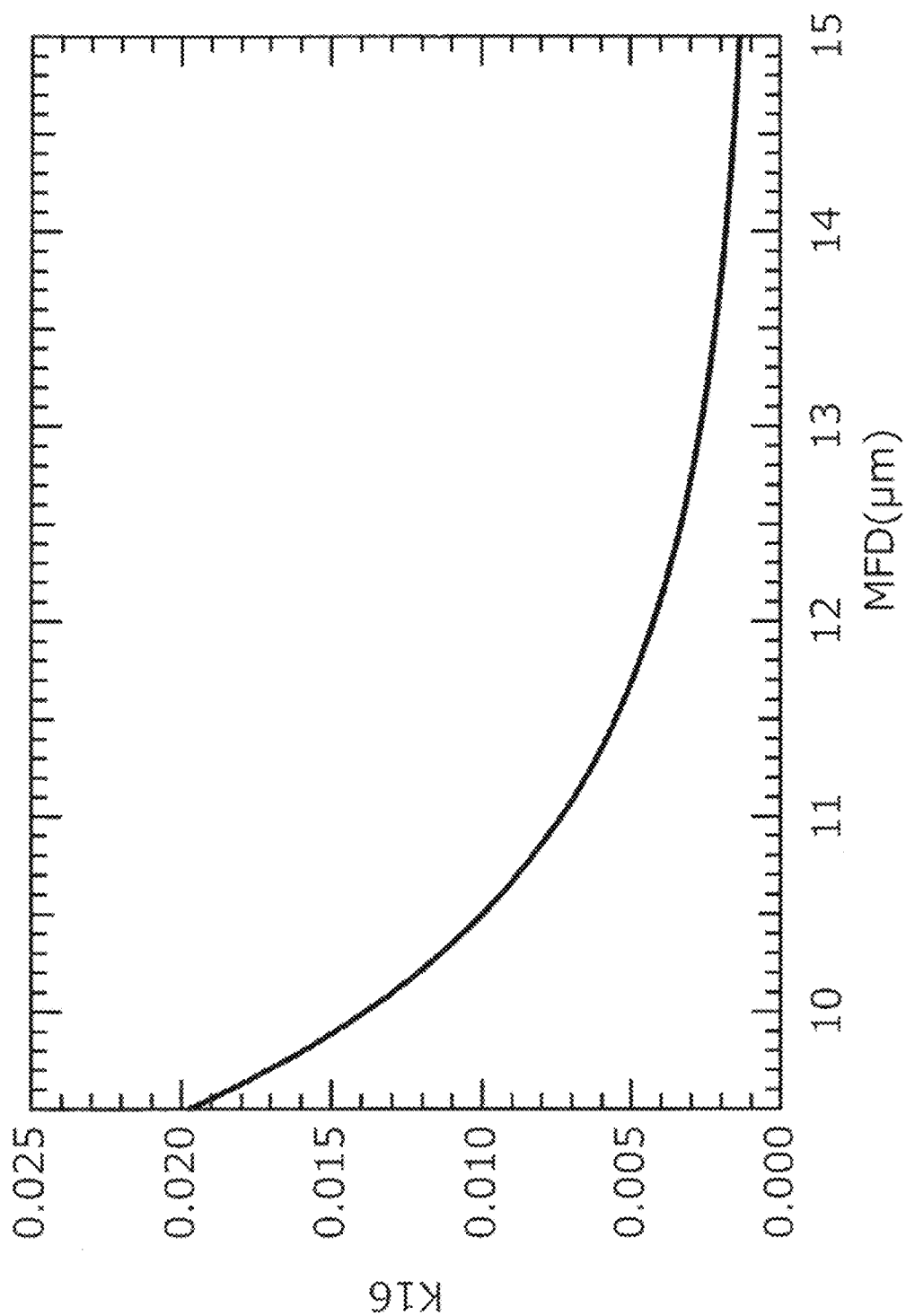
FIG. 35 is a diagram illustrating the MFD dependency of K16 for the SI-type fluorine-doped low delay master channel suitable for the submarine optical communication system.

FIG. 35 is a diagram illustrating the MFD dependency of $K_{16}$. The curve in FIG. 35 can be expressed by the following Mathematical Expression using the MFD.

[Mathematical Expression 67]

$$K_{16} = 0.64 \times 10^{-3} + 1.89 \times 10^4 \text{MFD}^{-7.16} \quad (67)$$

As described above, for the MFD of 9.5 µm or more and 15.0 µm or less, when the core radius is in the region of $a_{min} < a < a_{max}$ expressed by Mathematical Expressions 57 and 58, and the group delay time difference $\Delta\tau$ to be designed satisfies $\Delta\tau_{min} < \Delta\tau < -1$ ns/km using $\Delta\tau_{min}$ expressed by Mathematical Expression 59, the fluorine-doped core fiber satisfying the relationship of

[Mathematical Expression 68]

$$0.98 - 0.06\text{MFD} - (0.42 + 0.03\text{MFD})a - (0.04 + 0.002\text{MFD})a^2 < \Delta_F < 0.03 + 1.16 \times 10^3 \text{MFD}^{-3.47} + 0.02\Delta\tau - (0.01 + 1.88 \times 10^5 \text{MFD}^{-5.09})a + (0.64 \times 10^{-3} + 1.89 \times 10^4 \text{MFD}^{-7.16})a^2 \quad (68)$$

has optical properties suitable for the long-distance transmission line, and can achieve the group delay time reduction of $\Delta\tau$ or less with respect to the slave channel corresponding to the general-purpose cut-off shift fiber. Thus, the SI-type fluorine-doped core fiber satisfying Mathematical Expression 68 can achieve MS-CPE using the low delay signal in the long-distance transmission line including the submarine optical communication system exceeding 1000 km. In addition, designing as the W type is possible by adding a jacket having a refractive index lower than that of the core region and higher than that of a clad region so as to surround the structure of the present example. In the present embodiment, a case where the slave channel is the SI-type optical fiber will be described, but the slave channel may be other than the SI-type optical fiber.

Note that, in the case of the optical cable and the tape fiber, the "SI-type fluorine-doped core fiber" means the optical fiber used for the master channel, and the "cut-off shift fiber" means the optical fiber used for the slave channel. Further, in the case of the multicore optical fiber, the "SI-type fluorine-doped core fiber" means the core used for the master channel, and the "cut-off shift fiber" means the core used for the slave channel.

Fourth Embodiment

In the present embodiment, a fluorine-doped core SI optical fiber capable of expanding an application region of MS-CPE using the low delay signal to a land relay system will be described. A transmission path length of about several 100 km is assumed in the land relay system, and thus it is desirable that $\Delta\tau$ be −3.4 ns/km or less from FIG. 1. In addition, $\alpha_b$ is desirably 0.1 dB/100 turns, which is equivalent to that of the general-purpose SMF.

Figure 36:
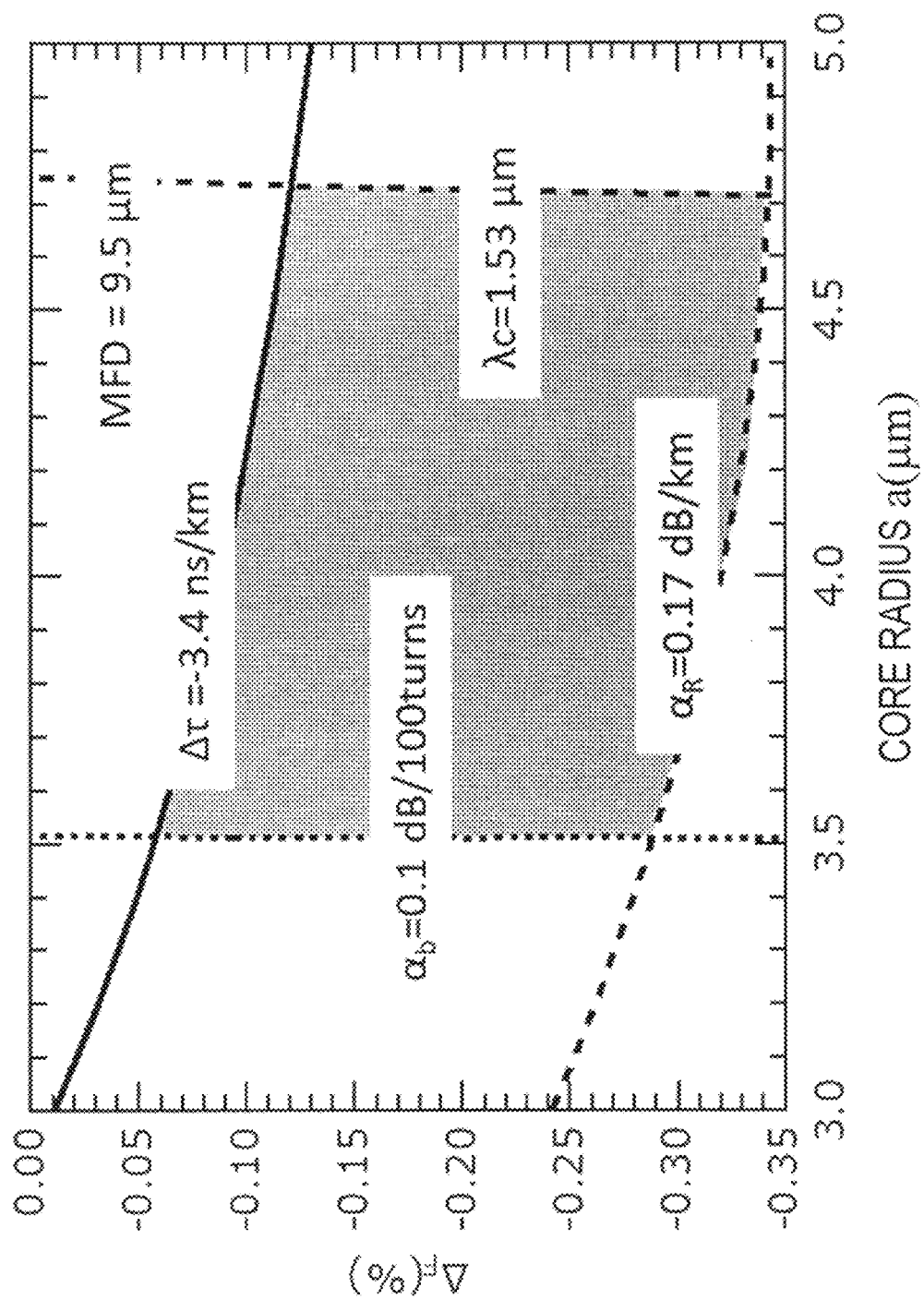
FIG. 36 is a diagram illustrating an example of a design region (MFD=9.5 μm) for the SI-type fluorine-doped low delay master channel suitable for a land optical communication system.

FIG. 36 is a diagram illustrating properties (the radius a and the relative refractive index difference $\Delta_F$) required for the core of the master channel.

The parameters are the group delay time difference $\Delta\tau$ at a wavelength of 1.55 μm, the bending loss $\alpha_b$ at a wavelength of 1.625 μm, the cutoff wavelength λc, and the Rayleigh scattering loss $\alpha_R$ at a wavelength of 1.55 μm. Here, the relative refractive index difference of the clad with respect to the pure silica glass is adjusted so that the MFD is 9.5 μm in each structure.

When the radius a satisfies

[Mathematical Expression 69]

$$3.5\ \mu m < a < 4.7\ \mu m \tag{69}$$

$\Delta c < 1.53$ μm and $\alpha_b < 0.1$ dB/100 turns can be achieved. Further, $\Delta\tau < -3.4$ ns/km can be achieved in a region where $\Delta_F$ is smaller than the solid line, and the Rayleigh scattering loss of 0.17 dB/km or less can be achieved in a region where $\Delta_F$ is larger than the one dot chain line.

The solid line is obtained by setting $\Delta\tau = -3.4$ ns/km in Mathematical Expressions 47 and 48 using the core radius a in the range of the core radius a of Mathematical Expression 69. The one dot chain line is expressed by Mathematical Expression 45. That is, $\Delta\tau < -3.4$ ns/km and $\alpha_R < 0.17$ dB/km can be achieved in the following Mathematical Expression.

[Mathematical Expression 70]

$$0.32 - 0.27a + 0.03a^2 < \Delta_F < 0.43 - 0.21a + 0.02a^2 \tag{70}$$

Figure 37:
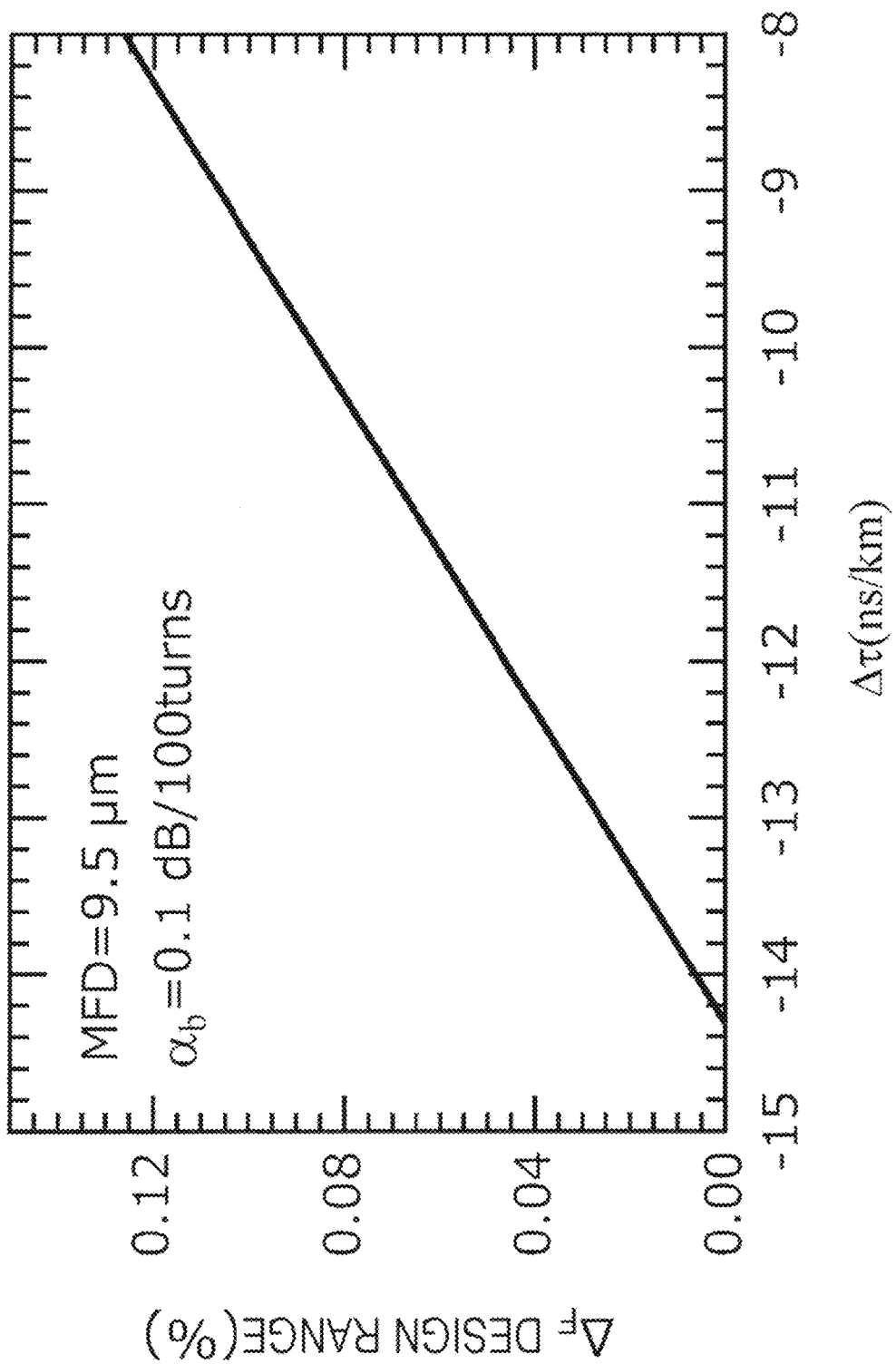
FIG. 37 is a diagram illustrating the designable range of ΔF for the SI-type fluorine-doped low delay master channel suitable for the land optical communication system.

FIG. 37 is a diagram illustrating the $\Delta\tau$ dependency of the design range of $\Delta F$ of the master channel. FIG. 37 is a diagram illustrating the $\Delta\tau$ dependency of the $\Delta_F$ designable range at $\alpha_b = 0.1$ dB/100 turns in which the designable range of $\Delta_F$ is the largest. As $\Delta\tau$ decreases, the design possible range of $\Delta_F$ decreases, and the designable range disappears (becomes 0%) at $-14.7$ ns/km.

Figure 38:
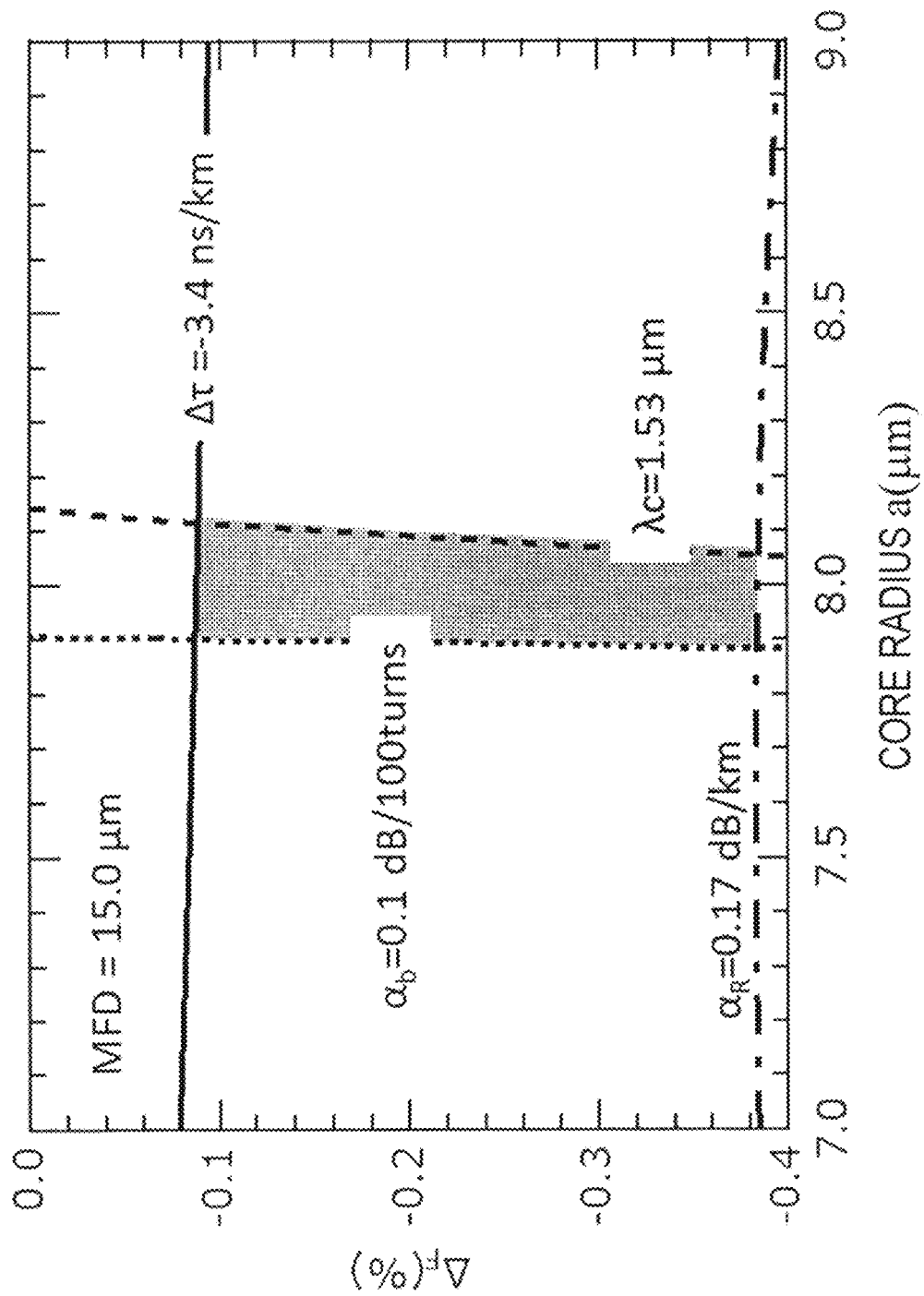
FIG. 38 is a diagram illustrating an example of a design region (MFD=15.0 μm) for the SI-type fluorine-doped low delay master channel suitable for the land optical communication system.

FIG. 38 is a diagram illustrating properties (the radius a and the relative refractive index difference $\Delta_F$) required for the core of the master channel. In this drawing, the relative refractive index difference of the clad with respect to the pure silica glass is adjusted so that the MFD is 15.0 μm in each structure.

When the core radius a satisfies

[Mathematical Expression 71]

$$7.9\ \mu m < a < 8.1\ \mu m \tag{71}$$

$\Delta c < 1.53$ μm and $\alpha_b < 0.1$ dB/100 turns can be achieved. Further, $\Delta\tau < -3.4$ ns/km can be achieved in a region where $\Delta_F$ is smaller than the solid line, and the Rayleigh scattering loss of 0.17 dB/km or less can be achieved in a region where $\Delta_F$ is larger than the one dot chain line.

The solid line is obtained by setting $\Delta\tau = -3.4$ ns/km in Mathematical Expressions 54 and 55 using the core radius a in the range of the core radius a of Mathematical Expression 71. The one dot chain line can be expressed by Mathematical Expression 52 in the range of the core radius of Mathematical Expression 71. That is, $\Delta\tau < -3.4$ ns/km and $\alpha_R < 0.17$ dB/km can be achieved in the following Mathematical Expression.

[Mathematical Expression 72]

$$-0.73 + 0.09a + 0.01a^2 < \Delta_F < 0.06 - 0.03a + 0.13 \times 10^{-2} a^2 \tag{72}$$

Figure 39:
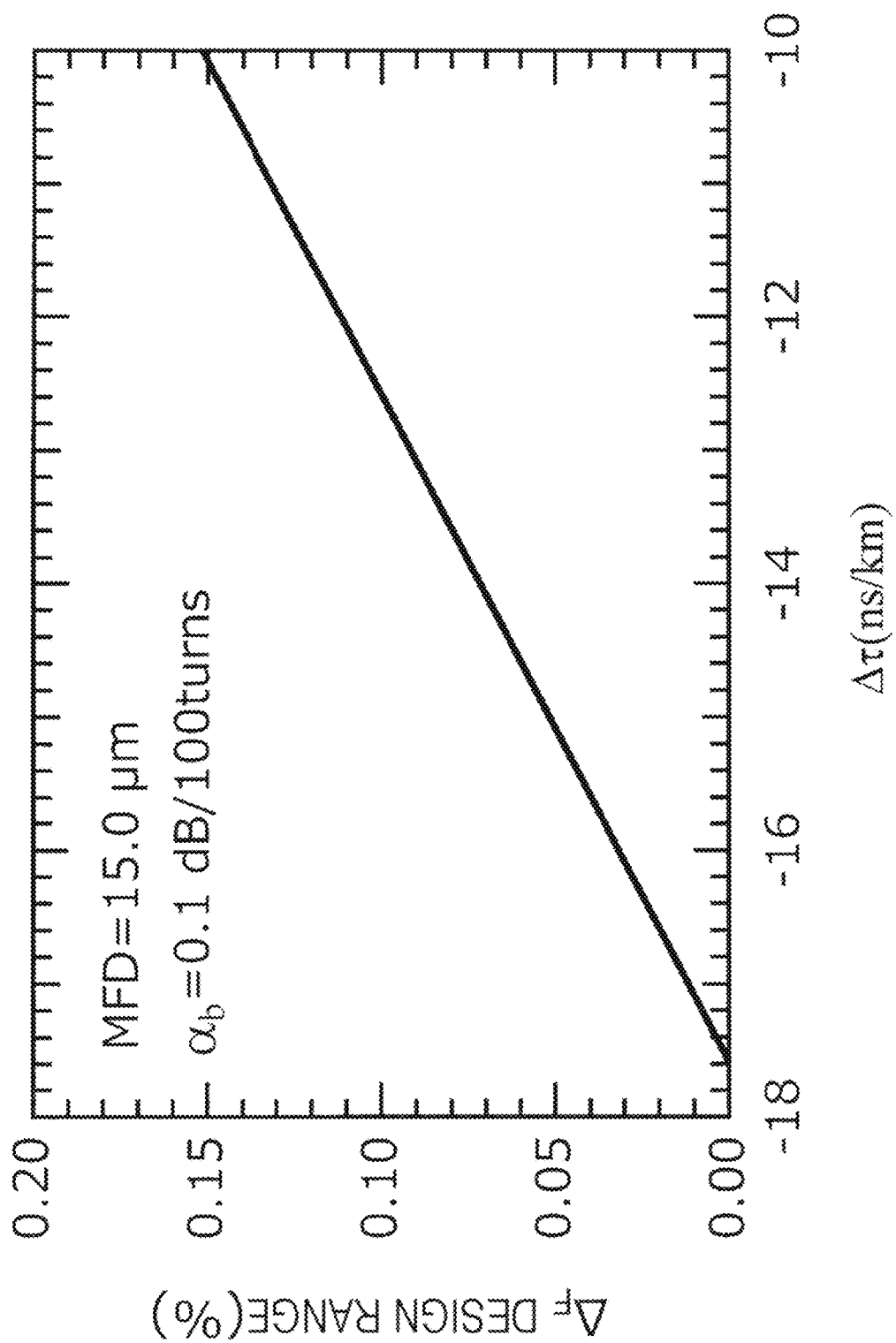
FIG. 39 is a diagram illustrating the Δτ dependency of a ΔF design range for the SI-type fluorine-doped low delay master channel suitable for the land optical communication system.

FIG. 39 is a diagram illustrating the $\Delta\tau$ dependency of the design range of $\Delta F$ of the master channel. FIG. 39 is a diagram illustrating the $\Delta\tau$ dependency of the $\Delta_F$ designable range at $\alpha_b = 0.1$ dB/100 turns in which the designable range of $\Delta F$ is the largest. As $\Delta\tau$ decreases, the design possible range of $\Delta F$ decreases, and the designable range disappears (becomes 0%) at $-17.6$ ns/km.

Figure 40:
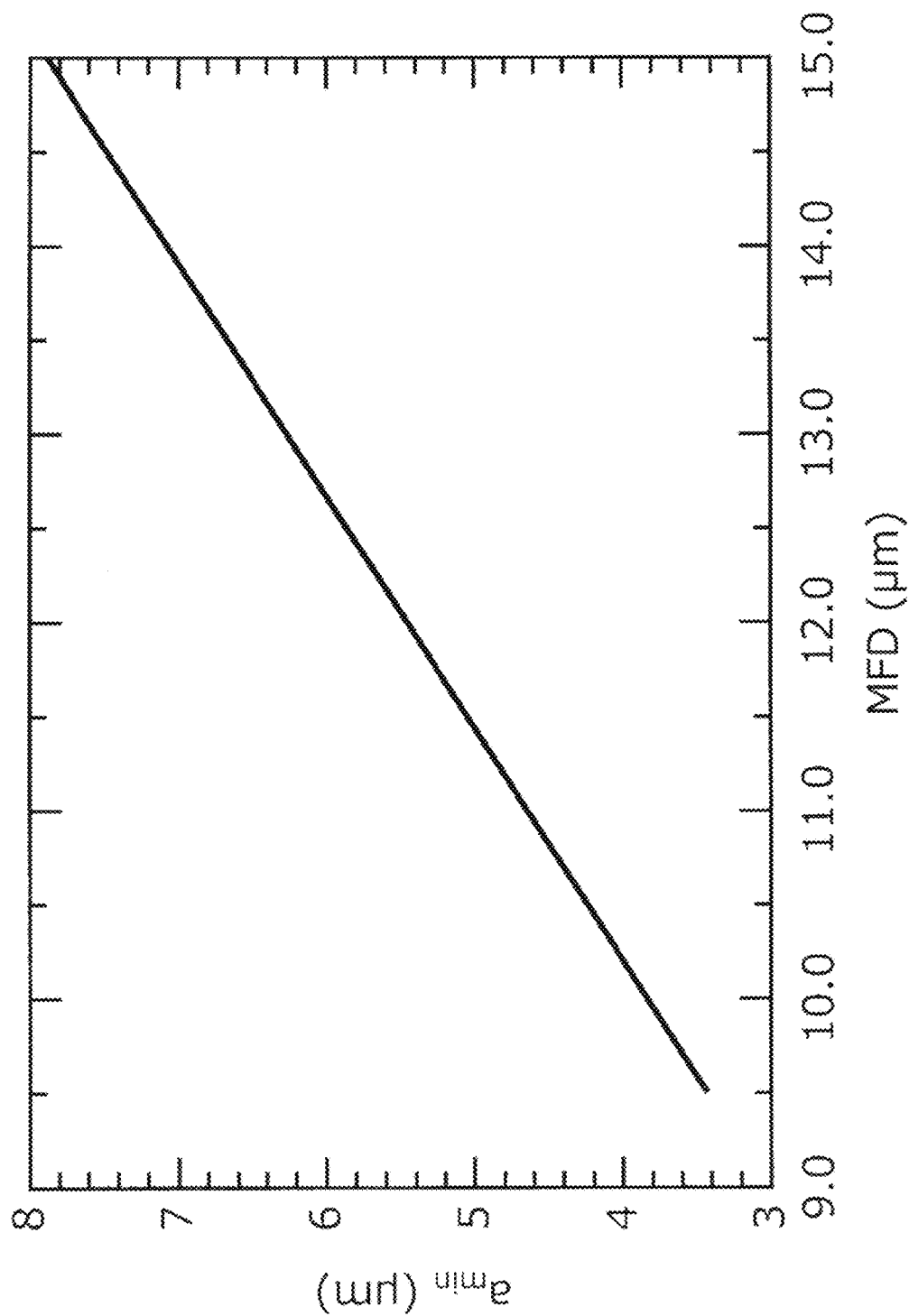
FIG. 40 is a diagram illustrating the MFD dependency of the designable minimum core radius for the SI-type fluorine-doped low delay master channel suitable for the land optical communication system.

Here, the core radius $a_{max}$ at which λc is 1.53 μm or less can be expressed by Mathematical Expression 58. FIG. 40 illustrates the MFD dependency of the core radius $a_{min}$ with $\alpha_b$ of 0.1 dB/100 turns. The $a_{min}$ rises linearly with respect to the MFD. The solid line in FIG. 40 can be expressed by the following Mathematical Expression.

[Mathematical Expression 73]

$$a_{min} = -4.3 + 0.8 \text{MFD} \tag{73}$$

Figure 41:
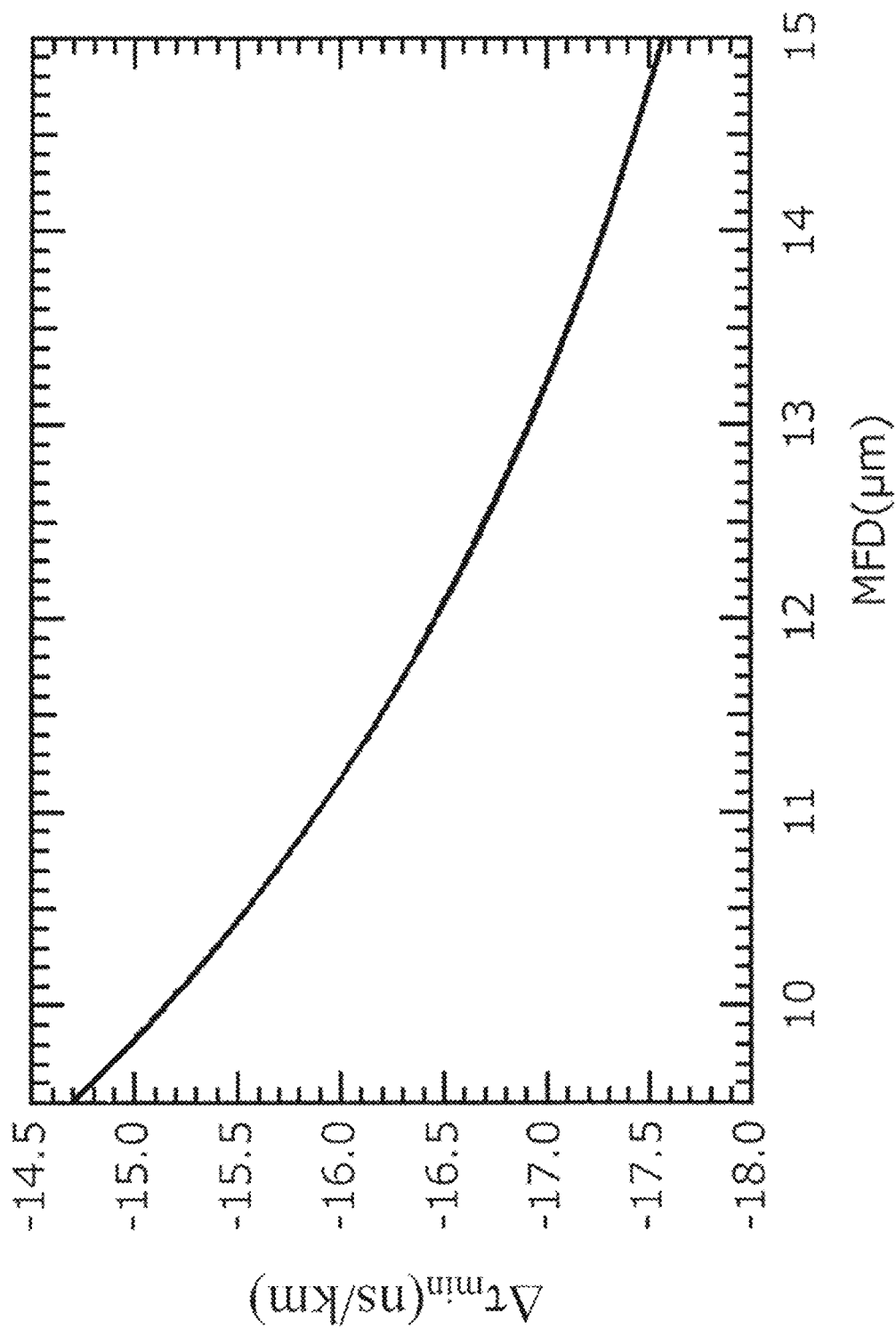
FIG. 41 is a diagram illustrating the MFD dependency of the designable minimum Δτ for the SI-type fluorine-doped low delay master channel suitable for the land optical communication system.

Furthermore, FIG. 41 is a diagram illustrating the MFD dependency of the minimum designable $\Delta\tau$ at $\alpha_b = 0.1$ dB/100 turns. At this time, $\Delta\tau_{min}$ can be expressed by the following Mathematical Expression.

[Mathematical Expression 74]

$$\Delta\tau_{min} = -20.0 + 2.41 \times 10^2 \text{MFD}^{-1.71} \tag{74}$$

Here, when the core radius is $a_{min} < a < a_{max}$ and the group delay time difference to be designed is $\Delta\tau_{min} < \Delta\tau < -3.4$ ns/km, $\Delta F_{min}$ and $\Delta F_{max}$ at which $\alpha_R$ is 0.17 dB/km can be expressed by Mathematical Expression 68.

In the structure described in the present embodiment, the application region of the MS-CPE using the low delay signal can be extended to about 300 km. In addition, designing as the W type is possible by adding a jacket having a refractive index lower than that of the core region and higher than that of the clad region so as to surround the structure of the present example.

Fifth Embodiment

In the present embodiment, an optical communication system in which the optical transmission line 50 is the multicore optical fiber will be described. The multicore optical fiber according to the present embodiment includes at least one core structure described in the first to fourth embodiments.

Example 1

Figure 42:
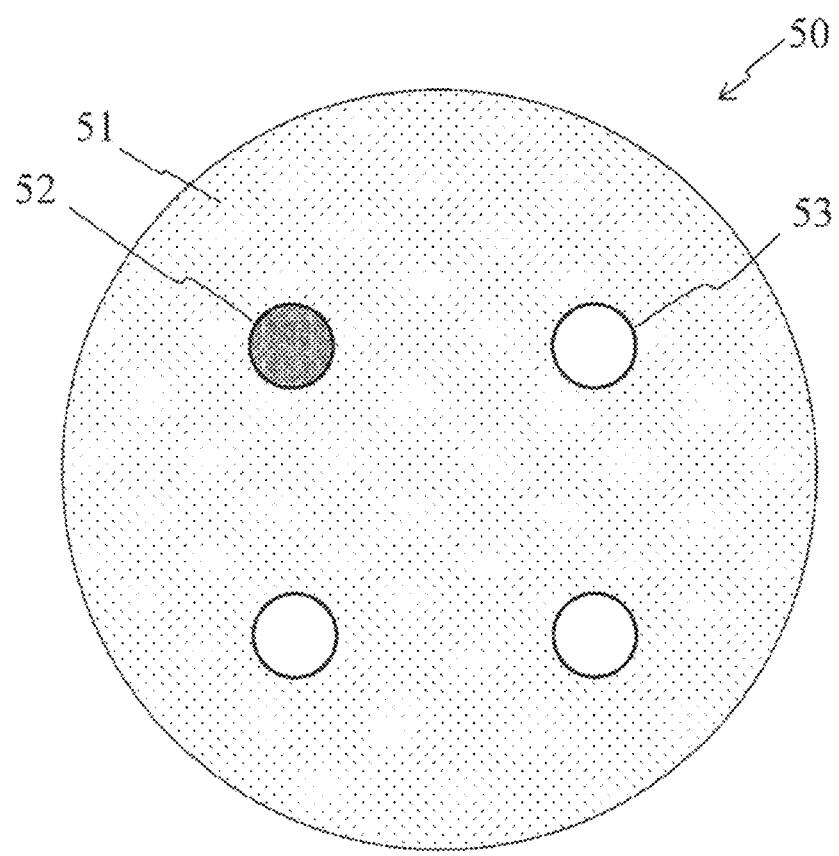
FIG. 42 is a view illustrating a multicore optical fiber according to the present invention.

FIG. 42 is a view illustrating a core arrangement example of the multicore optical fiber including a low delay core. In the multicore optical fiber according to the present example, two or more transmission cores (52, 53) are arranged on a square lattice in a clad 51. Then, it is characterized in that at least one (core 52) of the transmission cores is the low delay core having the structure described in the first to fourth embodiments. In the multicore optical fiber according to the present example, the core 52 is set as the low delay master channel, and the other cores 53 are set as the slave channels. Thus, since noise due to disturbance is made common, MS-CPE using the low delay channel can be stably operated in the optical communication system 300.

Example 2

Figure 43:
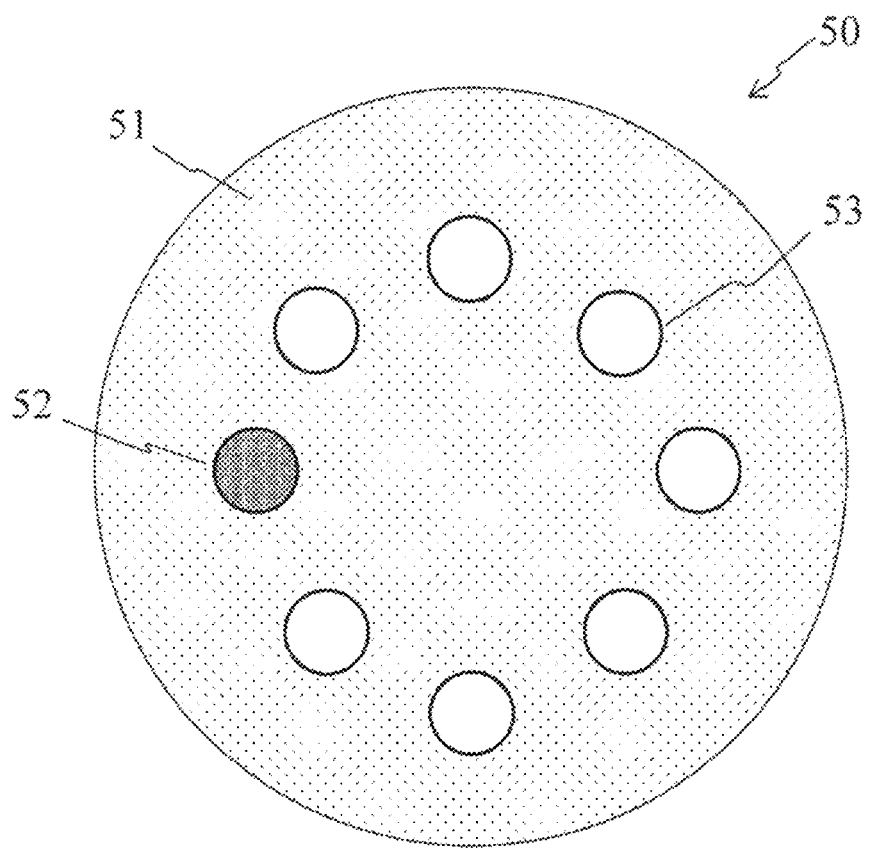
FIG. 43 is a view illustrating the multicore optical fiber according to the present invention.

FIG. 43 is a view illustrating a core arrangement example of the multicore optical fiber including the low delay core. In the multicore optical fiber according to the present example, the two or more transmission cores (52, 53) are annularly arranged in the clad 51. Then, it is characterized in that at least one (core 52) of the transmission cores is the low delay core having the structure described in the first to fourth embodiments. In the multicore fiber according to the present example, the core 52 is set as the low delay master channel, and the other cores 53 are set as the slave channels. Thus, since noise due to disturbance is made common, MS-CPE using the low delay channel can be stably operated in the optical communication system 300.

Example 3

Figure 44:
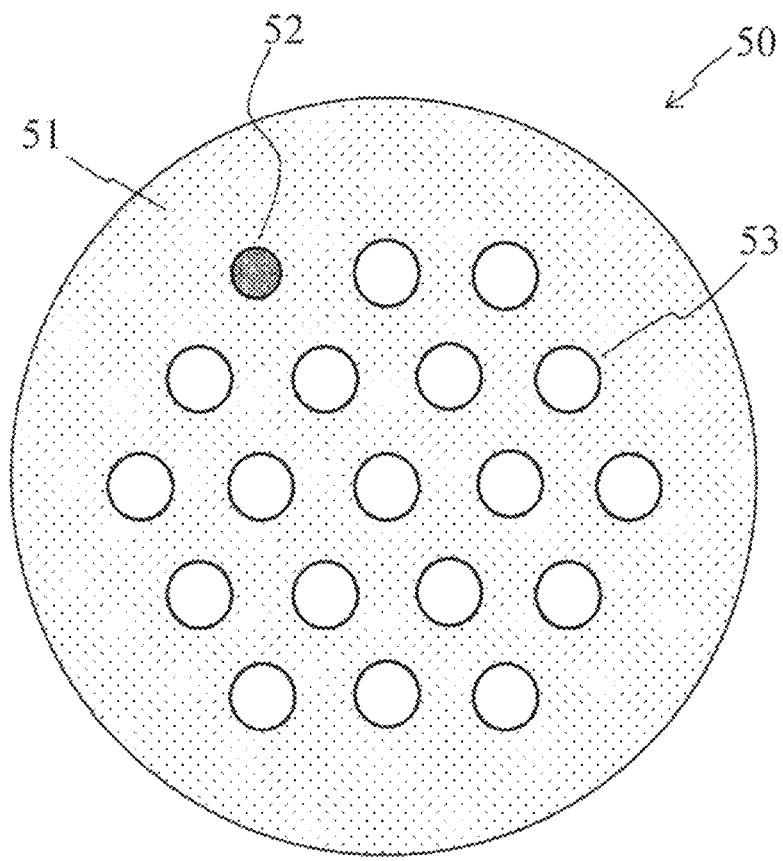
FIG. 44 is a view illustrating the multicore optical fiber according to the present invention.

FIG. 44 is a view illustrating a core arrangement example of the multicore optical fiber including the low delay core.

In the multicore optical fiber according to the present example, the two or more transmission cores (52, 53) are arranged in the clad 51 in a hexagonal close-packed structure. Then, it is characterized in that at least one (core 52) of the transmission cores is the low delay core having the structure described in the first to fourth embodiments. In the multicore fiber according to the present example, the core 52 is set as the low delay master channel, and the other cores 53 are set as the slave channels. Thus, since noise due to disturbance is made common, MS-CPE using the low delay channel can be stably operated in the optical communication system 300.

Example 4

Figure 45:
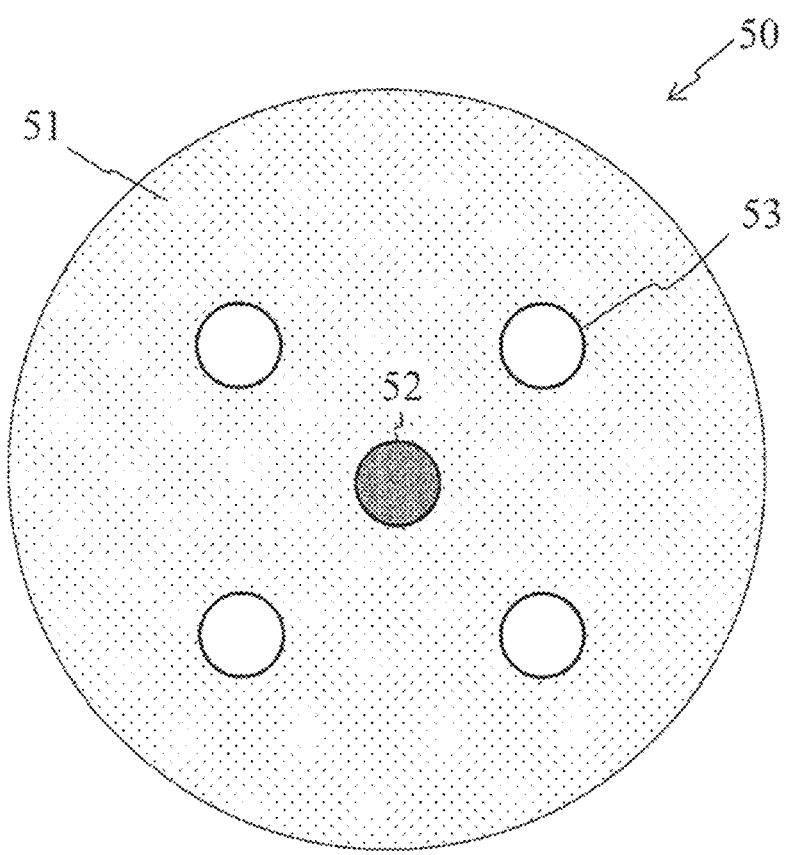
FIG. 45 is a view illustrating the multicore optical fiber according to the present invention.

FIG. 45 is a view illustrating a core arrangement example of the multicore optical fiber including the low delay core.

The multicore optical fiber according to the present example is characterized in that the transmission core (core 52) described in the first to fourth embodiments is arranged at the center of the clad 51, and two or more transmission cores 53 are arranged in a square lattice pattern around the transmission core in the clad 51. In the multicore fiber according to the present example, the core 52 is set as the low delay master channel, and the other cores 53 are set as the slave channels. Thus, since noise due to disturbance is made common, MS-CPE using the low delay channel can be stably operated in the optical communication system 300.

Example 5

Figure 46:
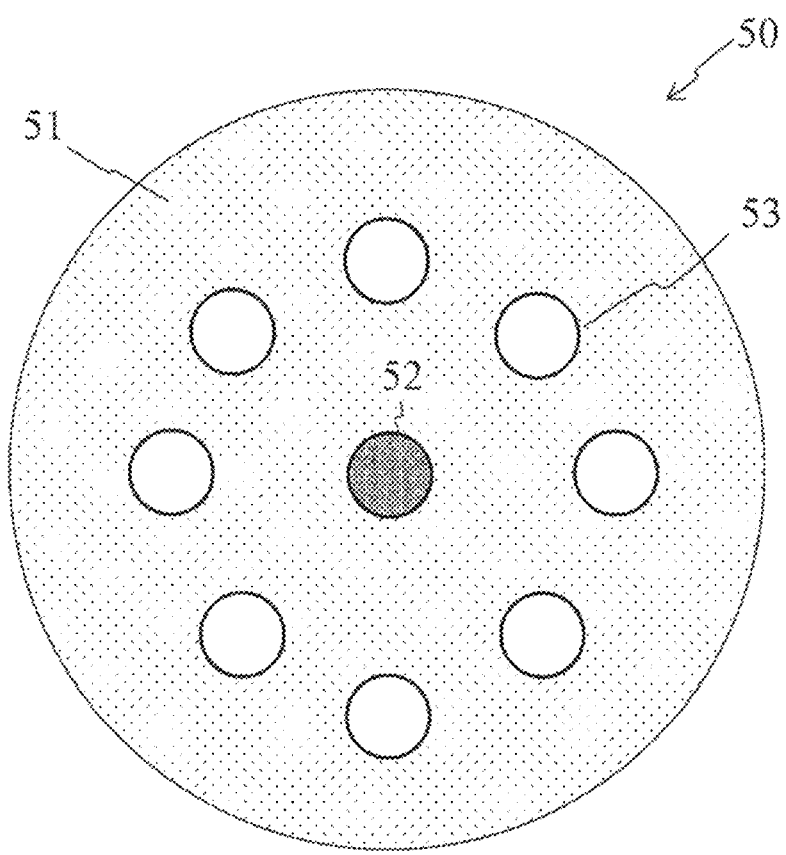
FIG. 46 is a view illustrating the multicore optical fiber according to the present invention.

FIG. 46 is a view illustrating a core arrangement example of the multicore optical fiber including the low delay core.

The multicore optical fiber according to the present example is characterized in that the transmission core (core 52) described in the first to fourth embodiments is arranged at the center of the clad 51, and two or more transmission cores 53 are annularly arranged around the transmission core and in the clad 51. In the multicore fiber according to the present example, the core 52 is set as the low delay master channel, and the other cores 53 are set as the slave channels. Thus, since noise due to disturbance is made common, MS-CPE using the low delay channel can be stably operated in the optical communication system 300.

Example 6

Figure 47:
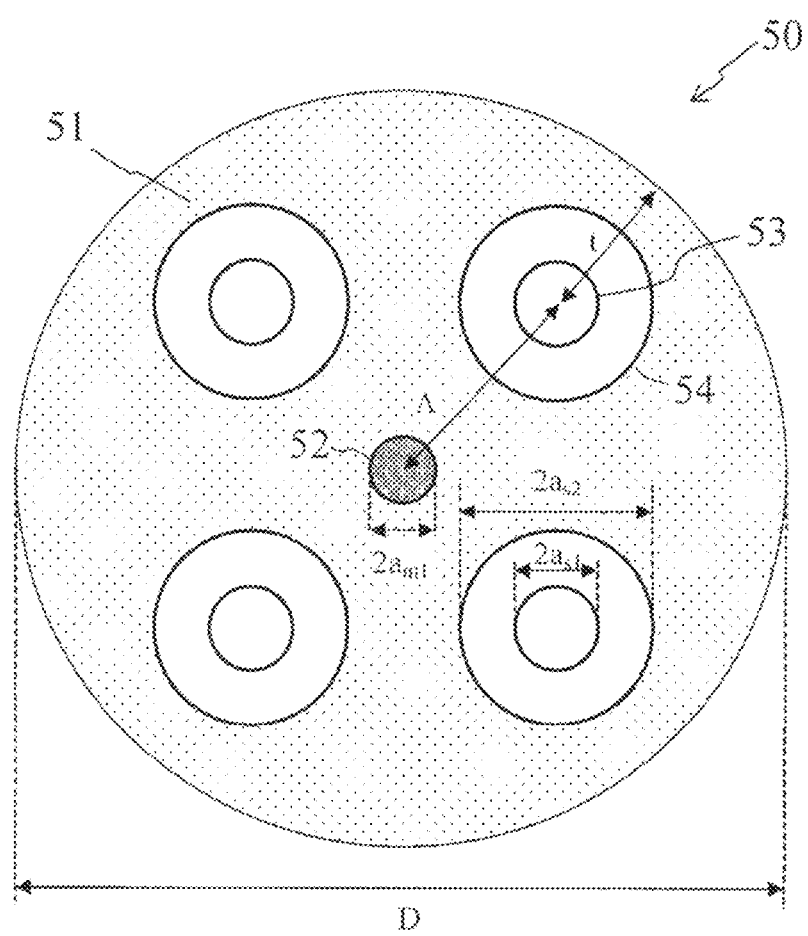
FIG. 47 is a view illustrating the multicore optical fiber according to the present invention.

FIG. 47 is a view illustrating a core arrangement example of the multicore optical fiber including the low delay core.

The multicore optical fiber according to the present example is characterized in that the transmission core (core 52) described in the first to fourth embodiments is arranged at the center of the clad 51, and four transmission cores 53 are arranged in a square lattice pattern around the transmission core in the clad 51. The core 52 is the low delay master channel, and the cores 53 are the slave channels. Here, the low delay master channel is assumed to be the SI-type, and the slave channels are assumed to be the W type including the low refractive index layer 54 on the outer periphery of the cores 53. The core radius of the low delay master channel is $a_{m1}$, the core radius of the slave channel is $a_{s1}$, and a radius of the low refractive index layer is $a_{s2}$. Further, the distance between the low delay master channel and the slave channel (the distance between the centers of the core 52 and the core 53) is Λ. Each core shares the clad 51, and the relative refractive index difference of the clad 51 with respect to the pure silica glass is $\Delta_c$. Further, the relative refractive index difference of the low refractive index layer 54 with respect to the pure silica glass is defined as $\Delta_d$.

Figure 48:
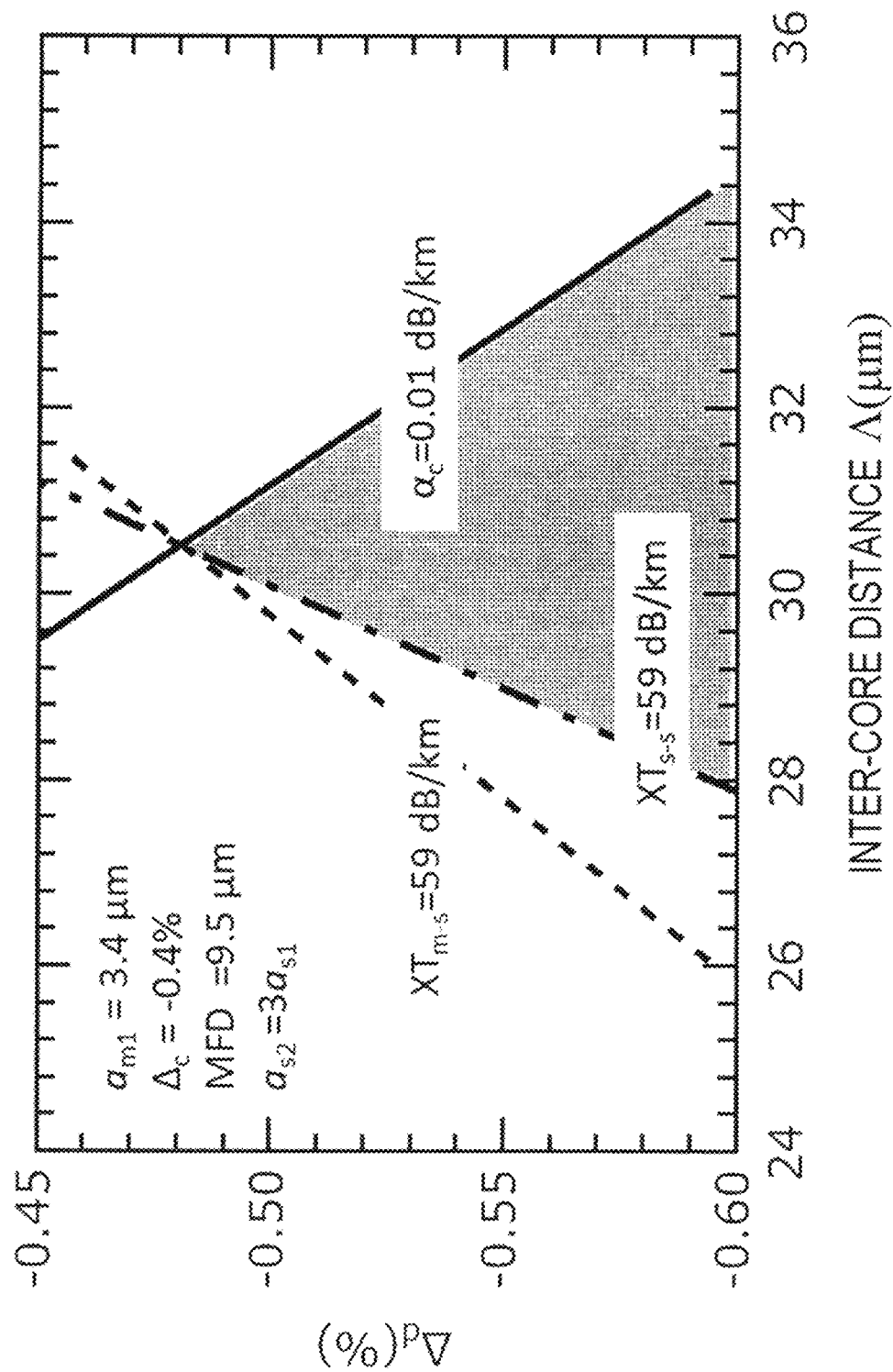
FIG. 48 is a diagram illustrating a design region of an inter-core distance and a refractive index difference of a low refractive index layer of the multicore optical fiber according to the present invention.

FIG. 48 is a diagram illustrating a design region of the inter-core distance Λ and a refractive index difference $\Delta_d$ of the low refractive index layer for the multicore optical fiber described in FIG. 47.

FIG. 48 is a calculation result of dependency of crosstalk $XT_{m-s}$ between the low delay master channel and the slave channels, crosstalk $XT_{s-s}$ between the slave channels, and the inter-core distance Λ and the relative refractive index difference $\Delta_d$ of leakage loss $\alpha_c$ in the slave channels at the wavelength of 1.625 μm.

A solid line indicates a structure in which $\alpha_c$ is 0.01 dB/km, a one dot chain line indicates a structure in which $XT_{s-s}$ is −59 dB/km, and a dashed line indicates a structure in which $XT_{m-s}$ is −59 dB/km. It is known that communication of 10,000 km Quadrature phase shift keying (QPSK) modulation can be performed with sufficient transmission quality when both the crosstalk $XT_{m-s}$ and $XT_{s-s}$ are −59 dB/km. Here, $a_{m1}$ and $\Delta_c$ are 3.4 μm and −0.4%, respectively, on the basis of an optical fiber structure capable of achieving MS-CPE using the low delay master channel in the optical transmission system of 1,000 km or more described in the first embodiment. Further, $a_{s1}$ is adjusted so that the MFD of the slave channel is 9.5 μm at a wavelength of 1.55 μm. The $a_{s2}$ is set to $3a_{s1}$ on the basis of an existing cut-off shift fiber (W type). In the gray structure in the drawing, it is possible to achieve both sufficient transmission quality and sufficient low loss in the long-distance transmission line.

FIG. 49 is a table for describing an example of the multicore optical fiber (MCF) structure illustrated in FIG. 47. The core 52 of the low delay master channel is assumed to be $a_{m1}$=3.4 μm and $\Delta_c$=−0.40%. $a_{s1}$=5.0 μm in the cores 53 of the slave channel, and $a_{s2}$=15.0 μm and Δd=−0.55% in the low refractive index layer 54. The inter-core distance Λ is 31 μm. With this structure, it is possible to achieve the multicore optical fiber having sufficient low XT and low loss properties suitable for long-distance transmission illustrated in FIG. 48.

At this time, the group delay time of the low delay master channel is 4.879 μs/km, and the group delay time of the slave channel is 4.883 μs/km. This is because a group delay time difference between the low delay master channel and the slave channel is 4 ns/km, and a transmission delay time difference of 1 μs or more can be achieved in an optical transmission line of 250 km or more.

As described above, by using this MCF as the optical transmission line 50, it is possible to achieve the MS-CPE optical transmission system using the low delay master channel even in a distance of 250 km or more.

[Supplementary Note]

The present invention is the optical communication system 301 including the optical fiber described in the first to sixth embodiments as an optical transmission line 50. That is, the optical communication system according to the present invention is as follows.

(1) An optical communication system of an MS-CPE transmission method including a transmitter, a receiver, and an optical transmission line connecting the transmitter and the receiver, characterized in that an optical fiber of the optical transmission line includes a core having a radius a (µm) for a master channel and a clad having a relative refractive index difference $\Delta$ (%) with respect to the core, the core and the clad having a step index (SI) type refractive index distribution structure and satisfying Mathematical Expression C1, $$-1.05+0.37a-0.05a^2 < \Delta < -1.02+0.26a-0.02a^2$$

and $$\Delta > 4.23+7.37\Delta\tau+3.81\Delta\tau^2-(3.15+4.77\Delta\tau+2.47\Delta\tau^2)a+(0.52+0.77\Delta\tau+0.40\Delta\tau^2)a^2 \quad (C1)$$

where $\Delta\tau$ (ns/km) is a group delay time difference between the master channel and a slave channel, and is a value that satisfies Mathematical Expression C2, where s (µs) is a signal arrival time difference when an optical signal is transmitted through the master channel and the slave channel of the optical communication system, and L (km) is a transmission distance of the optical signal.

[Mathematical Expression C2]

$$\Delta\tau \leq -\frac{s}{L} \times 10^3 \quad (C2)$$

(2) An optical communication system of an MS-CPE transmission method including a transmitter, a receiver, and an optical transmission line connecting the transmitter and the receiver, characterized in that an optical fiber of the optical transmission line includes a core having a radius $a_1$ (µm) for a master channel, a low refractive index layer surrounding a periphery of the core and having a relative refractive index difference $\Delta_1$ (%) with respect to the core, and a clad having a relative refractive index difference $\Delta_2$ (%) with respect to the core, in which the core, the low refractive index layer, and the clad have a W-type refractive index distribution structure and satisfy Mathematical Expression C3,

[Mathematical Expression C3]

$$0.23+0.66\text{MFD}-3.33(\mu_2/\Delta_1) < a_1 < 0.13(\Delta_2/\Delta_1)+(1.11-0.14\text{MFD})\Delta\tau+0.10-0.41\text{MFD} \quad (C3)$$

where MFD is a mode field diameter (µm) of the core, and $\Delta\tau$ (ns/km) is a group delay time difference between the master channel and the slave channel and is a value that satisfies Mathematical Expression C2, where s (µs) is a signal arrival time difference when an optical signal is transmitted through the master channel and the slave channel of the optical communication system, and L (km) is a transmission distance of the optical signal.

[Mathematical Expression C2]

$$\Delta\tau \leq -\frac{s}{L} \times 10^3 \quad (C2)$$

(3) In the optical fiber according to (1) and (2) above, the core has a refractive index equivalent to that of pure silica glass, but the core may be fluorine-doped glass and may have a refractive index lower than that of the pure silica glass.

(4) The optical fiber according to (1) above is characterized in that the core has a refractive index equivalent to that of the pure silica glass, the core is fluorine-doped glass, the refractive index is lower than that of the pure silica glass, the radius a (µm) satisfies Mathematical Expression C4, the group delay time difference $\Delta\tau_{min}$ (nm/km) that is minimum satisfies Mathematical Expression C5, and a relative refractive index difference $\Delta_F$ (%) of the core with respect to the pure silica glass satisfies Mathematical Expression C6,

[Mathematical Expression C4]

$$-4.4+0.8\text{MFD} < a < -1.2+0.6\text{MFD} \quad (C4)$$

[Mathematical Expression C5]

$$\Delta\tau_{min} = -18.93+7.00 \times 10^3 \text{MFD}^{-3.30} \quad (C5)$$

[Mathematical Expression C6]

$$0.98-0.06\text{MFD}-(0.42+0.03\text{MFD})a-(0.04+0.002\text{MFD})a^2 < \Delta_F < 0.03+1.16 \times 10^3 \text{MFD}^{-3.47}+0.02\Delta\tau-(0.01+1.88 \times 10^5 \text{MFD}^{-5.09})a+(0.64 \times 10^{-3}+1.89 \times 10^4 \text{MFD}^{-7.16})a^2 \quad (C6)$$

where the MFD is a mode field diameter (µm) of the core.

(5) The optical fiber according to (1) to (4) above is characterized by including a plurality of cores, in which one of the plurality of cores is the core for the master channel.

Figure 53:
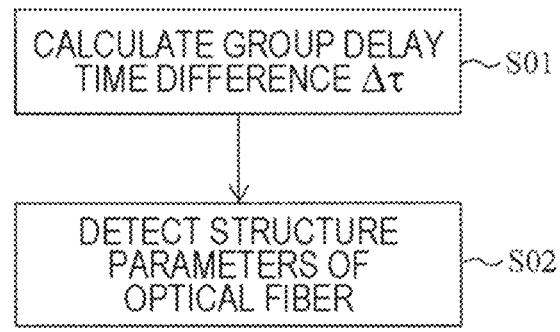
FIG. 53 is a flowchart illustrating a method for designing the optical fiber according to the present invention.

Further, the present invention is also a method for designing the optical fiber described in the first to sixth embodiments. That is, a design method according to the present invention is as follows (see FIG. 53).

(6) A method for designing an optical fiber included in an optical communication system of an MS-CPE transmission method is characterized by including:

calculating (step S01) a group delay time difference $\Delta_1$ (ns/km) between a master channel and a slave channel, the group delay time difference $\Delta\tau$ (ns/km) satisfying Mathematical Expression C2 where s (µs) is a signal arrival time difference when an optical signal is transmitted through the master channel and the slave channel of the optical communication system, and L (km) is a transmission distance of the optical signal; and finding (step S02) a radius a (µm) of a core for a master channel and a relative refractive index difference $\Delta$ (%) of a clad to the core of the optical fiber having a step index (SI) type refractive index distribution structure from Equation C1.

(7) A method for designing an optical fiber included in an optical communication system of an MS-CPE transmission method is characterized by including:

calculating (step S01) a group delay time difference $\Delta_1$ (ns/km) between a master channel and a slave channel, the group delay time difference $\Delta\tau$ (ns/km) satisfying Mathematical Expression C2 where s (µs) is a signal arrival time difference when an optical signal is transmitted through the master channel and the slave channel of the optical communication system, and L (km) is a transmission distance of the optical signal; and finding (step S02) a radius $a_1$ (µm) of a core for the master channel, a relative refractive index difference $\Delta_1$ (%) of a low refractive index layer surrounding a periphery of the core with respect to the core, and a relative refractive index difference $\Delta_2$ (%) of a clad with respect to the core, of the optical fiber having a W-type refractive index distribution structure from Mathematical Expression C3.

(8) The optical fiber according to (6) and (7) above is characterized in that the core has a refractive index equivalent to that of the pure silica glass, but the core is fluorine-doped glass and has a refractive index lower than that of the pure silica glass.

(9) The optical fiber according to (6) above is characterized in that, when the core has a refractive index equivalent to that of the pure silica glass but the optical fiber is fluorine-doped glass and a refractive index of the core is lower than that of the pure silica glass, the radius a (μm) is found so as to satisfy Mathematical Expression C4, the group delay time difference $\Delta\tau_{min}$ (nm/km) that is minimum is determined so as to satisfy Mathematical Expression C5, and the relative refractive index difference $\Delta_F$ (%) of the core with respect to the pure silica glass is determined so as to satisfy the Mathematical Expression C6.

(10) The optical fiber according to (6) to (9) above is characterized in that, when having a plurality of cores, one of the plurality of cores is the core for the master channel.

REFERENCE SIGNS LIST

11 Transmitter
12 Receiver
50 Optical transmission line (optical fiber)
51 Clad
52 Core for master channel
53 Core for slave channel
54 Low refractive index layer
301 Optical communication system

The invention claimed is:

1. An optical fiber provided in an optical communication system of a master-slave carrier-phase-estimation transmission method, the optical fiber comprising a core having a radius a (μm) for a master channel and a clad having a relative refractive index difference Δ (%) with respect to the core, the core and the clad having a step index (SI) type refractive index distribution structure and satisfying Mathematical Expression C1,

[Mathematical Expression C1]

$$-1.05+0.37a-0.05a^2<\Delta<-1.02+0.26a-0.02a^2$$

and $$\Delta>4.23+7.37\Delta\tau+3.81\Delta\tau^2-(3.15+4.77\Delta\tau+2.47\Delta\tau^2)a+(0.52+0.77\Delta\tau+0.40\Delta\tau^2)a^2 \quad (C1)$$

where $\Delta\tau$ (ns/km) is a group delay time difference between the master channel and a slave channel, and is a value that satisfies Mathematical Expression C2,

[Mathematical Expression C2]

$$\Delta\tau \leq -\frac{s}{L}\times 10^3 \quad (C2)$$

where s (μs) is a signal arrival time difference when an optical signal is transmitted through the master channel and the slave channel of the optical communication system, and L (km) is a transmission distance of the optical signal.

2. The optical fiber according to claim 1, wherein a refractive index of the core is lower than a refractive index of pure silica glass.

3. The optical fiber according to claim 1, wherein
a refractive index of the core is lower than a refractive index of pure silica glass,
the radius a (μm) satisfies Mathematical Expression C4,
the group delay time difference $\Delta\tau_{min}$ (nm/km) that is minimum satisfies Mathematical Expression C5, and
a relative refractive index difference $\Delta_F$ (%) of the core with respect to the pure silica glass satisfies Mathematical Expression C6,

[Mathematical Expression C4]

$$-4.4+0.8\text{MFD}<a<-1.2+0.6\text{MFD} \quad (C4)$$

[Mathematical Expression C5]

$$\Delta\tau_{min}=-18.93+7.00\times 10^3 \text{MFD}^{-3.30} \quad (C5)$$

[Mathematical Expression C6]

$$0.98-0.06\text{MFD}-(0.42+0.03\text{MFD})a-(0.04+0.002\text{MFD})a^2<\Delta_F<0.03+1.16\times 10^3 \text{MFD}^{-3.47}+0.02\Delta\tau-(0.01+1.88\times 10^5 \text{MFD}^{-5.09})a+(0.64\times 10^{-3}+1.89\times 10^4 \text{MFD}^{-7.16})a^2 \quad (C6)$$

where MFD is a mode field diameter (μm) of the core.

4. The optical fiber according to claim 1, further comprising
a plurality of cores, wherein
one of the plurality of cores is the core for the master channel.

5. An optical fiber provided in an optical communication system of a master-slave carrier-phase-estimation transmission method, the optical fiber comprising a core having a radius $a_1$ (μm) for a master channel, a low refractive index layer surrounding a periphery of the core and having a relative refractive index difference $\Delta_1$ (%) with respect to the core, and a clad having a relative refractive index difference $\Delta_2$ (%) with respect to the core, wherein the core, the low refractive index layer, and the clad have a W-type refractive index distribution structure and satisfy Mathematical Expression C3,

[Mathematical Expression C3]

$$0.23+0.66\text{MFD}-3.33(\mu_2/\Delta_1)<a_1<0.13(\Delta_2/\Delta_1)+(1.11-0.14\text{MFD})\Delta\tau+0.10-0.41\text{MFD} \quad (C3)$$

where MFD is a mode field diameter (μm) of the core, and $\Delta\tau$ (ns/km) is a group delay time difference between the master channel and the slave channel and is a value that satisfies Mathematical Expression C2,

[Mathematical Expression C2]

$$\Delta\tau \leq -\frac{s}{L}\times 10^3 \quad (C2)$$

where s (μs) is a signal arrival time difference when an optical signal is transmitted through the master channel and the slave channel of the optical communication system, and L (km) is a transmission distance of the optical signal.

6. The optical fiber according to claim 5, wherein a refractive index of the core is lower than a refractive index of pure silica glass.

\* \* \* \* \*